United States Patent
Molero Leon et al.

(10) Patent No.: US 12,462,938 B2
(45) Date of Patent: Nov. 4, 2025

(54) MACHINE-LEARNING MODEL FOR GENERATING HEMOPHILIA PERTINENT PREDICTIONS USING SENSOR DATA

(71) Applicant: Hoffmann-La Roche Inc., Little Falls, NJ (US)

(72) Inventors: Silvia Elena Molero Leon, Heredia (CR); Hélène Jeanne Sahri, Basel (CH); Turap Tasoglu, Basel-Landschaft (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 126 days.

(21) Appl. No.: 18/029,948

(22) PCT Filed: Sep. 29, 2021

(86) PCT No.: PCT/US2021/052615
§ 371 (c)(1),
(2) Date: Apr. 3, 2023

(87) PCT Pub. No.: WO2022/076221
PCT Pub. Date: Apr. 14, 2022

(65) Prior Publication Data
US 2023/0377747 A1  Nov. 23, 2023

(30) Foreign Application Priority Data
Oct. 6, 2020  (EP) .................................... 20200358

(51) Int. Cl.
*G16H 50/20* (2018.01)
*G16H 10/60* (2018.01)
(Continued)

(52) U.S. Cl.
CPC .............. *G16H 50/20* (2018.01); *G16H 10/60* (2018.01); *G16H 20/10* (2018.01); *G16H 40/67* (2018.01)

(58) Field of Classification Search
CPC ........ G16H 10/60; G16H 20/10; G16H 40/67; G16H 50/20
See application file for complete search history.

(56) References Cited

U.S. PATENT DOCUMENTS 10,896,749 B2 * 1/2021 Spotts .................... G16H 50/30
2016/0306945 A1  10/2016 Jiang
(Continued)

FOREIGN PATENT DOCUMENTS

| JP | 2020509465 A | 3/2020 |
|---|---|---|
| JP | 2020510899 A | 4/2020 |

(Continued)

OTHER PUBLICATIONS

Kadesha Thomas Smith: Mobile Health for Hemophilia Apps are changing medical care. Available at: https://hemaware.org/life/mobile-health-hemophilia (Year: 2017).*
(Continued)

*Primary Examiner* — Katherine Kolosowski-Gager
(74) *Attorney, Agent, or Firm* — Kilpatrick Townsend & Stockton LLP

(57) ABSTRACT

Disclosed are systems and methods for building and using a machine-learning model to facilitate intelligent selection of treatment strategies for subjects suffering from hemophilia. Sensor data (e.g., that characterizes movement of or a physiological characteristic of particular a subject) can be used as an input to a machine-learning model workflow. The sensor data may affect a model selection, model configuration, model result, pre-processing and/or post-processing. A result of the workflow may inform or influence a treatment
(Continued)

selection, treatment schedule, treatment dosage and/or activity recommendation for the particular subject.

21 Claims, 10 Drawing Sheets

(51) Int. Cl.
    *G16H 20/10*     (2018.01)
    *G16H 40/67*     (2018.01)

(56) References Cited

U.S. PATENT DOCUMENTS

2018/0330824 A1* 11/2018 Athey ............... G16B 40/00
2019/0365317 A1* 12/2019 Spotts ............... A61B 5/6824

FOREIGN PATENT DOCUMENTS

| WO | WO-2015085276 A1 * | 6/2015 | ............ A61K 38/37 |
| WO | 2018140373 A1 | 8/2018 | |
| WO | 2018144373 A1 | 8/2018 | |
| WO | 2020096999 A1 | 5/2020 | |

OTHER PUBLICATIONS

Japanese Application No. 2023-521127, Office Action mailed on Jun. 5, 2024, 8 pages (4 pages of Original Document and 4 pages of English Translation).
EP20200358.8 , "Extended European Search Report", Mar. 15, 2021, 9 pages.
PCT/US2021/052615 , "International Search Report and Written Opinion", Jan. 19, 2022, 14 pages.
KR10-2023-7011558, "Office Action", Jun. 22, 2025, 15 pages.
Smith, "Apps are changing medical care", Mobile Health for Hemophilia, Aug. 30, 2017, 8 pages.

* cited by examiner

MACHINE-LEARNING MODEL FOR GENERATING HEMOPHILIA PERTINENT PREDICTIONS USING SENSOR DATA

CROSS-REFERENCE TO RELATED APPLICATION

This application is a National Stage Application of PCT Application No. PCT/US2021/052615, filed Sep. 29, 2021, which claims the benefit of and priority to European Patent Application No. 20200358.8, filed on Oct. 6, 2020. Each of these applications is hereby incorporated by reference in its entirety for all purposes.

FIELD

Methods and systems disclosed herein relate generally to using a machine-learning model to facilitate intelligent selection of treatment strategies for subjects suffering from hemophilia. More specifically, a workflow may be configured to use one or more machine-learning models and sensor data representing a state of a subject (e.g., movement, exertion, etc.) to generate a result for informing or indicating a treatment selection, treatment schedule, treatment dosage and/or activity recommendation for the particular subject.

BACKGROUND

Blood circulation supports the flow of nutrients and oxygen to various portions of the body and carbon dioxide and waste away from organs. The circulation system generally supports free flow of blood, but blood coagulation can also be desirable when an injury occurs and blood begins to flow out of an organism. A coagulation factor cascade frequently then supports coagulation (i.e., clotting). More specifically, multiple initial reactions result in the formation of thrombin, which converts fibrinogen to fibrin, such that a fibrin clot forms.

Blood contains proteins (clotting factors) that support the generation of more thrombin and thus allow blood to clot quickly after an injury. A person with hemophilia lacks sufficient clotting factors, so they experience longer bleeding and more blood loss after injuries. As a result, a person with hemophilia can have excessive internal bleeding in joints and the brain. If undetected, this internal bleeding can cause seizures, permanent damage to the joints, or decreased consciousness.

While hemophilia is most often inherited through an X chromosome, it is possible to develop hemophilia in alternative ways. For example, a mutation may occur during development, or antibodies against a clotting factor may develop later in life. Additionally, cancer, autoimmune disorders, and pregnancy are associated with hemophilia development.

The severity of hemophilia varies greatly across subjects. Some subjects have severe hemophilia, which may correspond to spontaneous bleeds not triggered by an injury. These subjects are at risk of internal bleeding and frequently receive prophylactic treatment so as to reduce the probability that a spontaneous bleed will occur. Some subjects have mild hemophilia, in which case spontaneous bleeds are unlikely to occur, though an injury (e.g., surgery or tooth extraction) may trigger excessive bleeding. These subjects frequently do not receive prophylactic treatment, though treatment may be administered (for example) before or after surgeries.

Traditionally, treatment for hemophilia involved receiving injections of the missing blood clotting factor. Recently, alternative treatments have become available. The vast majority of treatments require repeated administration to maintain levels of the therapeutic at a sufficiently high level. Determining a treatment schedule is complicated by the fact that hemophilia itself corresponds to a high diversity of manifestations, and subjects exhibit high variability with regard to pharmacokinetics (e.g., absorption rate, excretion rate, etc.). Further, a substantial portion of hemophilia subjects (e.g., approximately 1 in 5 people with hemophilia A) will develop inhibitors that reduce the efficacy of factor-concentrate treatments.

US 2019/365317 discloses a system for recommending administration of a therapeutic for a patient by tracking physiological data. Sensor data is used to quantify an amount and intensity of a patient's physical activity. A pharmacokinetic profile of the patient, a current plasma concentration level and the patient's activity level can be used to determine a rate at which the patient is and/or will metabolize the therapeutic. A frequency of the activity may be used to determine whether to recommend on-demand treatment or an adjusted treatment schedule.

However, there remains a need to improve personalized selection of hemophilia treatments and personalized identification of treatment schedules, so as to improve treatment efficacy for individual subjects afflicted with hemophilia. Further, there is a need to establish interfaces, networks, and communication channels that facilitate rapidly detecting and characterizing hemophilia-related circumstances that warrant action.

SUMMARY

In some embodiments, a computer-implemented method is provided. The method uses one or more data-processing workflows to generate a hemophilia-pertinent prediction pertaining to a subject (e.g., a subject having been diagnosed with hemophilia, suspected of having hemophilia, having a family history of hemophilia, having a genetic predisposition to hemophilia, etc.). The data-processing workflow(s) can use one or more machine-learning models, optionally one or more pre-processing functions and optionally one or more post-processing functions. For example, an input data set can be generated for a subject that includes representations of demographic information, diagnosis information, laboratory information, treatment information, manifestation information, etc. Part or all of the input data set can be used to (for example) configure and/or select (e.g., via a classifier machine-learning model) one or more workflows and/or one or more machine-learning models to be used for the subject. A same or different part or all of the input data set can be processed by the workflow(s) and/or machine-learning model(s) to generate a hemophilia-pertinent prediction. A machine-learning model used to generate a prediction can include (for example) a pharmacokinetic model and/or neural-network model.

In some embodiments, a method is provided that includes receiving a subject-specific data set corresponding to a subject, the subject-specific data set including or identifying: a type of hemophilia; treatment type; demographic data; and/or a photograph of a part of the particular subject or information derived based on a photograph of a part of the particular subject. At least part of the subject-specific data set is processed using a classifier model to identify one or more population-level machine-learning models from among a set of population-level machine-learning models.

Each of the set of population-level machine-learning models includes a machine-learning model trained using a training set corresponding to a set of other subjects with hemophilia. One or more indications are received that identify one or more times at which a treatment of the treatment type was administered to the subject. A hemophilia-pertinent time course is predicted for the subject using the one or more times and a data-processing workflow using a population-level machine-learning model of the one or more population-level machine-learning models. A representation of sensor data collected at a device associated with the subject is received. A transformed data processing workflow is determined (based on the representation of sensor data) that generates hemophilia-pertinent predictions for the subject. A hemophilia-pertinent prediction is generated for the subject using the transformed data-processing workflow. A result corresponding to the hemophilia-pertinent prediction is output.

Generating the hemophilia-pertinent prediction may include identifying a post-processing algorithm based on the sensor data. Determining the transformed data-processing workflow may include identifying an initial result using the data-processing workflow; determining a post-processing function based on the sensor data; and transforming the initial result using the initial result and post-processing function. Determining the transformed data-processing workflow may include selecting an activation function.

The population-level machine-learning model may include a pharmacokinetic model.

Processing the subject-specific data set using the classifier model to identify the one or more population-level machine-learning models may include: encoding the subject-specific data set; and using a distance-based algorithm to identify distances between the encoding of the subject-specific data set and encodings of other subject-specific data sets included in the training set.

The method may also include appending at least the hemophilia-pertinent prediction to the predicted hemophilia pertinent time course, the one or more predicted factor levels including the predicted factor level; receiving another representation of new sensor data collected at the device associated with the subject; determining, based on the other representation, to resume use of the data-processing workflow; generating another hemophilia-pertinent prediction for the subject using the data-processing workflow and the appended time course; and outputting another result corresponding to the other hemophilia-pertinent prediction.

The method may include determining, based on the sensor data, that a workflow-transition condition has been satisfied, wherein the transformed data processing workflow is determined in response to determining that the workflow-transition condition has been satisfied.

Generating the hemophilia-pertinent prediction may include: determining one or more states or interim variables calculated for a recent time step by the population-level machine-learning model; and configuring the transformed data-processing workflow to use the one or more states or interim variables.

The sensor data may represent movement of the subject.

The sensor data may represent a physiological attribute of the subject.

The predicted hemophilia-pertinent time course may include, for each of a set of time points, a predicted level of a factor, therapeutic or active ingredient, and wherein the hemophilia-pertinent prediction includes another predicted level of the factor, therapeutic or active ingredient associated with another time point.

The predicted hemophilia-pertinent time course may include, for each of a set of time points, a predicted clotting time or probability of an abnormal bleeding event occurring, and wherein the hemophilia-pertinent prediction includes another predicted clotting time or another probability of an abnormal bleeding event occurring associated with another time point.

The result may be indicative of a recommendation to reduce an activity level of the subject.

The result may be indicative of a recommendation to treat the subject in view of an increased abnormal bleeding probability.

The method may also include treating the subject with a hemophilia treatment based on the result. The hemophilia treatment may differ from the treatment of the treatment type administered at the one or more times.

The result may correspond to a recommendation to seek medical attention for a bleed depicted in the photograph.

The subject-specific data set may include data identified in an electronic medical record corresponding to the subject.

The result may be output at a device of the subject via a chatbot.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more processors. In some embodiments, the system includes a non-transitory computer readable storage medium containing instructions which, when executed on the one or more processors, cause the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
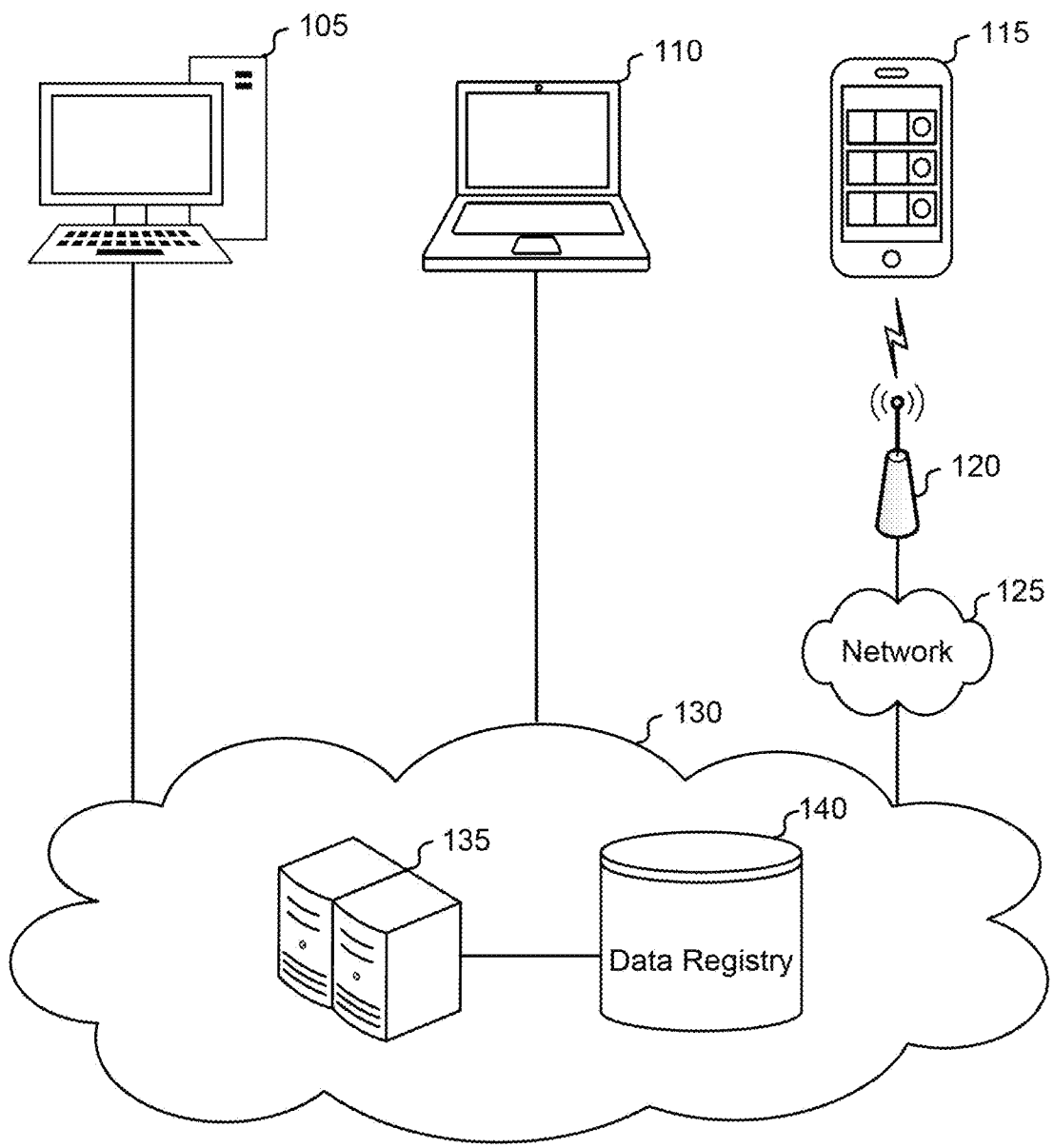
FIG. 1 illustrates a network environment in which the cloud-based application is hosted, according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

In some embodiments, a computer-implemented method is provided. The method uses one or more data-processing workflows to generate a hemophilia-pertinent prediction pertaining to a subject (e.g., a subject having been diagnosed with hemophilia, suspected of having hemophilia, having a family history of hemophilia, having a genetic predisposition to hemophilia, etc.). The data-processing workflow(s) can use one or more machine-learning models, optionally one or more pre-processing functions and optionally one or more post-processing functions. For example, an input data set can be generated for a subject that includes representations of demographic information, diagnosis information, laboratory information, treatment information, manifestation information, etc. Part or all of the input data set may have been received from one or more electronic medical records (e.g., stored at a server and/or care-provider device). Part or all of the input data set can be used to (for example) configure and/or select (e.g., via a classifier machine-learning model) one or more workflows and/or one or more machine-learning models to be used for the subject. A same or different part or all of the input data set can be processed by the workflow(s) and/or machine-learning model(s) to generate a hemophilia-pertinent prediction. A machine-learning model used to generate a prediction can include (for example) a pharmacokinetic model and/or neural-network model.

The prediction may include (for example) a predicted factor level, therapeutic level, active-ingredient level, abnormal-bleeding-event probability, probability of a spontaneous abnormal bleeding event, etc. In some instances, the prediction includes or can be used to identify a treatment specification and/or treatment approach. For example, the prediction may predict when one or more treatments are to be administered, one or more dosages of treatments that are to be administered and/or which treatment(s) are to be administered in order to promote a given objective (e.g., maintaining a level of a therapeutic, active ingredient and/or factor above a predefined threshold; and/or maintaining a risk of an abnormal bleeding event and/or a risk of an abnormal spontaneous bleeding event below a predefined threshold). A treatment may be provided and/or recommended to the subject in accordance with the prediction.

In some instances, a given circumstance may affect efficacy of various hemophilia treatment strategies and/or bleeding-event risks. For example, a user may be more likely to suffer an injury (which may trigger an abnormal bleeding event) when engaging in high-intensity activities. As another example, a user who frequently engages in high-intensity activities may have a lower risk of joint bleeds due to increased muscle strength to support joints, increased coordination and decreased obesity (thereby decreasing joint inflammation). As yet another example, high-intensity activity may change pharmacokinetics that influence how quickly a hemophilia treatment is made and remains effective (e.g., via changed rates of distribution, metabolism, absorption and excretion).

Thus, some embodiments generate one or more hemophilia-pertinent predictions based on sensor data associated with a subject. The sensor data may indicate (for example) movement of the subject and/or a physiological attribute of the subject. For example, the sensor data may be collected via an accelerometer, gyroscope, GPS sensor, pedometer and/or heart-rate monitor. In some instances, an inference can be made as to a type of activity in which the subject is engaging, an intensity of an activity in which the subject is engaging and/or an exertion state of the subject.

The sensor data and/or an inference made based on the sensor data may be used to (for example) select and/or configure a machine-learning model, select and/or configure a pre-processing function, and/or select and/or configure a post-processing function. For example, a first set of rate constants can be defined for a pharmacokinetic model to be used when it is inferred that a user is stationary; a second set of rate constants can be defined for the pharmacokinetic model to be used when it is inferred that a user is participating in a low-intensity activity; and a third set of rate constants can be defined for the pharmacokinetic model to be used when it is inferred that a user is participating a high-intensity activity. In some instances, the first, second and third sets of rate constants may have been separately learned using different training sets. In some instances, one of the first, second and third sets of rate constants may be learned using a training data set, and each rate constant may be adjusted by a corresponding absolute or relative amount to determine a corresponding rate constant for another of the second or third set of rate constants. Dynamic selections of rate-constant sets can then be made, with smooth transitions being facilitated by availing and/or sharing state variables and/or other interim variables.

As another example, a function may learned for each of one or more rate constants that relates the rate constant to sensor data. At each of one or more time steps, the rate constant(s) can be dynamically determined based on recent sensor data.

As yet another example, a pharmacokinetic model may be used to generate a hemophilia-pertinent prediction when a moving average of readings from an accelerometer are below a threshold and a neural network can be used to generate a hemophilia-pertinent prediction when a moving average of accelerometer readings are above a threshold.

As still another example, a threshold, activation function and/or post-processing function can be configured to be differentially defined based on sensor data. For example, a threshold for issuing an alert (e.g., for a treatment to be administered and/or to change an activity) and/or for recommending a change in a treatment schedule may depend on sensor data. The threshold may be selected using logic, one or more conditional statements, a step function, a monotonic function, etc. that depend on sensor data (and/or a processed version thereof).

A cloud-based application that stores data across a large population of hemophilia subjects (e.g., associated with diverse hemophilia types, hemophilia severities, demographics, treatments, locations, genetic mutations, activity levels, etc.) can facilitate learning multi-dimensional dependencies of hemophilia-pertinent predictions on various factors (including sensor data).

An application (e.g., operating locally on a device and/or at least partly using results of computations performed at one or more remote and/or cloud servers) can be used by (for example) a subject that has hemophilia and/or a care provider caring for a subject that has hemophilia. The application can perform one or more operations disclosed herein. In some instances, one or more applications can facilitate communicate between a subject with hemophilia and a care provider. Such communication may (for example) facilitate alerting a care provider of an abnormal bleeding response or injury and/or may facilitate telemedicine (e.g., which may be particularly valuable when the subject or a portion of a local society has a communicable disease, when the subject has a locomotion disability and/or when the subject is physically far from an office of the care provider).

II. Summary of Hemophilia Sub-Types, Diagnosis Protocol, Pertinent Medical Tests, Progression Assessment and Available Treatments II.A. Types of Hemophilia The medical community has defined multiple types of hemophilia, which can influence treatment selection and inform prognoses.

II.A.1. Hemophilia A, Hemophilia B and Hemophilia C

All of hemophilia A, hemophilia B and hemophilia C are congenital disorders that arise due to genetic mutations present at birth. Mutations in the FVIII (or F8) gene cause hemophilia A, mutations in in the FIX or (F9) gene cause hemophilia B, and mutations in FXI (or F11) cause hemophilia C. Among people who have hemophilia, approximately 80% have hemophilia A, approximately 15% have hemophilia B, and approximately 5% have hemophilia C.

The FVIII gene and the FIX gene are on the long arm of the X chromosome (Xq28 and Xq27.1, respectively). The FXI gene is located on the long arm of chromosome 4 (4q35.2). Mutations in the FVIII gene result in lower coagulation factor VIII productions or production of an abnormal version of this factor. Similarly, mutations in the FIX gene result in lower coagulation factor IX productions or production of an abnormal version of this factor. Mutations in the FXI gene result in factor XI deficiency. All of factor VIII, factor IX and factor XI are involved in clotting reactions.

More specifically, factor VIII is typically in a stable form as a result of being bound to von Willebrand factor. However, when an injury occurs, thrombin is generated. The thrombin binds to and "activates" factor VIII, causing it to separate from von Willebrand factor. Factor XI is activated by factor XIIa, thrombin and activated FXI itself.

The active factor VIII serves as an essential cofactor for factor IX (which itself is activated in response to injury by activated factor XI) in an intrinsic clotting cascade, in that factor VIII's activation of factor IX triggers an ensuing reaction chain results in a blood clot. A low level or absence of factor VIII, IX or XI prevents formation of a stable blood clot, in that the blood may fail to clot initially or that a formed clot may break.

II.A.2. Mild, Moderate and Severe Hemophilia

Hemophilia A and hemophilia B are further typically characterized as being mild, moderate or severe based on a level of activity of clotting factor (e.g., factor VIII or factor IX) in a subject's blood. Hemophilia is characterized as mild when the factor activity level is between 6%-49% (e.g., 0.06-0.49 IU/mL for adults); moderate when the factor activity level is 1-5% (e.g., 0.01-0.05 IU/mL for adults); and severe when the factor activity level is less than 1% (e.g., less than 0.05 IU/mL for adults). Normal levels of factor IX for subjects at very young ages (e.g., at birth or less than 6 months) may be lower than normal factor levels for adult subjects. Thus, testing for factor IX levels may, in some instances, be delayed until a child has reached a certain age (e.g., 6 months) or may be repeated when a child is a certain age if a low level was detected at a younger age.

Severe cases are most common, with 60% of hemophiliacs having this form. Meanwhile, 15% of hemophiliac cases are moderate and 25% are mild. Typically, a severity level does not change throughout life, except that a form of factor IX deficiency called hemophilia B Leyden can become less severe after puberty.

Individuals with severe hemophilia experience frequent spontaneous bleeding and abnormal bleeding after even minor injuries (e.g., bleeding for a prolonged period). Spontaneous bleeding most frequently occur in the joints, though internal bleeding (e.g., in the kidneys, brain and gastrointestinal tract) are not uncommon. Recurring joint bleeding can cause inflammation, damage cartilage and permanently injure the joint. Minor injuries may result in muscle hematomas or internal bleeding, which may appear days after the initial injury.

Individuals with moderate hemophilia also experience abnormal bleeding after minor injuries (e.g., though potentially to a lesser extent), but rarely experience spontaneous bleeding. Individuals with mild hemophilia experience abnormal bleeding after major injuries, surgeries and/or tooth extraction but not after minor injuries or spontaneously. Accordingly, severe hemophilia is typically diagnosed early in life (e.g., within the first year), moderate hemophilia is typically diagnosed later but during young childhood, and severe hemophilia is frequently diagnosed late in life (e.g., following a surgery or tooth extraction).

Hemophilia C is generally not characterized as being mild, moderate or severe, because even when activity of factor XI falls within what may have been deemed a "severe" range (0.15-0.20 U/mL), bleeding abnormalities are rather minor (e.g., not experiencing spontaneous bleeding, though bleeding after surgery may be abnormal).

II.B. Diagnosis of Hemophilia

A diagnosis protocol for hemophilia can depend on an age of a subject and whether there is a history of hemophilia in a family of the subject.

Diagnosis of hemophilia and hemophilia subtypes frequently includes prothrombin time (PT) assays and/or partial thromboplastin time (PTT) assays; platelet counts (e.g., and/or complete blood cell counts); mixing assays; and/or factor assays.

II.B.1. Complete Blood Counts/Platelet Counts

Platelet counts of hemophilia are generally normal. A platelet count can be determined by estimating counts on a blood smear.

II.B.2. Prothrombin Time Assay

Prothrombin times of hemophiliacs are also generally normal. To determine a prothrombin time, a sample of a subject's blood is first mixed with an anticoagulant (e.g., 3.2% buffered sodium citrate). The sample mixture is then mixed with a prothrombin time reagent (that includes thromboplastin and calcium chloride), which overcomes the anti-clotting nature of the anticoagulant. A time to clotting is measured optically. Normal prothrombin times are about 15-19 seconds. A prolonged PT is consistent with deficiency of any of Factors II, V, VII, or X; with oral anticoagulants, liver disease or vitamin K deficiency. Notably, a prolonged PT is not consistent with a deficiency of factor VIII, IX or XI.

II.B.3. Partial Thromboplastin Time Assay

Partial thromboplastin times (PTTs) and/or activated partial thromboplastin times (aPTTs) of hemophiliacs are generally prolonged. To determine a PTT or aPTT, an assay may be conducted using the partial thromboplastin time (PTT) method or activated partial thromboplastin time (aPTT) method and may further use a factor-deficient substrate. More specifically, plasma can be obtained from a subject and mixed with a particular amount of anticoagulant (e.g., 3.2% buffered sodium citrate). The sample can then be evaluated using an aPTT-based and/or PTT-based clotting time assay. The clotting time assay may include a one-stage clotting time assay.

The assay can be performed by combining the sample mixture with a substrate deficient of a particular factor (e.g., factor VIII, factor IX or factor XI) but including normal levels of other factors. To obtain the aPTT, an aPTT reagent is further introduced and thereafter incubated for a particular time. For either the PTT or aPTT assay, calcium can then be added to trigger coagulation, and clotting time can be measured optically. The clotting time of the sample can be compared to clotting time of a control plasma (e.g., pooled from multiple subjects). Normal PTTs are between 60-70 seconds, and normal aPTTs are between 30-40 seconds. A PTT exceeding 100 seconds is indicative of a subject who experiences spontaneous bleeding, and an aPTT exceeding 70 seconds is indicative of a subject who experiences spontaneous bleeding.

In some instances, multiple different dilutions are performed using the sample mixture (or control mixture) and the substrate. The dilutions can include (for example) $1/10$ (assumed to have full activity of the sample's factor), $1/20$ (assumed to have 50% activity of the sample's factor), $1/50$ and $1/100$. A PTT or aPTT value can be determined for each dilution. For each of the sample mixture and control mixture, a log-lin fit is determined using the clotting times and dilutions. Factor clotting activity can be determined based on (for example) a point on the control-mixture fit that corresponds to a same estimated clotting time as the sample-mixture fit at the $1/10$ dilution.

II.B.4. Mixing Studies

There are multiple potential reasons why a subject's PTT or aPTT may be prolonged. For congenital hemophilia, the prolongation is attributed to a deficiency in a coagulation factor. However, an alternative potential explanation (e.g., applicable to other subjects) is that the plasma sample includes an inhibitor of the factor, which may occur for acquired hemophilia. A mixing study can facilitate differentiating between these circumstances. In a mixing study, a subject's plasma is mixed with control plasma that includes normal factor levels. If this mixing negates or "corrects" the prolonged clotting of the subject's plasma, it may be inferred that the subject's plasma was deficient of a factor. Meanwhile, failure of a correction can indicate or suggest that the subject's plasma included an inhibitor (e.g., clotting inhibitor).

Some control plasmas may include "normal plasma" associated with subjects that do not have hemophilia, do not have a factor deficiency and are not on an anticoagulant. Determining that prolonged clotting can be corrected via mixing with normal plasma is consistent with a deficiency in Factor VIII, Factor IX and Factor XI. Some control plasmas may include "adsorbed plasma" associated with subject deficient with a factor (e.g., Factor IX) and on an anticoagulant (e.g., an oral anticoagulant). Determining that prolonged clotting can be corrected via mixing with adsorbed plasma is consistent with a deficiency in a single clotting factor.

If it is determined that prolonged clotting persists despite the mixing, the blood may include a lupus anticoagulant or the subject may have acquired hemophilia. Low levels of a factor (e.g., factor VIII or factor XI) and a presence of a factor inhibitor (e.g., factor VIII inhibitor of factor XI inhibitor) is consistent with acquired hemophilia. Meanwhile, presence of a lupus anticoagulant is consistent with lupus.

II.B.5. Chromogenic Factor Assays

A chromogenic assay (e.g., a chromogenic factor VIII assay, a chromogenic factor IX assay, or a chromogenic factor XI assay) can identify a quantity of a particular factor in a sample. The rate-limiting step in each of these assays is the amount of factor VIII, factor IX or factor XI present in the sample.

With respect to the chromogenic factor VIII assay, during a first stage, sample plasma from a subject is combined with reagents including activated factor IX and factor X. Factor VIII in the subject's plasma supports activation of factor X (in response to thrombin activation of factor VIII and VIIIa, which—together with $Ca^{2+}$, phospholipid and factor IXa—activate factor X). During a second stage, a chromogenic substrate is cleaved by the activated factor X. Factor VIII activity in the subject sample can then be determined based on optical readings (e.g., identifying absorbance at a particular wavelength).

With respect to the chromogenic factor IX assay, during a first stage, sample plasma is combined with reagents including activated factors XI and VIII, calcium and phospholipid, causing factor IX and factor X activation. The substrate is then cleaved, which is measured via optical readings (e.g., identifying absorbance at a particular wavelength).

With respect to the chromogenic factor VIII assay or the chromogenic factor IX assay, the factor concentration can be determined using a reference relationship (e.g., reference linear relationship) that relates light absorbance at a given frequency to factor concentration.

II.B.6. Bethesda Assay

A factor assay may include a Bethesda assay (or modification of the Bethesda assay, such as the Nijmegen modification of the Bethesda assay), which can facilitate distinguishing between factor inhibitors and factor deficiencies due to other causes. The Bethesda assay can detect a titer of a particular factor inhibitor (e.g., factor IX inhibitor or factor XI inhibitor), such as IgG subclass 4 and/or IgG subclass 1. 1 Bethesda Unit (Bu) corresponds to a quantity of inhibitor in a plasma sample required to neutralize 50% of a single unit of a given factor after incubating for two hours at 37° C. The assay is performed mixing diluted plasma from a subject with control plasma from multiple other subjects (in a 1:1 ratio), incubating for two hours at 37° C. and detecting residual factor activity. This residual factor activity is compared to reference factor activity detected after incubating a mixture of the control plasma and a buffer for two hours at 37° C. The Bethesda titre is determined based on the comparison by using a defined relationship that associates inhibitor concentration with residual factor activity.

The Nijmegen modification of the Bethesda assay derives the Bethesda titre in a same manner, but the mixtures used to detect residual factor activity are different. A first mixture is a combination of the diluted subject plasma and a buffered control sample, and a second mixture is a combination of a plasma sample deficient of the factor of interest and the buffered control sample.

II.B.7. von Willebrand Factor Assay von Willebrand factor is a carrier protein for factor VIII. Levels of von Willebrand factor in hemophiliacs are generally normal. To determine quantities and quality of Willebrand factor, one or more von Willebrand factor assays can be performed. A von Willebrand factor assay can include a multimer assay (VWF:Multimer analysis), antigen assay (VWF:Ag), Ristocetin cofactor assay (VWF:RCof) or collagen binding activity assay (VWF:CBA). The antigen assay (VSF: Ag assay) is a quantitative assay that indicates a level of von Willebrand factor in a subject's plasma but does not detect many quality defects (e.g., that may be present in subjects with Type 2 von Willebrand disease). VSF:CBA and VSF:Multimer analysis provide outputs are indicative of quality of von Willebrand factor but provides limited quantitative data. VSF:RCof detects both quantitative levels of von Willebrand facto and also the quality of the factor. However, the VSF:RCof assay has consistency and reliability challenges.

Both qualitative and quantitative von Willebrand factor defects are important to detect when determining a hemophilia diagnosis. Qualitative defects, such as those associated with Type 2 von Willebrand disease, can impair binding of factor VIII with von Willebrand factor and thus may be associated with symptoms and various other-assay metrics that mimic those of hemophilia A. Similarly, quantitative defects—where levels are von Willebrand factor are low—can result in reduced binding capacity of factor VIII.

II.B.8. Factor Activity and Diagnosis Criteria

Factor activity can thus be measured using a variety of techniques, including PTT assays, aPTT assays, chromogenic factor assays, or enzyme immunoassay methods. The measured activity can be compared to one or more thresholds set based on normal factor levels. If the measured activity is below a threshold and alternative explanations for the reduced activity are ruled out via other assays (e.g., via indications of normal plasma counts, normal von Willebrand factor activity, an absence of a clotting inhibitor, etc.), the data may be consistent with and/or indicative of a diagnosis a subject with hemophilia or a sub-type of hemophilia.

Decreased factor VIII activity observed (e.g., below a normal-range threshold, such as below 50% or 40% of a normal level) is consistent with hemophilia A. However, as indicated above, reduced factor VIII activity may also be attributed to one or more other mutations, bleeding disorders or diseases. Factor VIII levels can depend on factors, such as body mass index, glucose (e.g., diabetes mellitus), insulin, fibrinogen, triglycerides, age, contraceptive use, pregnancy and various diseases (e.g., renal disease, hyperthyroidism and liver disease). In some instances, if a potentially confounding condition is known, the clotting time of the subject may be compared to a reference clotting time generated based on a control plasma from individuals with the same or similar conditions and/or a normalization of the subject's level (or of the reference thresholds) may be performed. Alternatively, another test may be performed when an alternative explanation is not applicable (e.g., when a subject is no longer pregnant).

Decreased factor IX activity observed (e.g., below a normal-range threshold, such as below 50% or 40% of a normal level) is consistent with hemophilia B. However, as indicated above, reduced factor IX activity may also be attributed to one or more other mutations, bleeding disorders or diseases. Factor IX levels can also depend on other factors, such as pregnancy, liver disease, heparin use, warfarin use, or disseminated intravascular coagulant use. In some instances, if a potentially confounding condition is known, the clotting time of the subject may be compared to a reference clotting time generated based on a control plasma from individuals with the same or similar conditions and/or a normalization of the subject's level (or of the reference thresholds) may be performed. Alternatively, another test may be performed when an alternative explanation is not applicable (e.g., when a subject is no longer pregnant or when a subject has not received heparin or warfarin for at least a defined period of time).

Decreased factor XI activity observed (e.g., below a normal-range threshold, such as below 70% or 50% of a normal level) is consistent with hemophilia C. However, reduced factor XI activity may also be attributed to one or more other mutations, bleeding disorders or diseases (e.g., Noonan syndrome).

II.C. Genetics of Hemophilia

Hemophilia is generally congenital (e.g., for approximately ⅔ of hemophilia A cases and approximately ⅘ of hemophilia B cases) but may alternatively be acquired. Congenital hemophilia A and B are recessive diseases associated with the X chromosome (with hemophilia A corresponding to one or mutations in the FVIII gene and hemophilia B corresponding to one or more mutations in the FIX gene). Males have a single X chromosome, while females have two. Thus, the vast majority of people with congenital hemophilia are male. Meanwhile, females with FIX or FVIII mutations can be carriers of hemophilia.

On occasion, a female can present with hemophilia A or B. For example, a female may have hemophilia A or B as a result of having an affected father or carrier mother or by having a disorder that results in only having one X chromosome (e.g., Turner's syndrome). As another example, a female may be diagnosed with hemophilia even though she has FIX or FVIII mutations in only one of her two X chromosomes. Bleeding symptoms may arise due to lyonization or partial inactivation of normal X chromosome functioning. If a level of factor VIII or IX is below a particular threshold (e.g., 40%), the hemophilia diagnostic criteria is satisfied.

Hemophilia C corresponds to one or more recessive chromosome 4 mutations. Thus, approximately the same number of females have hemophilia C as the number of males who have hemophilia C. The highest prevalence of hemophilia C has been observed among people of Ashkenazi or Iraqi Jewish decent.

II.C.1. Genetic Counseling and Hemophilia

Genetic counseling can be used to inform parents as to the probability that a child will have hemophilia when one or both parents are hemophiliacs and/or carriers. For example, if a father has hemophilia A or B and a mother is not a carrier, each daughter will be a carrier, and each son will be neither a hemophiliac nor a carrier. Meanwhile, if a mother is a carrier of hemophilia A or B and a father is not a hemophiliac, each son has a 50% chance of having a hemophilia A or B (and each daughter has a 50% chance of being a carrier). If a father has a hemophiliac and a mother is a carrier, each offspring has a 50% chance of being a hemophiliac (regardless as to whether the offspring is a daughter or son). Beyond these congenital probabilities, it is possible that hemophilia presents in response to a spontaneous mutation (which accounts for ⅓ of hemophilia A cases and ⅕ of hemophilia B cases).

Genetic counseling may further be used to predict a potential severity of an offspring's hemophilia. For example, genotypes that are typically associated with the severe phenotype include: FVIII intron 22 inversion; FVIII intron 1 inversion mutation, FVIII intron 22 inversion mutation, nonsense point mutations in FVIII or FIX (resulting in new stop codons); and splice junction mutations in the FIX gene. Factor IX missense mutations are characteristic of the mild or moderate phenotype, and a single-base mutation in the 5' promoter region of factor VIII is associated with the mild phenotype.

II.C.2. Prenatal/Infant Testing for Hemophilia

Prenatal or infant testing may be performed when a mother is identified as a carrier of hemophilia, when either parent has hemophilia, of if linkage has been established in the family. Amniotic fluid (e.g., collected from a uterus via amniocentesis at approximately 16-20 weeks of gestation) or cord blood (e.g., collected at approximately 20 weeks of gestation or at birth) may be used to determine whether a subject (e.g., a fetus or newborn) has hemophilia, to identify a hemophilia sub-type for the subject, and/or to determine whether the subject is a carrier of hemophilia. With regard to chorionic villus sampling, a small sample is collected from the placenta at the uterus-wall attachment (e.g., at approximately 10-12 weeks of gestation). The amniotic-fluid, cord-blood or placenta sample can be used to perform genetic sequencing to establish whether hemophilia mutations are present.

Cord-blood testing can be sufficient to diagnosis a subject with hemophilia A at birth. However, factor IX is dependent on vitamin K and is generally present at reduced levels at birth. Thus, frequently, subjects suspected of having hemophilia B (e.g., due to familial history) are diagnosed at a later time (e.g., around 6 months of age), particularly when the subjects have a mild form of hemophilia B. Factor XI is also lower at birth and reach relatively normal levels around 6 months of age.

II.D. Hemophilia Treatments

Hemophilia treatment can include prophylactic treatment that is administered at regular intervals or continuously; manifestation (or episodic) treatment that is administered in response to a clinically evident bleeding event or surveillance for complication mitigations.

II.D.1. Prophylactic Treatments

Prophylactic treatment can be administered using a schedule that is not tied to bleeding events. Prophylactic treatment may be administered to subjects with severe hemophilia and potentially to subjects with moderate hemophilia. Prophylactic treatment generally is not provided to subjects with hemophilia C, subjects with mild hemophilia and potentially to subjects with moderate hemophilia.

Continuous prophylactic treatment may be delivered more frequently than 45 times per year. Continuous prophylactic treatment can be segregated into primary prophylactic treatment (initiated without indication of current or recent bone or joint bleed and without two bleeds in large joints having occurred); secondary prophylactic (initiated after two or more bleeds in large joints occurred and without joint disease having initiated); or tertiary prophylactic (e.g., initiated after detection of joint disease). Primary prophylactic treatment may include infusions multiple times per week. Intermittent prophylactic treatment may be delivered to prevent a bleeding episode but may be delivered less than 46 weeks per year.

Prophylactic treatment can include administration of the factor for which a subject is deficient (e.g., recombinant factor, plasma-derived factor). The recombinant product may be particularly beneficial for individuals with more severe mutations (e.g., Intron 22 inversion), while purified non-recombinant product may be suitable for individuals with less severe mutations. The administered factor can include a factor concentrate. The dosage of prophylactic treatments may be determined based on disease severity. One problem with this approach is that subjects (even corresponding to a same disease severity) exhibit different pharmacokinetics, such that a given dose administered to comparable subjects may have different half-lives, clearance and in vivo recovery. Further, the half-lives of factor VIII and IX are relatively short, such that the factor concentrate is frequently administered (intravenously) multiple times (e.g., three times) per week.

More recently, tailored regimens have become more frequently used. A pharmacokinetic computer simulation can be trained using data from a population of subjects. Select subject attributes and/or laboratory measurements corresponding to a particular subject and then be fed to the trained model, which can identify a recommended dosage and/or treatment schedule.

Subject-specific measurements that are used to train the model and/or input for a particular subject may include a pharmacokinetic curve that includes a time series of factor levels relative to a time of a bolus. The model may be used to iteratively identify dosing and/or treatment-schedule recommendation based on (for example) recent factor levels from a subject (e.g., part or all of a recent pharmacokinetic curve) and/or a target minimum (or trough) factor level. The model may use a Bayesian analysis to generate these recommendations. The model's outputs may further depend on one or more other dynamic or static subject attributes, such as weight, a blood type and/or von Willebrand factor level.

Laboratory measurements that are used to train the model, processed by the model (e.g., to generate subject-specific outputs) and/or monitored for any treatment assessment can include factor levels measured at particular time intervals relative to a treatment administration. The level and time interval can be analyzed to determine whether to recommend changing a dosage or treatment schedule.

In some instances, the factor levels are trough levels. Trough-level testing can include identifying minimum factor levels. Minimum factor levels are most likely to be present right before a prophylactic of maintenance treatment is administered. Thus, a blood draw may be collected just prior to the treatment to identify this level. It may be advantageous to keep trough factor levels above a particular threshold (e.g., 1%, 5%, 10% or 15%) of baseline factor activity. If the trough is below the threshold, dosage of a treatment and/or a treatment identity may be adjusted.

Gene therapy has been recently explored as another approach for increasing factor levels. This approach includes using a vector of modified virus (e.g., adeno-associated viral vector) to introduce an unmutated FVIII gene or FIX gene into cells of the subject. This viral introduction is designed to trigger production of the same genes by the subject, such that sustained levels of the clotting factor is increased without regular bolus treatments. Current gene therapies being studied for hemophilia B include AMT-060, AMT-061, FLT180a, SB-FIX, and SPK-9011. Current gene therapies being studied for hemophilia A include SPK-8001, SPK-8016, BMN 270 and SB-525.

For subjects with acquired hemophilia, a therapy designed to reduce or eradicate the active inhibitor may be administered. The therapy may include an immunosuppressive, a steroid, a chemotherapeutic agent (e.g., cyclophosphamide), rituximab, a calcineurin inhibitor and/or mycophenolate mofetil. Dosage of the therapy may be slowly tapered and/or iteratively adjusted to support factor levels within a target open or closed range (e.g., above a threshold).

Some research efforts have attempted to identify hemophilia therapies that are not based on factor replacement. Such approaches may reduce or avoid the risk of subjects developing inhibitors (and thus becoming less responsive to therapy). For example, emicizumab is a bispecific antibody that binds to factor IXa and factor X, thereby mimicking factor VIII. As another example, desmopressin acetate triggers release of factor VIII from tissues. As yet another example, a multi-specific antibody (e.g., Q499-z121-J327-z119/L404-k) that includes a first antigen-binding site that binds to a coagulation factor (e.g., factor IX and/or activated factor IX) and a second antigen-binding site that binds to coagulation factor X can be administered with factor IX to serve as a functional substitute for factor VIII.

II.D.2. Manifestation Treatments

A hemophilia manifestation can include an instance during which a subject experiences unexplained or excessive bleeding; prolonged, large or deep bruises; and/or joint abnormalities (e.g., swelling, pain or tightness). The manifestation may be treated in order to slow or stop the bleeding by facilitating blood clotting. Hemophilia manifestations are typically treated across all types of hemophilia. The treatment may include administering (e.g., intravenously) plasma-derived or recombinant factor (e.g., factor VIII or factor IX), which can include a concentrated version thereof. More recent treatment options include extended half-life factor concentrates (e.g., that fuse polyethylene glycol, IgG1-Fc or albumin to the factor); bispecific antibodies (e.g., Emicizumab that partially mimics factor VIIIa with respect to binding to factor IX and factor X) and agents that activate anti-coagulant pathways. Provision of the treatment soon after the manifestation begins can reduce the likelihood that blood will enter a subject's joints, reduce an amount of blood introduced to a subject's joints and/or reduce the likelihood that bleeding will disrupt an essential bodily function (e.g., breathing).

A target proposed by the World Federation of Hemophilia is for manifestation treatment to be administered within two hours of an onset of a bleeding event. Blood in the joint can otherwise result in iron in synovial of the joint and subsequent macrophage recruitment, resulting in soft-tissue damage and later to damage to the cartilage and bone. Joint damage can result in chronic pain, reduced range of movement, and activity impairment. Symptoms that may indicate that a subject is experiencing bleeding in a joint can include joint pain, joint tingling, a feeling of bubbling in the joint, movement resistance in the joint of joint aching. A target joint is defined as a joint that has at least three spontaneous bleeds within a six-month period. Each bleed can result in new friable vessels, which are prone to spontaneous bleeding, resulting in a positive-feedback circumstance that may result in permanent joint damage.

Other bleeds that may correspond to medical emergencies requiring prompt treatment (e.g., via concentrated factor, factor concentrate and/or blood transfusion) include intracranial bleeds, central nervous system bleeding and/or bleeding under the tongue (e.g., especially in children due to smaller airways).

Muscles bleeds and nasal bleeds should also be responded to with prompt treatment. Muscle bleeds are a prominent cause of disability for hemophiliac subjects. More specifically, a muscle hematoma may trigger a large mobility-restricting muscle spasm, superficial ecchymosis and inflammation.

Excessive bleeding following surgery, circumcision or tooth extraction is common for hemophiliacs. A coagulation factor and potentially an antifibrinolytic agent may be administered prior to and after the procedure, when a medical care provider is aware of the subject's hemophilia.

In general, a dosage and/or schedule manifestation treatment may be prescribed in an effort to maintain a level of one or more factors to not drop below a given manifestation lower threshold. The threshold may be determined based on a type of hemorrhage. For example, a lower threshold of factor VIII may be set to 30% of a normal-subject baseline value for early hemarthrosis, gingival bleeding and epistaxis, while the threshold may be set to 50% for late treatment of a hemorrhage or a muscle bleed, and a critical bleeding episode may be associated with an 80% threshold. A dosage may be calculated based on the lower threshold, a current factor level and a subject's weight.

In some instances, additional or alternative treatment is provided in response to a manifestation. For example, the additional or alternative treatment can facilitate cessation of bleeding. The additional or alternative treatment may include (for example) desmopressin acetate (DDAVP) or vasopressin can facilitate stopping bleeding. DDAVP is often administered in response to muscle or joint bleeds, mucous-membrane bleeds and for surgeries. Other agents, such as aminocaprioic acid, can be used to inhibit breaking down blood clots.

Administering treatment in response to bleeding exhibited by subjects with acquired hemophilia is complicated by the fact that the relationship between inhibitors and kinetics are nonlinear and multi-phase, with a first phase exhibiting rapid inactivation and a second phase exhibiting more consistency. Minor bleeds may resolve on their own, be treated using factors (e.g., plasma-derived or recombinant factors) or using DDAVP or vasopressin. Major bleeds may be treated using DDAVP, vasopressin, or a bypassing agent (e.g., plasma-derived activated prothrombin complex concentrate or recombinant activated factor VII). A bypassing agent may cause generation of thrombin and thus result in hemostasis. To date, bypassing agents are not highly predictable in terms of efficacy.

II.E. Hemophilia Monitoring

As mentioned above, one type of monitoring frequently performed is monitoring factor levels at various times at medication administration (to potentially adjust doses and/or a schedule of treatment).

Notably, factor activity levels may be less informative when evaluating newer non-factor therapies (e.g., emicizumab or fitusiran). For example, while results from aPTT-based 1-stage clotting assay and results from 2-stage chromogenic activity assay typically similarly scale based on an amount of factor activity, results from these two assays do not exhibit the same correspondence for non-factor therapies. The aPTT-based 1-stage clotting assay may not produce factor activity level results that monotonically relate to concentrations of non-factor treatments, whereas this type of relationship is observed using the chromogenic assay. These results may be a result of emicizumab not triggering factor-VIII-typical actions, such as phospholipid binding, thrombin activation or APC inactivation. One approach for monitoring non-factor therapies is to monitor a thrombin generation assay parameter (e.g., peak thrombin), such as a parameter from a reaction initiated using a non-standard factor XIa. Another approach for monitoring non-factor therapies is to use a chromogenic factor assay (e.g., using all human reagents). A result may then be scaled using a conversion factor to estimate a metric corresponding to traditional factor activity levels. Yes another approach is to measure a level of the active agent of the therapy (e.g., using an ELISA-based assay).

Another type of monitoring frequently performed is to determine whether a subject with hemophilia has developed factor inhibitors. Approximately 20% of hemophilia A subjects and approximately 3% of hemophilia B subjects develop inhibitors to clotting-factor treatment products.

Inhibitor testing may be performed to determine whether and/or an extent to which a subject has developed inhibitors against a clotting factor. Prior to the inhibitor testing, the subject may (depending on the testing design) undergo a washout period (e.g., or 1, 2 or 3 days), during which a factor treatment is not received. Alternatively, a heat treatment of a sample may be performed. To determine whether a subject has developed inhibitors, two samples may be collected: one before a treatment (e.g., of a plasma-derived or recombinant factor) is administered and one after. A shorter half-life of an infused factor may indicate inhibitor presence. Inhibitor screening may be performed on a regular basis and/or based on scheduled or unscheduled invasive or intensive procedures.

Some non-factor therapies (e.g., emicizumab) interfere with Bethesda assay measurements. An alternatively approach is to use a chromogenic-based inhibitor assay (e.g., using bovine reagents), which may generate factor inhibitor levels.

If inhibitors are detected, the subject may undergo immune tolerance induction. During immune tolerance induction, high doses of factor concentrate. Immune tolerance induction is successful in eliminating an inhibitor for about 70% of hemophilia A subjects and about 30% of hemophilia B subjects, though the timeline for the removal varies markedly across subjects (e.g., between months to years). Immune tolerance induction includes repeatedly administering a factor (or factor concentrate). The treatment regimen may be fixed or tailored from the onset to a subject's prognostic status. Treatment regimens vary based on dosage (e.g., 25 U/kg, 50 U/kg or 100 U/kg) and/or frequency (e.g., daily, twice a week or three times per week).

In some instances, rather than undergoing immune tolerance induction (or upon a failure of the same), manifestation and/or prophylactic treatment may instead by adjusted to use bypassing agents in lieu of factor concentrates. A bypassing agent can include (for example) FEIBA, NovoSeven RG or Obizur. In some instances, a bypassing agent includes a recombinant factor.

Some treatments (e.g., non-factor therapies) may result in development of antibodies to the treatment. Detecting a prolonged time from a conventional aPTT assay and/or a low activity metric from a factor clot-based assay or chromogenic assay is consistent with development of antibodies and may indicate that further assays to investigate potential antibody presence are warranted.

II. Network Environment for Hosting the Cloud-Based Application Configured with Intelligent Functionality FIG. 1 illustrates network environment 100, in which an embodiment of the cloud-based application is hosted. Network environment 100 may include cloud network 130, which includes cloud server 135 and data registry 140. Cloud server 135 may execute the source code underlying the cloud-based application. Data registry 140 may store the data records ingested from or identified using one or more user devices, such as computer 105, laptop 110, and mobile device 115.

The data records stored in data registry 140 may be structured according to a skeleton structure of fixed parts (e.g., data elements). Computer 105, laptop 110, and mobile device 115 may each be operated by various users. For example, computer 105 may be operated by a physician, laptop 110 may be operated by an administrator of an entity, and mobile device 115 may be operated by a subject. Mobile device 115 may connect to cloud network 130 using gateway 120 and network 125. In some examples, each of computer 105, laptop 110, and mobile device 115 are associated with the same entity (e.g., the same hospital). In other examples, computer 105, laptop 110, and mobile device are associated with different entities (e.g., different hospitals). The user devices of computer 105, laptop 110, and mobile device 115 are examples for the purpose of illustration, and thus, the present disclosure is not limited thereto. Network environment 100 may include any number or configuration of user devices of any device type.

In some embodiments, cloud server 135 may obtain data (e.g., subject records) for storing in data registry 140 by interacting with any of computer 105, laptop 110, or mobile device 115. For example, computer 105 interacts with cloud server 135 by using an interface to select subject records or other data records stored locally (e.g., stored in a network local to computer 105) for ingesting into data registry 140. As another example, computer 105 interacts with an interface to provide cloud server 135 with an address (e.g., a network location) of a database storing subject records or other data records. Cloud server 135 then retrieves the data records from the database and ingests the data records into data registry 140.

In some embodiments, computer 105, laptop 110, and mobile device 115 are associated with different entities (e.g., medical centers). The data records that cloud server 135 obtains from computer 105, laptop 110, and mobile device 115 may be stored in different data registries. While the data records from each of computer 105, laptop 110, and mobile device 115 may be stored within cloud network 130, the data records are not intermingled. For example, computer 105 cannot access the data records obtained from laptop 110 due to the constraints imposed by data-privacy rules. However, cloud server 135 may be configured to automatically obfuscate, obscure, or mask portions of the data records when those data records are queried by a different entity. Thus, the data records ingested from an entity may be exposed to a different entity in an obfuscated, obscured, or masked form to comply with data-privacy rules.

Once the data records are collected from computer 105, laptop 110, and mobile device 115, the data records may be used as training data to train machine-learning or artificial-intelligence models to provide the intelligent analytical functionality described herein. The data records may also be available for querying by any entity, given that when a user device associated with an entity queries data registry 140 and the query results include data records originating from a different entity, those data records may be provided or exposed to the user device in an obfuscated form, which complies with data-privacy rules.

Cloud server 135 may be configured in a specialized manner to execute code that, when executed, causes intelligent functionality to be performed using transformed representations of subject records (e.g., a vector that numerically represent the information stored in a subject record). For example, intelligent functionality may be performed by executing code using cloud server 135. The executed code may represent a trained neural network model. The neural network model may have been trained to perform intelligent functions, such as predicting a subject's responsiveness to a treatment regimen, identifying similar patients, generating a recommendation of a treatment regimen for a patient, and other intelligent functionality. The neural network model may be trained using a training data set that includes subject records of subjects who have previously been treated for a condition and experienced an outcome (e.g., overcoming a condition, increasing a severity of a condition, reducing a severity of a condition, and so on). Additionally, the executed code may be configured to cause cloud server 135 to transform non-numerical values of existing subject records into numerical representations (e.g., a transformed representation), which can be processed by the trained neural network model. For example, the code executed by cloud server 135 can be configured to receive as input each subject record of a set of subject records, and for each subject record, the code, when executed, can cause cloud server 135 to perform the operations described herein for transforming each data element of each subject record into a transformed representation, such as a vector representation. Executing intelligent functionality may include inputting at least a portion of the data records stored in data registry 140 into a trained machine-learning or artificial-intelligence models to generate outputs for further analysis. In some embodiments, the outputs can be used to extract patterns within the data records or to predict values or outcomes associated with data fields of the data records. Various embodiments of the intelligent functionality executed by cloud server 135 are described below.

In some embodiments, cloud server 135 is configured to enable a user device (e.g., operated by a doctor) to access the cloud-based application to transmit consult broadcasts to a set of destination devices. A consult broadcast may be a request for support or assistance regarding the treatment of a subject associated with a subject record. A destination device may be a user device operated by another user associated with another entity (e.g., a doctor at another medical center). If a destination device accepts the request for assistance associated with the consult broadcast, the cloud-based application may generate a condensed representation of the subject record that omits or obscures certain data fields of the subject record. The condensed representation may comply with data-privacy rules, and thus, the condensed representation of the subject record cannot be used to uniquely identify the subject associated by the subject record. The cloud-based application may transmit the condensed representation of the subject record to the destination device that accepted the request for assistance. The user operating the destination device may evaluate the condensed representation and communicate with the user device using a communication channel to discuss options for treating the subject. For example, the communication channel may be configured as a secure chatroom that enables the user device (e.g., operated by the doctor requesting the consult) to securely communicate with the destination device (e.g., operated by the other doctor providing the consult).

In some embodiments, cloud server 135 is configured to provide a treatment-plan definition interface to user devices. The treatment-plan definition interface enables user devices to define a treatment plan for a condition. For example, a treatment plan may be a workflow for treating a subject with the condition. A workflow may include one or more criteria for defining a population of subjects as having the condition. The workflow may also include a particular type of treatment for the condition. The cloud server 135 receives and stores treatment-plan definitions for a particular condition from each user device of a set of user devices. The cloud-based application may distribute a treatment plan for a given condition to a set of user devices. Two or more user devices of the set of user devices may be associated with different entities. Each of the two or more user devices may be provided with the option to integrate any portion or the entire treatment plan into a customer rule set. Cloud server 135 can monitor whether user devices integrate the shared treatment plan in full or integrate part of the treatment plan. The interactions between the user devices and the shared treatment plan can be used to determine whether to update the treatment plan or a rule created based on the treatment plan.

In some embodiments, cloud server 135 enables a user operating a user device to access the cloud-based application to determine a proposed treatment for a subject with a condition. The user device loads an interface associated with the cloud-based application. The interface enables the user operating the user device to select a subject record associated with a subject being treated by the user. The cloud-based application may evaluate other subject records to identify a previously-treated subject who is similar to the subject being treated by the user. The similarity between subjects, for example, may be determined using an array representation of the subject records. An array representation (e.g., a transformed representation, such as a vector, an N-dimensional matrix, or any numerical representation of a non-numerical value) may be any numerical and/or categorical representation of the values of data fields of a subject record. For example, an array representation of a subject record may be a vector representation of the subject record in a domain space, such as in a Euclidean space. In some instances, cloud server 135 may be configured to transform an entire subject record into a numerical representation, such as a vector. For a given subject record, cloud server 135 may evaluate each data element to determine the type of data contained or included in that data element. The type of data may inform the cloud server 135 as to which process or technique to perform to transform the numerical or non-numerical values of that data element into a numerical representation. As an illustrative example, cloud server 135 may transform non-numerical values (e.g., the text of a physician's notes) of a data element of a subject record into a numerical representation (e.g., a vector). The transformation may include using natural language processing techniques, such as Word2Vec or other text vectorization techniques, to generate a numerical value that represents each word of text. The generated numerical value may serve as a vector that can be inputted into a trained neural network to perform intelligent analysis. As another illustrative example, for data elements that include images (e.g., MM data) or image frames of a video (e.g., a video data of an ultrasound), each image or image frame may be transformed into a numerical representation (e.g., vector) using a trained auto-encoder neural network, which is trained to generate a latent-space representation of an input image. The condensed representation of the input image (e.g., the latent-space representation) may serve as the numerical representation of the input image. This numerical representation can be inputted into a neural network or other machine-learning model to perform intelligent analysis of the associated subject record. As yet another example, for data elements that include a time-variant sequence of information (e.g., events occurring or measurements taken from a subject over a period of time), the time-variant information can be represented as a numerical representation using several exemplary transformations. In some instances, the count of events may be used as the vector representing the time-variant information. For example, if a measurement was taken with respect to a subject four times in one year, the numerical representation may be "4." In other instances, the frequency or rate of events occurring (e.g., per week, per month, per year, etc.) may be used as the vector representing the time-variant information. In still other instances, an average or combination of the measurement values associated with each event in the time-variant information can be used as the vector representing the time-variant information. The present disclosure is not limited to these examples, and thus, other numerical representations of time-variant information can be used as the vector that represents the numerical representation.

In some instances, multiple values in an array representation correspond to a single data element or data field. For example, a value of a data element may be represented by multiple binary values generated via one-hot encoding. As another example, each value of the multiple values in a single data element of a subject record may be individually transformed into a numerical representation, as described above. The numerical representation that represents each value of the multiple values can be combined into a single numerical representation that corresponds to the data element. Combining multiple numerical representations may be performed using any vector combination techniques, such as averaging vector magnitudes, adding vectors, or concatenating multiple vectors into a single vector. In some instances, the cloud-based application may generate array representations for each subject record of a group of subject records. Similarity between two subject records may be represented by comparing the two array representations to determine a distance between them. Subject records can also be compared along a dimension (e.g., a data element), instead of comparing a numerical representation of an entire subject record with another numerical representation of another subject record. For example, comparing two subject records along a dimension may include comparing the numerical representation of a data element of a subject record with another numerical representing of a matching data element of another subject record. Further, the cloud-based application may be configured to identify a subject who is a nearest neighbor to the subject record selected by the user device using the interface. The nearest neighbor may be determined by comparing the numerical representations of the various subject records with the numerical representation of a target subject record. The cloud-based application may identify treatments previously performed on the subject who is the nearest neighbor. The cloud-based application may avail on the interface the previously-performed treatments on the nearest neighbor.

In some embodiments, cloud server 135 is configured to create queries that search a database of previously-treated subjects. Cloud server 135 may execute the queries and retrieve subject records that satisfy the constraints of the query. In presenting the query results, however, the cloud-based application may only present the subject record in full for subjects who have been or who are being treated by the user who created the query. The cloud-based application masks or otherwise obfuscates portions of subject records for subjects who are not being treated by the user creating the query. The masking or obfuscation of portions of subject records that are included in the query results enables the user to comply with data-privacy rules. In some embodiments, the query results (regardless of whether the query results are obfuscated or not) can be automatically evaluated for patterns or common attributes within the subject records.

In some embodiments, cloud server 135 embeds a chatbot into the cloud-based application. The chatbot is configured to automatically communicate with user devices. The chatbot can communicate with a user device in a communication session, in which messages are exchanged between the user device and the chatbot. A chatbot may be configured to select answers to questions received from user devices. The chatbot may select answers from a knowledge base accessible to the cloud-based application. When a user device transmits a question to the chatbot, and that chatbot does not have a preexisting answer stored in the knowledge base, then a different representation of the question for which there is a preexisting answer stored in the knowledge base. The user communicating with the chatbot can be prompted as to whether the answer provided by the chatbot is accurate or helpful.

It will be appreciated that any machine-learning or artificial-intelligence algorithms may be executed to generate any of the trained machine-learning models described herein. Various different types and technologies of artificial-intelligence-based and machine-learning models may be trained and then executed to generate one or more outputs predictive of user outcomes for performing a protocol or function. Non-limiting examples of models include Naïve Bayes models, random forest or gradient boosting models, logistic regression models, deep learning neural networks, ensemble models, supervised learning models, unsupervised learning models, collaborative filtering models, and any other suitable machine-learning or artificial intelligence models.

It will be appreciated that the cloud-based application can be configured to perform intelligent functionality with respect to consulting external physicians, determining diagnosis and proposing treatment for any disease, condition, area of study, or disorder, including, but not limited to, COVID-19, oncology, including cancers of the lung, breast, colorectal, prostate, stomach, liver, cervix uteri (cervical), esophagus, bladder, kidney, pancreas, endometrium, oral, thyroid, brain, ovary, skin, and gall bladder; solid tumors, such as sarcomas and carcinomas, cancers of the immune system including lymphomas (such as Hodgkin or non-Hodgkin), and cancers of the blood (hematological cancers) and bone marrow, such as leukemias (such as Acute lymphocytic leukemia (ALL) and Acute myeloid leukemia (AML)), lymphomas, and myeloma. Additional disorders include blood disorders such as anemia, bleeding disorders such as hemophilia, blood clots, ophthalmology disorders, including diabetic retinopathy, glaucoma, and macular degeneration, neurological disorders, including multiple sclerosis, Parkinson's, disease, spinal muscular atrophy, Huntington's Disease, amyotrophic lateral sclerosis (ALS), and Alzheimer's Disease, autoimmune disorders, including multiple sclerosis, diabetes, systemic lupus erythematosus, myasthenia gravis, inflammatory bowel disease (IBD), psoriasis, Guillain-Barre syndrome, Chronic inflammatory demyelinating polyneuropathy (CIDP), Graves' disease, Hashimoto's thyroiditis, eczema, vasculitis, allergies and asthma.

Other diseases and disorders include but are not limited to kidney disease, liver disease, heart disease, strokes, gastrointestinal disorders such as celiac disease, Crohn's disease, diverticular disease, Irritable Bowel Syndrome (IBS), Gastroesophageal Reflux Disease (GERD) and peptic ulcer, arthritis, sexually transmitted diseases, high blood pressure, bacterial and viral infections, parasitic infections, connective tissue diseases, celiac disease, osteoporosis, diabetes, lupus, diseases of the central and peripheral nervous systems, such as Attention deficit/hyperactivity disorder (ADHD), catalepsy, encephalitis, epilepsy and seizures, peripheral neuropathy, meningitis, migraine, myelopathy, autism, bipolar disorder, and depression.

Figure 2:
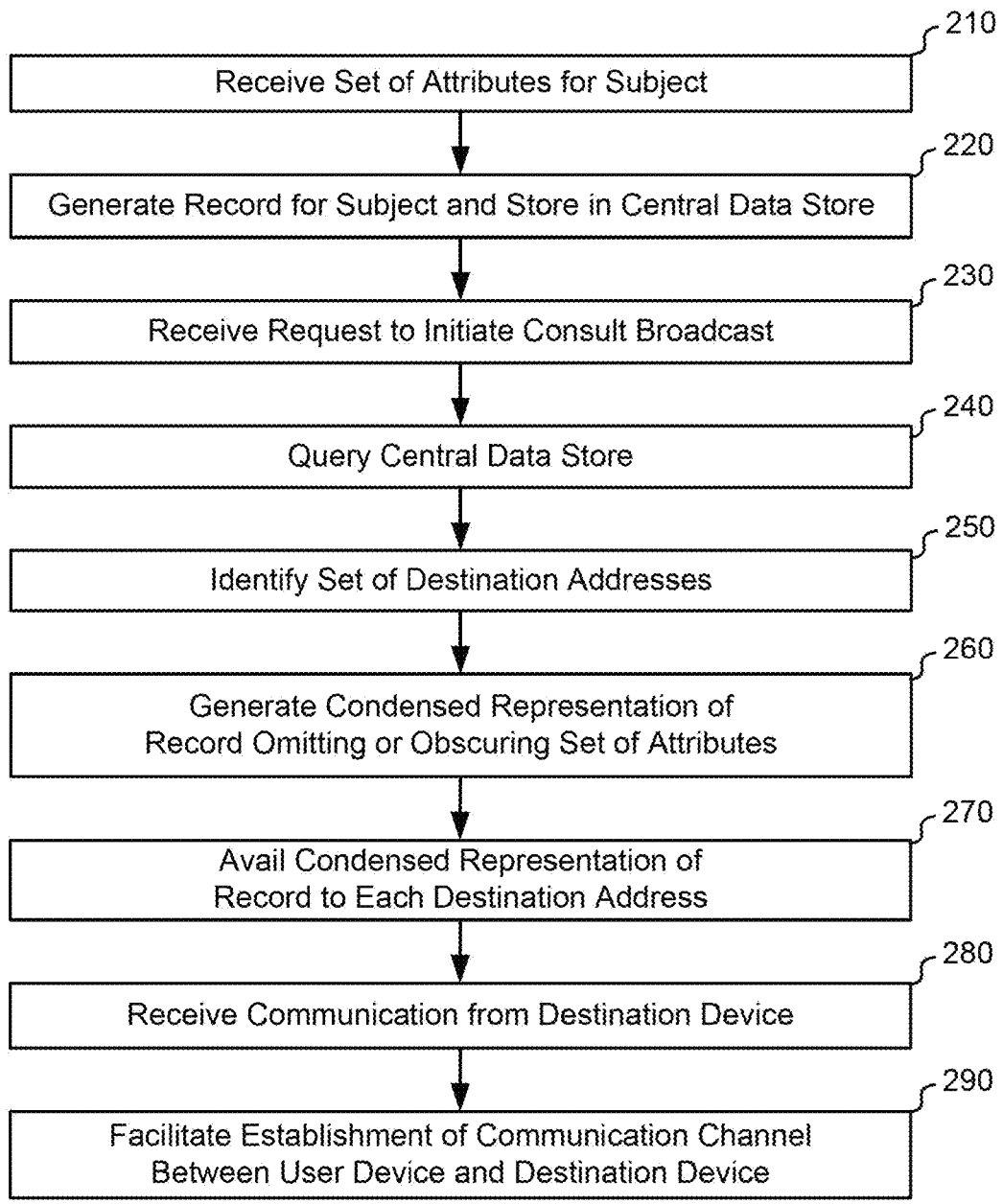
FIG. 2 is a flowchart illustrating an example of a process performed by the cloud-based application to distribute condensed subject records to user devices in association with a consult broadcast requesting assistance with treating a subject, according to some aspects of the present disclosure.

II.A. The Cloud-Based Application Enables User Devices to Broadcast Consult Requests to Other User Devices and Automatically Condenses Subject Records to Comply with Data-Privacy Rules FIG. 2 is a flowchart illustrating process 200 performed by the cloud-based application to distribute condensed subject records to user devices in association with a consult broadcast requesting assistance with treating a subject. Process 200 may be performed by cloud server 135 to enable user devices associated with different entities (e.g., hospitals) to collaborate or consult regarding treatment for a subject, while complying with data-privacy rules.

Process 200 begins at block 210 where cloud server 135 receives a set of attributes from a user device. Each attribute of the set of attributes can represent any characteristic(s) of a subject (e.g., a patient). The set of attributes may be identified by a user using an interface provided by cloud server 135. For example, the set of attributes identify demographic information of the subject and a recent symptom experienced by the subject. Non-limiting examples of demographic information include age, sex, ethnicity, state or city of residence, income range, education level, or any other suitable information. Non-limiting examples of a recent symptom include a subject currently or recently (e.g., at a last visit, at intake, within 24 hours, within a week) experienced a particular symptom (e.g., difficulty breathing, fever above a threshold temperature, blood pressures above a threshold blood pressure, etc.).

At block 220, cloud server 135 generates a record for the subject. The record may be a data element including one or more data fields. The record indicates each of the set of attributes associated with the subject. The record may be stored at a central data store, such as data registry 140 or any other cloud-based database. At block 230, cloud server 135 receives a request, which was submitted by a user using the interface. The request may be to initiate a consult broadcast. For example, the user associated with an entity is a physician at a medical center treating a subject. The user can operate a user device to access the cloud-based application to broadcast a request for assistance with treating the subject. The broadcast may be transmitted to a set of other user devices associated with a different entity.

At block 240, cloud server 135 queries the central data store using the one or more recent symptoms included in the set of attributes associated with a subject. The query results include a set of other records. Each record of the set of other records is associated with another subject. In some instances, cloud server 135 may query the central data store to identify other subject records that are similar to the subject record. Similarity may be determined by comparing the transformed representation of the entire subject record to the transformed representation of each other subject record. The comparison of the transformed representations may result in a distance (e.g., a Euclidean distance) that represents a degree of similarity between the two subject records. In other instances, similarity may be determined based on values included in a data element. For example, a target subject record may include a target data element including text that represents symptoms experienced by a subject. Each other subject record stored in the central data store may also include a data element including text that represents the symptoms of the associated subject. Cloud server 135 can transform the text included in the target data element into a numerical representation using techniques described above (e.g., a trained convolution neural network, a text vectorization technique, such as Word2Vec, etc.). The numerical representation of the text included in the target data element may be compared against the numerical representation of the text included in the matching data element of each other subject record. The result of the comparison (e.g., in a domain space, such as a Euclidean space) between two numerical representations may indicate a degree to which the text included in the target data element is similar to the text included in the data element of another subject record.

At block 250, cloud server 135 identifies a set of destination addresses (e.g., other user devices associated with a different entity). Each destination address of the set of destination address is associated with a care provider for another subject associated with one or more other records of the set of other records identified at block 240. At block 260, cloud server 135 generates a condensed representation of the record for the subject. The condensed representation of the record omits, obscures, or obfuscates at least a portion of the record. The condensed representation of the record can be exchanged between external systems without violating data-privacy rules because the condensed representation of the record cannot be used to uniquely identify the subject associated with the record. Cloud server 135 can execute any masking or obfuscation techniques to generate the condensed representation of the record.

At block 270, cloud server 135 avails the condensed representation of the record with a connection input component (e.g., a selectable link, such as a hyperlink, that causes a communication channel to be established) to each destination address of the set of destination addresses. The connection input component may be a selectable element presented to each destination address. Non-limiting examples of the connection input component include a button, a link, an input element, and other suitable selectable elements. At block 280, cloud server 135 receives a communication from a destination device associated with a destination address. The communication includes an indication that the user operating the destination device selected the connection input component associated with the condensed representation of the record. At block 290, cloud server 135 establishes a communication channel between the user device and the destination device at which the connection input component was selected. The communication channel enables the user operating the user device (e.g., the physician treating the subject) to exchange messages or other data (e.g., a video feed) with the destination device associated with the destination address at which the connection input component was selected (e.g., a physician at another hospital who agreed to assist with the treatment of the patient).

In some embodiments, cloud server 135 is configured to automatically determine a location of the user device and a location of the destination device at which the connection input component was selected. Cloud server 135 can also compare the locations to determine whether to generate the condensed representation of the record. For example, at block 260, cloud server 135 may generate the condensed representation of the record because cloud server 135 determines that each destination address of the set of destination addresses is not collocated with the user device that initiated the consult broadcast. In this case, cloud server 135 may automatically determine to generate the condensed representation of the record to comply with data-privacy rules. As another example, if the set of destination addresses is associated with the same entity as the user device that initiated the consult broadcast, then cloud server 135 can transmit the record in full (e.g., without obfuscating a portion of the record) to a destination device associated with a destination address, while still complying with the data-privacy rules.

In some embodiments, cloud server 135 generates a plurality of other condensed record representations. Each of the plurality of other condensed record representations is associated with another subject. Cloud server 135 transmits the plurality of other condensed record representations to the user device; and receives, from the user device, a communication identifying selections of a subset of the plurality of other condensed record representations. Each of the set of destination addresses is represented by one of the condensed record representations. For example, generating a condensed record representation includes determining a jurisdiction of another subject associated with the condensed record representation, determining a data-privacy rule governing the exchange of subject records within the jurisdiction, and generated the condensed record representation to comply with the data-privacy rule. A first other condensed record representation of the plurality of other condensed record representations may include data of a particular type. A second other condensed record representation of the plurality of other condensed record representations may omit or obscure data of the particular type. For example, data of the particular type may be contact information, identifying information, such as name, social security number, and other suitable information that can be used to uniquely identify the other subject.

In some implementations, a communication may be received at the central data store. The communication may be transmitted by a user device operated by a user and may include an identifier of a target subject record of a target subject. The communication, when received at the central data store, may cause the central data store to query the stored set of subject records to identify an incomplete subset of the set of subject records. Each subject record of the incomplete subset may be identified and included in the incomplete subset because the subject record is determined to be similar to the target subject record along at least one dimension. Similarity between two subject records along a dimension may represent similarity with respect to a data element of the subject records, such as similarity with respect to symptoms, diagnoses, treatments, or any other suitable data elements. The one or more dimensions, along which similarity or dissimilarity is determined, may be defined automatically or may be user defined. Determining a similarity or dissimilarity between the target subject record and each subject record of the set of subject records stored in the central data store may include at least the following operations: retrieving the target subject record based on the identifier included in the communication, generating a transformed representation of the target subject record (or retrieving the existing transformed representation of the target subject record), and performing a clustering operation using the transformed representation of the target subject record and the transformed representation of each subject record of the set of subject records. The clustering operation may be performed with respect to one or more dimensions (e.g., one or more features of a subject record). For example, the clustering operation may cluster the set of subject records stored in the central data store based on the data element that contains values representing a subject's symptoms. The transformed representation of the target subject record may include a vector representation of the data element that contains values representing the subject's symptoms. The vector representation of this data element of the target subject record and the vector representations of the corresponding data element in each subject record of the set of subject records may be compared to define clusters of subject records. Each cluster of subject records may define a group of one or more subject records that share a common characteristic associated with the data element selected as the dimension of similarity. In each cluster of subject records, a Euclidean distance may be computed between the transformed representation of the target subject record and the other transformed representations of the set of subject records. A subject record may be determined to be similar to the target subject record when, for example, the Euclidean distance between the transformed representation of the subject record and the transformed representation of the target subject record is within a threshold value.

Figure 3:
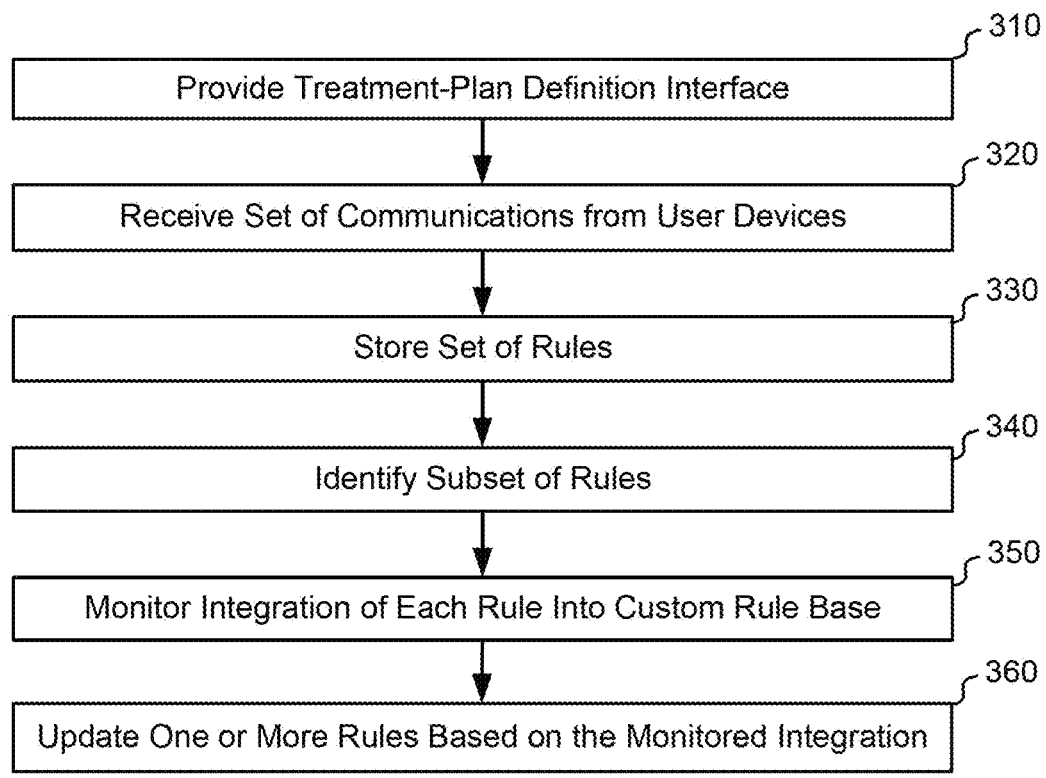
FIG. 3 is a flowchart illustrating an example of a process for monitoring the user integration of treatment-plan definitions (e.g., decision trees or treatment workflows) and automatically updating the treatment-plan definitions based on a result of the monitoring, according to some aspects of the present disclosure.

III.B. Updating Shareable Treatment-Plan Definitions Based on Aggregated User Integration FIG. 3 is a flowchart illustrating process 300 for monitoring the user integration of treatment-plan definitions (e.g., decision trees or treatment workflows) and automatically updating the treatment-plan definitions based on a result of the monitoring. Process 300 may be performed by cloud server 135 to enable a user device to define a treatment plan for treating a population of subjects with a condition. The user device may distribute the treatment-plan definition to user devices connected to internal or external networks. The user devices receiving the treatment-plan definition can determine whether to integrate the treatment-plan definition into a custom rule base. The integration into the custom rule base can be monitored and used to automatically modify the treatment-plan definition.

At block 310, cloud server 135 stores interface data that causes a treatment-plan definition interface to be displayed when a user device loads the interface data. The treatment-plan definition interface is provided to each user device of a set of user devices when the user devices accesses cloud server 135 to navigate to the treatment-plan definition interface. In some embodiments, the treatment-plan definition interface enables a user to define a treatment plan for treating a population of subjects that have a condition (e.g., hemophilia).

At block 320, cloud server 135 receives a set of communications. Each communication of the set of communications is received from a user device of the set of user devices and was generated in response to an interaction between the user device and the treatment-plan definition interface. In some embodiments, the communication includes one or more criteria, for example, for defining a population of subject records. Each criteria may be represented by a variable type. For example, variable type may be a value or variable used as the condition of a criteria. The variable type of a criterion of a rule may also be any value of a condition that constrains the population of subjects to an incomplete sub-group. For example, the variable type of a rule that defines a population of pregnant women is "IF 'subject is pregnant.'" A criterion may be a filter condition for filtering a pool of subject records. For example, a criteria for defining a population of subject records associated with subjects who likely have a severe form of hemophilia A may include a filter condition of "mutation on factor VIII gene" AND "level of clotting factor VIII being less than 0.01 IU/mL". The communication may also include a particular type of treatment for the condition. The particular type of treatment may be associated with an action (e.g., receive prophylactic treatment) or non-action (e.g., minimize non-essential surgeries) that is proposed to treat the condition associated with the subjects represented by the population of subject records.

At block 330, cloud server 135 stores a set of rules in a central data store, such as data registry 140 or any other centralized server within cloud network 130. Each rule of the set of rules includes the one or more criteria and the particular treatment type included in the communication from a user device. As an illustrative example, a rule represents a treatment workflow for treating hemophilia in a subject. The rule includes the following criteria (e.g., the conditions following the "IF" statement) and a next action (e.g., the particular treatment type defined or selected by the user, and which follow the "THEN" statement): "IF 'inhibitor titer is greater than 5 BU' AND 'spontaneous bleed within last month' THEN 'increase dosage of treatment', 'treat using bypassing agent' OR 'change treatment'". Additionally, each rule of the set of rules is stored in association with an identifier corresponding to the user device from which the communication was received.

At block 340, cloud server 135 identifies a subset of the set of rules that are available across entities via the treatment-plan definition interface. A subset of rules may include the subset of the set of rules associated with a condition and that are distributed to external systems, such as other medical centers, for evaluation. For example, a rule can be selected for including in the subset of rules by evaluating a characteristic of the rule or the identifier associated with the rule. The characteristic of the rule can include a code or flag stored or appended to the stored rule. The code or flag indicates the rule is generally available to external systems (e.g., availed to entities).

At block 350, for each rule of the subset of rules identified at block 340, cloud server 135 monitors interactions with the rule. An interaction may include an external entity (e.g., external to the entity associated with the user who defined the treatment plan associated with the rule) integrating the rule into a custom rule base. For example, a user device associated with an external entity (e.g., a different hospital) evaluates the rule availed to the external entity. The evaluation includes determining whether the rule is suitable for integrating into a rule set defined by the external entity. The rule may be suitable when the user device associated with the external entity indicates that the treatment workflow that is defined using the rule is suitable to treat the condition corresponding to the rule. Continuing with the illustrative example above, the rule for treating hemophilia may be availed to an external medical center. A user associated with the external medical center determines that the rule for treating hemophilia is suitable for integrating into the rule set defined by the external medical center. Thus, after the rule is integrated into a custom rule base defined by the external medical center, other users associated with the external medical center will be able to execute the integrated rule by selecting the integrated rule from the custom rule base. Additionally, cloud server 135 monitors integration of the availed rule by detecting a signal generated or caused to be generated when the treatment-plan definition interface receives input corresponding to an integration of the rule into the custom rule base from the user device associated with the external entity.

As another illustrative example, the user device associated with the external entity uses the treatment-plan definition to integrate an interaction-specified modified version of the rule into the custom rule base. The interaction-specified modified version of the rule is a portion of the rule selected for integration into the custom rule base. Selecting a portion of the rule for integration includes selecting less than all criteria included in the rule for integration into the custom rule base. Continuing with the illustrative example above, the user device associated with the external entity selects the criteria of "IF 'inhibitor titer is greater than 5 BU'" for integration into the custom rule base, but the user device does not select the criteria of "spontaneous bleed within last month" for integration into the custom rule base. Thus, the interaction-specific modified version of the rule integrated into the custom rule base is "IF 'inhibitor titer is greater than 5 BU' THEN 'increase dosage of treatment', 'treat using bypassing agent' OR 'change treatment'". The criteria of "spontaneous bleed within last month" is removed from the rule to create the interaction-specified modified version of the rule, which is integrated into the custom rule base.

At block 360, cloud server 135 may detect that the interaction-specified modified version of the rule was integrated into the custom rule base defined by the external entity. Once detected, cloud server 135 may update the rule stored at the central data store of cloud network 130. The rule may be updated based on the monitored interaction(s). The term "based on" in this example corresponds to "after evaluating" or "using a result of" an evaluation of the monitored interaction(s). For example, cloud server 135 detects that the user device associated with the external entity integrated the interaction-specified modified version of the rule. In response to detecting the interaction-specified modified version of the rule, cloud server 135 may update the rule stored in the central data store from the existing rule to the interaction-specified modified version of the rule.

In some embodiments, cloud server 135 updates the rule by generating an updated version that is to be availed across external entities. Another original version may remain un-updated and is availed to a user associated with the user device from which the one or more communications that identified the criteria and particular type of treatment was received. For example, cloud server 135 updates the rule stored at the central data store, but cloud server 135 does not update another rule of the set of rules stored at the central data store.

In some embodiments, cloud server 135 may update the rule when an update condition has been satisfied. An update condition may be a threshold value. For example, the threshold value may be a number or percentage of external entities that have integrated a modified version of the rule into their custom rule bases. As another example, the update condition may be determined using an output of a trained machine-learning model. To illustrate, cloud server 135 may input the detected signals received from external entities into a multi-armed bandit model that automatically determines whether and/or when to avail the rule and/or whether and when to avail an updated version of the rule. To illustrate and only as a non-limiting example, a rule may be defined as executable code, such that the rule, upon execution, automatically queries the central data store to identify a subset of the set of subject records to further analyze. Additionally, the rule may include one or more treatment protocols for treating the subjects associated with the identified subset of subject records. The rule may be defined as a workflow for defining a subset of the set of subject records and treating the subset associated with the subset of subject records. For example, the rule may include one or more criteria for filtering subject records out of the set of subject records, and for performing certain treatment protocols on the subjects associated with the remaining subject records (e.g., the subject records remaining after the filtering has been performed on the set of subject records). While the rule is defined by a user of a first entity, the rule may be accepted (e.g., integrated into a rule base of the second entity), modified, or entirely rejected by an external user (e.g., a doctor who works at a different hospital) of a second entity (e.g., the first and second entities being two different medical facilities). In some examples, each time an external user of the second entity accepts the rule, and thus, fully integrates the rule into its codebase, then a feedback signal may be transmitted to the cloud server 135. In other examples, each time a user of the second entity modifies the rule, then a feedback signal may be transmitted to the cloud server 135. In other examples, each time a user of the second entity entirely rejects the rule, then a feedback signal may be transmitted to the cloud server 135. In each example above, the feedback signal may include data indicating the rule (e.g., a rule identifier) and whether the rule was accepted, modified, or rejected. A multi-armed bandit model (executable by cloud server 135) can be configured to intelligently select one of the original rule, the modified rule, or an entirely different rule for broadcasting to external users of other entities. The selection of the original rule, the modified rule, or the different rule may be based at least in part on the configuration of the multi-armed bandit. In some examples, the multi-armed bandit may be configured with an epsilon greedy search technique. In an epsilon greedy search technique, the multi-armed bandit model may select the original rule for broadcasting to external users of other entities with a probability of "1-epsilon," where epsilon represents a probability of exploring a new or modified rule. Thus, the multi-armed bandit model may select a modified version of the original rule or a completely new rule with a probability of the defined epsilon. The multi-armed bandit model may change the epsilon based on the feedback signals received from the other entities. For example, if the feedback signals indicate that the rule has been modified in a specific manner by different external users over a threshold number of times, then the multi-armed bandit model may learn to select the rule, as modified in the specific manner, to broadcast to external users, instead of broadcasting the original rule.

In some embodiments, cloud server 135 identifies multiple rules of the set of rules that include criteria corresponding to the same variable type and that identify same or similar types of treatment. A variable type may be a value or variable used as the condition of a criteria. The variable type of a criterion of a rule may also be any value of a condition that constrains the population of subjects to a sub-group. For example, the variable type of a rule that defines a population of pregnant women is "IF 'subject is pregnant.'" Cloud server 135 determines a new rule that is a condensed representation of the multiple rules, when the new rule is generally transmitted to the servers operated by other entities.

In some embodiments, cloud server 135 provides another interface configured to receive a set of attributes of a subject. For example, a user operating a user device to access the other interface and select a subject record that includes a set of attributes using the other interface. The selection of the subject record may cause the cloud server 135 to receive the set of attributes of the subject. Cloud server 135 identifies (e.g., determines) a particular rule for which the criteria are satisfied based on the set of attributes of the subject. For example, the evaluates the set of attributes of the subject record against the criteria of the rules stored in the central data store. To illustrate, if the set of attributes includes a data field containing the value "pregnant," and if a rule includes a single criteria of "IF 'subject is pregnant," then cloud server 135 identifies this rule. Cloud server 135 updates the other interface to present the particular rule and each particular type of treatment associated with the particular rule.

In some embodiments, a criterion of a rule is a variable type that relates to a particular demographic variable and/or a particular symptom-type variable. Non-limiting examples of a demographic variable include any item of information that characterizes a demographic of the subject, such as age, sex, ethnicity, race, income level, education level, location, and other suitable items of demographic information. Non-limiting examples of a symptom-type variable indicate whether a subject currently or recently (e.g., at a last visit, at intake, within 24 hours, within a week) experienced a particular symptom (e.g., difficulty breathing, fainting, fever above a threshold temperature, blood pressures above a threshold blood pressure, etc.).

In some embodiments, cloud server 135 monitors data in a registry of subject records, such as the subject records stored in data registry 140. Cloud server 135 monitors the data in the registry of subject records for each rule of the subset of rules (identified at block 340). Cloud server 135 identifies a set of subjects for which the criteria of the rule were satisfied, and for which the particular treatment was previously prescribed to the subject. Cloud server 135 identifies, for each of the set of subjects, a reported state of the subject as indicated from or using assessment or testing. For example, the reported state is any information characterizing a state of the subject in an aspect, such as whether the subject has been discharged, whether the subject is alive, measurements of the subject's blood pressure, the number of times the subject wakes up during a sleep stage, and other suitable states. Cloud server 135 determines an estimated responsiveness metric of the set of subjects to the particular treatment based on the reported states. For example, if the particular treatment of a rule is to prescribe a medication, the estimated responsiveness metric is a representation of the extent to which the medication addressed a symptom or condition experienced by the subject. As a non-limiting example, the estimated responsiveness metric of the set of subjects may be an average, weighted average, or any summation of a score assigned to each subject of the set of subjects. The score can represent or measure the effectiveness of the subject's responsiveness to the treatment. In some instances, cloud server 135 may generate the score that represents the effectiveness of the subject's responsiveness to the treatment by using a clustering technique. To illustrate and as only a non-limiting example, a set of subject records may represent subjects who previously underwent a particular treatment protocol for treating a condition. Each subject record of the set of subject record may be labeled (e.g., by a user) as having one of a positive responsiveness to the particular treatment protocol, a neutral responsiveness to the particular treatment protocol, or a negative responsiveness to the particular treatment protocol. The set of subject records may then be divided into three subsets (e.g., clusters); a first subset of subject records may correspond to subjects who had a positive responsiveness to the particular treatment protocol, a second subset of subject records may correspond to subjects who had a neutral responsiveness to the particular treatment protocol, and a third subset of subject records may correspond to subjects who had a neutral responsiveness to the particular treatment protocol. Cloud server 135 may transform each subject record of the first subset of subject records into a transformed representation, according to implementations described above. Cloud server 135 may also transform each subject record of the second subset of subject records into a transformed representation, using techniques described above. Lastly, cloud server 135 may transform each subject record of the third subject of subject records into a transformed representation, using the techniques described above. In some implementations, determining a predicted responsiveness of a new subject to the particular treatment protocol may include transforming the new subject record of the new subject into a new transformed representation. The new transformed representation may be compared in a domain space (e.g., a Euclidean space) with the transformed representations of each cluster or subset of subject records. If the new transformed representation is closest to a centroid of the transformed representations associated with the first subset, then the new subject is predicted to have a positive responsiveness to the particular treatment. If the new transformed representation is closest to a centroid of the transformed representations of the second subset, then the new subject is predicted to have a neutral responsiveness to the particular treatment. Lastly, if the new transformed representation is closest to a centroid of the transformed representations of the third subset, then the new subject is predicted to have a negative responsiveness to the particular treatment protocol. A centroid may be a multidimensional average of the transformed representations associated with a subset. Cloud server 135 can cause the subset of the set of rules and the estimated responsiveness metrics of the set of subjects to be displayed or otherwise presented in the treatment-plan definition interface.

Figure 4:
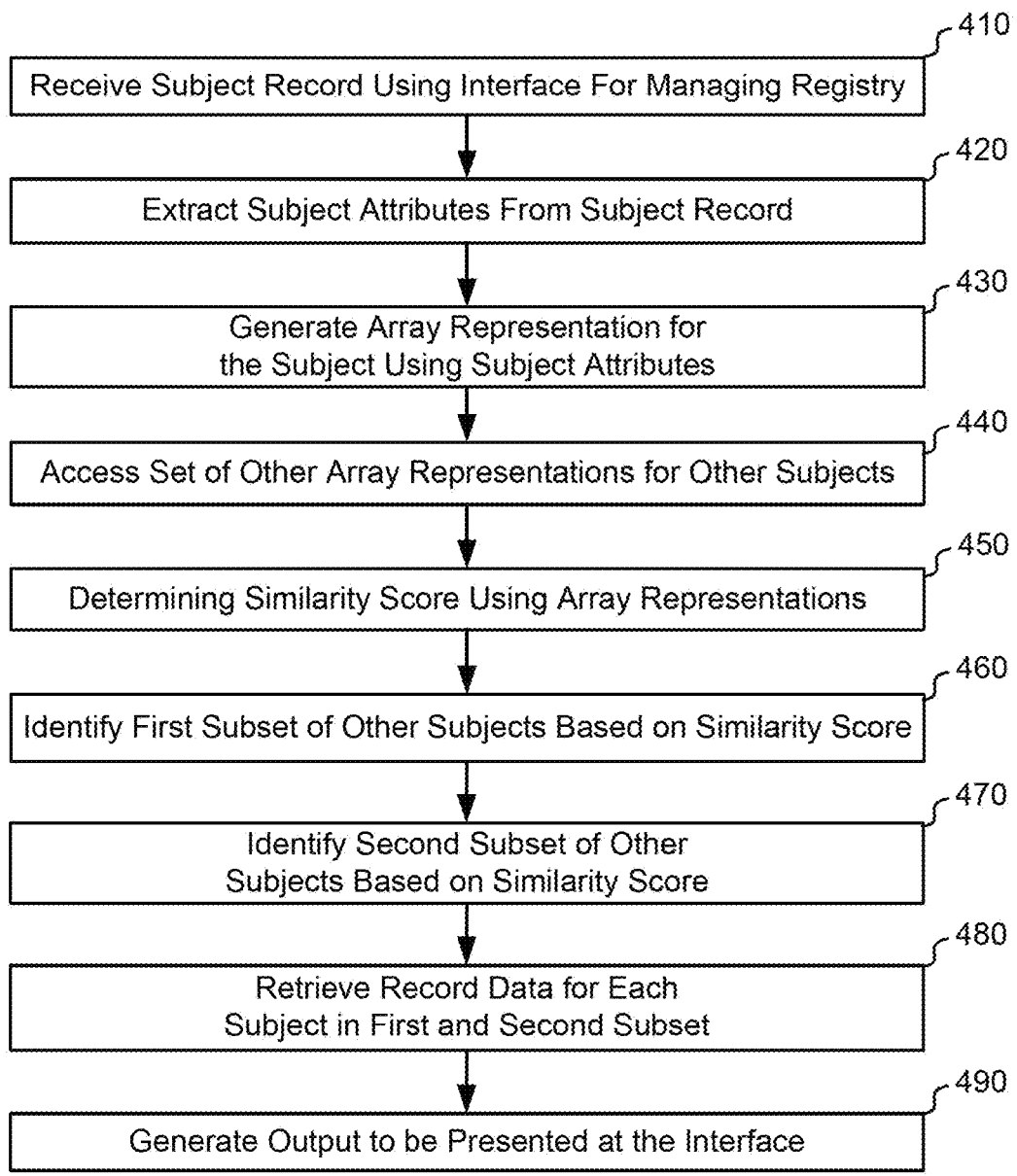
FIG. 4 is a flowchart illustrating an example of a process for recommending treatments for a subject, according to some aspects of the present disclosure.

II.C. Presenting Treatment Recommendations with Associated Efficacy Using Treatments Prescribed to Similar Subjects FIG. 4 is a flowchart illustrating process 400 for recommending treatments for a subject. Process 400 can be performed by cloud server 135 to display to a user device associated with a medical entity recommended treatments for a subject and the efficacy of each recommended treatment. The recommended treatments can be identified using a result of evaluating efficacies of treatments previously prescribed to similar subjects.

At block 410, cloud server 135 receives input corresponding to a subject record that characterizes aspects of a subject. The input is received from a user device associated with an entity. Further, the input is received in response to the user device selecting or otherwise identifying the subject record using an interface associated with an instance of a platform configured to manage a registry of subject records. User devices may access the interface by loading interface data stored at a web server (not shown) connected within cloud network 130. The web server may be included or executed on cloud server 135.

At block 420, cloud server 135 extracts a set of subject attributes from the subject record received at block 410. A subject attribute characterizes an aspect of the subject. Non-limiting examples of subject attributes include any information found in an electronic health record, any demographic information, an age, a sex, an ethnicity, a recent or historical symptom, a condition, a severity of the condition, and any other suitable information that characterizes the subject.

At block 430, cloud server 135 generates an array representation of the subject record using the set of subject attributes. For example, the array representation is a vector representation of the values included in the subject record. The vector representation may be a vector in a domain space, such as a Euclidean space. The array representation, however, can be any numerical representation of a value of a data field of the subject record. In some embodiments, cloud server 135 can perform feature decomposition techniques, such as singular value decomposition (SVD), to generate the values representing the set of subject attributes of the array representation of the subject record.

At block 440, cloud server 135 accesses a set of other array representations characterizing multiple other subjects. An array representation included in the set of other array representations may be a vector representation of a subject record that characterizes another subject (e.g., one of the multiple other subjects).

At block 450, cloud server 135 determines a similarity score representing a similarity between the array representation representing the subject and the array representation of each of the other subjects. For example, the similarity score is calculated using a function of a distance (in the domain space) between the array representation representing the subject and the array representation representing the other subject. To illustrate and as only a non-limiting example, the similarity score may be calculated using a range of "0" to "1," with "0" representing a distance beyond a defined threshold and "1" representing that the array representations have no distance between them. To illustrate and only as a non-limiting example, the similarity score may be based on the Euclidean distance between two array representations (e.g., vectors).

At block 460, cloud server 135 identifies a first subset of the multiple other subjects. Subjects may be included in the first subset when the similarity score associated with a subject is within a predetermined absolute or relative range. Similarly, at block 470, cloud server identifies a second subset of the multiple other subjects. However, subjects may be included in the second subset when the similarity score of this subject is within another predetermined range.

At block 480, cloud server 135 retrieves record data for each subject in the first subset and in the second subset of the multiple other subjects. The record data include the attributes that are included in a subject record characterizing a subject. For example, the subject record data identifies a treatment received by the subject and the subject's responsiveness to the treatment. The responsiveness to the treatment may be represented by text (e.g., "subject responded positively to treatment") or a score indicating an extent to which the subject responded positively or negatively to the treatment (e.g., a score from "0" to "1" with "0" indicating a negative responsiveness and "1" indicating a positive responsiveness). In some instances, a treatment responsiveness may indicate a degree to which a subject responded positively to a treatment that was previously performed on the subject. For example, the treatment responsiveness may be a numerical (e.g., a score from "0" to "10") or non-numerical value (e.g., a word assigned to represent the responsiveness, such as "positive," "neutral," or "negative"). In some examples, the treatment responsiveness for previously treated subjects may be user defined. In other examples, the treatment responsiveness may be determined automatically based on a result of a test or a measurement taken from the user. For example, the treatment responsiveness may be determined automatically based on values included in a blood test performed on the subject.

At block 490, cloud server 135 generates an output to be presented at the interface on the user device. The output may indicate, for example, a recommendation of one or more treatments for the subject. The recommendation of one or more treatments may be determined based on, for example, the treatments received by the other subjects in the first and second subsets, the treatment responsiveness of subjects in the first and second subsets, and the differences between the subject attributes of subjects in the second subset and subject attributes of the subject.

In some embodiments, cloud server 135 determines that the subject and one of the subjects from the first or second subset are being treated or were treated by the same medical entities. Cloud server 135 determines that the subject and another subject of the first or second subset are being treated or were treated by different medical entities. Cloud server 135 may avail differentially obfuscated versions of records of the subjects via the interface. The cloud-based application can automatically provide differently obfuscated versions of records to entities based on varying constraints imposed on data sharing by the data-privacy rules of different jurisdictions. In some embodiments, cloud server 135 identifies the first subset and the second subset of subject records by performing a clustering operation on the transformed representations of a set of subject records.

II.D. Automatically Obfuscating Query Results from External Entities

Figure 5:
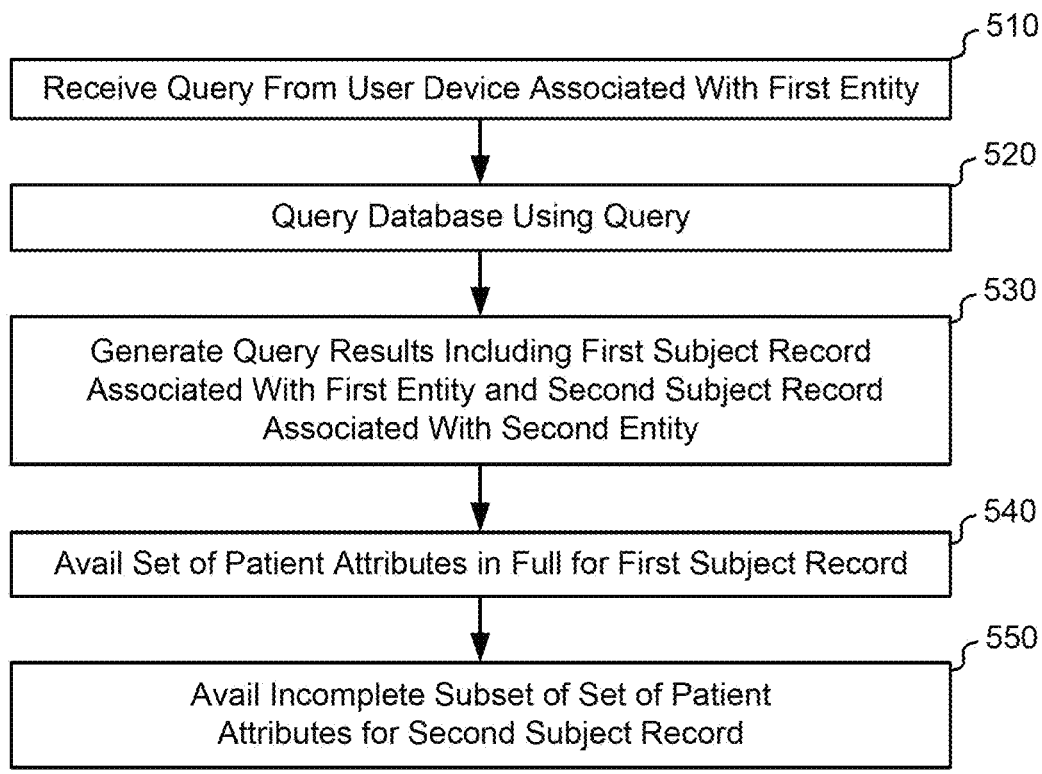
FIG. 5 is a flowchart illustrating an example of a process for obfuscating query results to comply with data-privacy rules, according to some aspects of the present disclosure.

FIG. 5 is a flowchart illustrating process 500 for obfuscating query results to comply with data-privacy rules. Process 500 may be performed by cloud server 135 as an executing rule that ensures data sharing of subject records with external entities complies with data-privacy rules. The cloud-based application may enable a user device to query data registry 140 for subject records that satisfy a query constraint. The query results, however, may include data records originating from external entities. Thus, process 500 enables cloud server 135 to provide user devices with additional information on treatments from external entities, while complying with data-privacy rules.

At block 510, cloud server 135 receives a query from a user device associated with a first entity. For example, the first entity is a medical center associated with a first set of subject records. The query may include a set of symptoms associated with a medical condition or any other information constraining a query search of data registry 140.

At block 520, cloud server 135 queries a database using the query received from the user device. At block 530, cloud server 135 generates a data set of query results that correspond to the set of symptoms and are associated with the medical conditions. For example, the user device transmits a query for subject records of subjects who have been diagnosed with hemophilia. The query results include at least one subject record from the first set of subject records (which originate or were created at the first entity) and at least one subject record from a second set of subject records associated with a second entity (e.g., a medical center different from the first entity). Each of the subject record from the first set of subject records and the subject record from the second set of subject records may include a set of subject attributes. A subject attribute can characterize any aspect of a subject.

At block 540, cloud server 135 presents (e.g., avails or otherwise makes available) to the user device the set of subject attributes in full for subject records included in the first set of subject records because these records originate from the first entity. Presenting a subject record in full includes making the set of attributes included in a subject record available to the user device for evaluation or interaction using the interface. At block 550, cloud server 135 also or alternatively avails to the user device an incomplete subset of the set of subject attributes for each subject record included in the second set of subject records. Providing an incomplete subset of the set of subject attribute provides anonymity to subjects because the incomplete subset of subject attributes cannot be used to uniquely identify a subject. For example, providing an incomplete subset may include available four of 10 subject attributes to anonymize the subject associated with the 10 subject attributes. In some embodiments, at block 550, cloud server 135 avails an obfuscated set of subject attributes for each subject record included in the second subject. Obfuscating the set of attributes include reducing the granularity of information provided. For example, instead of availing the subject attribute of a subject's address, the obfuscated attribute may be a zip code or a state in which the subject lives. Whether an incomplete subject or an obfuscated subset is availed, cloud server 135 anonymizes a subject associated with the subject record.

II.E. Chatbot Integration with Self-Learning Knowledge Base

Figure 6:
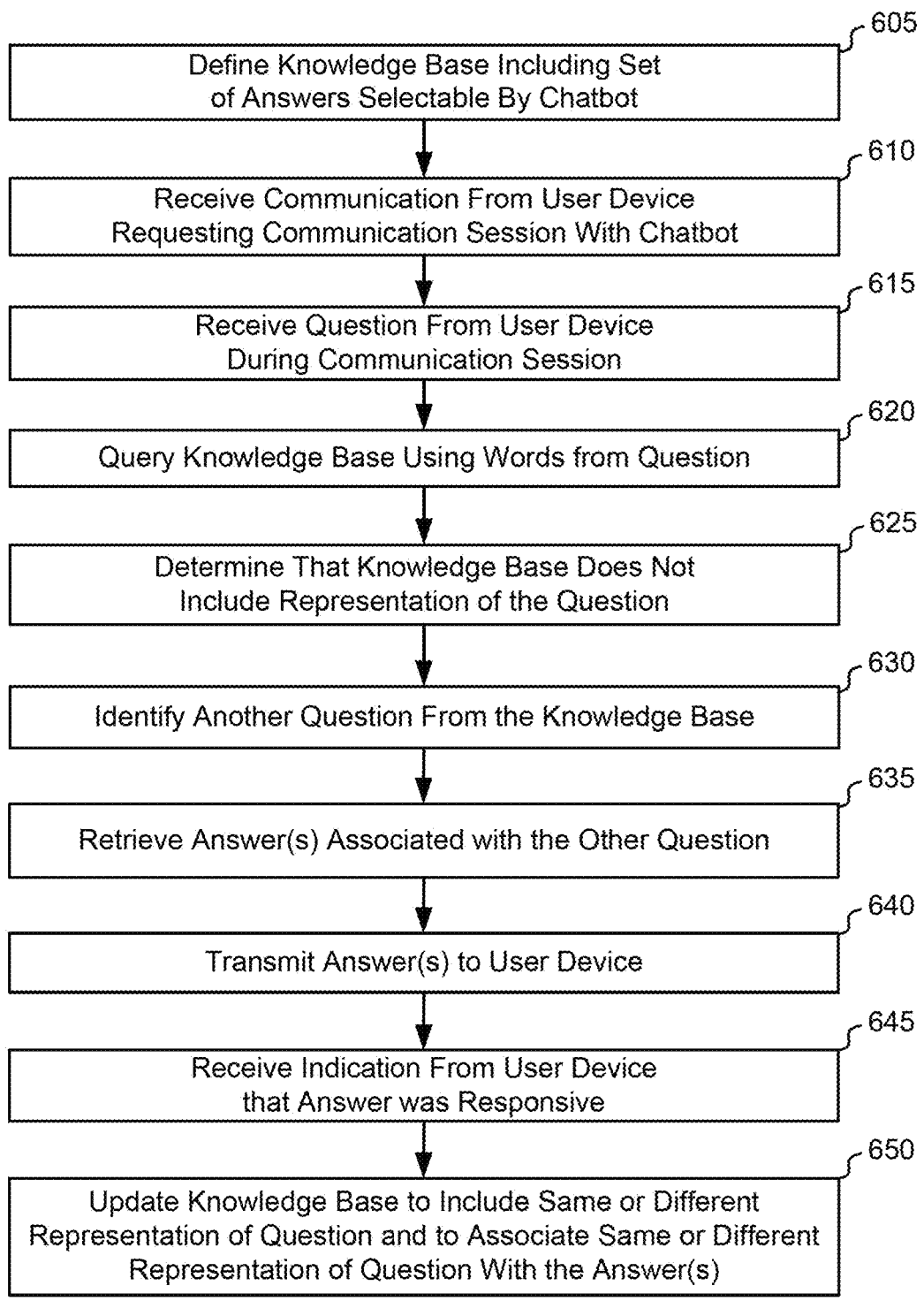
FIG. 6 is a flowchart illustrating an example of a process for communicating with users using bot scripts, such as a chatbot, according to some aspects of the present disclosure.

FIG. 6 is a flowchart illustrating process 600 for communicating with users using bot scripts, such as a chatbot. Process 600 may be performed by cloud server 135 for automatically linking new questions provided by users to existing questions in a knowledge base to provide a response to the new question. A chatbot may be configured to provide answers to questions associated with a condition.

At block 605, cloud server 135 defines a knowledge base, which includes a set of answers. The knowledge base may be a data structure stored in memory. The data structure stores text representing the set of answers to defined questions. Each answer may be selectable by a chatbot in response to a question received from a user device during a communication session. The knowledge base may be automatically defined (e.g., by retrieving text from a data source and parsing through the text using natural language processing techniques) or user defined (e.g., by a researcher or physician).

At block 610, cloud server 135 receives a communication from a particular user device. The communication corresponds to a request to initiate a communication session with a particular chatbot. For example, a physician or subject may operate a user device to communicate with a chatbot in a chat session. Cloud server 135 (or a module stored within cloud server 135) may manage or establish communication sessions between user devices and chatbots. At block 615, cloud server 135 receives a particular question from the particular user device during the communication session. The question can be a string of text that is processed using natural language processing techniques.

At block 620, cloud server 135 queries the knowledge base using at least some words extracted from the particular question. The words may be extracted from the string of text representing the particular question using natural language processing techniques. At block 625, cloud server 135 determines that the knowledge base does not include a representation of the particular question. In this case, the question received may be newly posed to a chatbot. At block 630, cloud server 135 identifies another question representation from the knowledge base. Cloud server 135 may identify another question representation by comparing the question received from the user device to the other question representations stored in the knowledge base. If a similarity is determined, for example, based on an analysis of the question representations using natural language processing techniques, then cloud server 135 identifies the other question representation.

At block 635, cloud server 135 retrieves an answer of the set of answers associated, in the knowledge base, with the other question representation. At block 640, the answer retrieved at block 635 is transmitted to the particular user device as an answer to the question received, even though the knowledge based did not include a representation of the question received. At block 645, cloud server 135 receives an indication from the particular user device. For example, the indication may be received in response to the user device indicating that the answer provided by the chatbot was responsive to the particular question. At block 650, cloud server 135 updates the knowledge base to include the representation of the particular question or different representation of the particular question. For example, storing a representation of a question includes storing keywords included in the question in a data structure. Cloud server 135 may also associate the same or different representation of the particular question with the more answer transmitted to the particular user device.

In some embodiments, cloud server 135 accesses a subject record associated with the particular user device. Cloud server 135 determines a plurality of answers to the particular question. Cloud server 135 then selects an answer from the set of answers. The selection of the answer, however, is based at least in part on one or more values included in the subject record associated with the particular user device. For example, a value included in the subject record may represent a symptom recently experienced by the subject. The chatbot may be configured to select an answer that is dependent on the symptom recently experienced by the subject. In some instances, cloud server 135 may access a learn-to-rank machine-learning model that has been trained to predict an order for each answer in a set of answers. The learn-to-rank machine-learning model may be trained using a training set of answers. Each answer of the training set of answers may be labeled with one or more symptoms and a relevance score for that symptom. The relevance score may represent a relevance of the associated answer to a given symptom of the one or more symptoms. The relevance score may be user defined or automatically determined based on certain factors, such as frequency of a word (e.g., the word(s) for the symptom) in a training answer. The training set of answers may be different from the set of answers used when the chatbot is operational in a production environment. The learn-to-rank machine-learning model may learn how to order the set of answers (used in the production environment) in terms of relevance to a symptom (which is detected from the subject profile) based on the patterns learned by the learn-to-rank model (e.g., the patterns between the labeled training set of answers and the associated relevance scores for each symptom of one or more symptoms). The chatbot may select an answer from the set of answers used in the production environment based on the predicted ordering of the set of answers. In some instances, each answer of the set of answers may be associated with a tag or code indicating one or more symptoms that are associated with the answer. Cloud server 135 may compare the value that represents the symptom recently experienced by the subject with the tag or code associated with each answer.

In some instances, the chatbot is configured to receive input pertaining to an injury or bleeding event experienced by a hemophilia subject. The input may include (for example) a picture of an injury or bruise, an indication as to an injury location and/or a characterization of bleeding (e.g., incomplete or complete duration of bleeding). The chatbot may be configured to return a recommendation as to whether the subject is to self-administer a particular treatment, as to whether the subject is to seek immediate medical attention, as to whether the subject is to schedule an appointment with a care provider, etc. In some instances, a chatbot selectively conveys a recommendation when an artificial-intelligence engine predicts (using the knowledge base) that a subject should self-administer a particular treatment, seek immediate medical attention and/or schedule an appointment, the chatbot does not convey (and not any recommendation identifying a contrary potential action).

The recommendation may be based on a knowledge base and/or a knowledge base. In some instances, the knowledge base is configured to generate an output based on input. For example, the knowledge base may include a pharmacokinetic model that was defined for a given population (e.g., of subjects with hemophilia, subjects with a particular type of hemophilia and/or subjects with a particular severity of hemophilia), which may have been updated and/or configured based on data associated with a particular subject. The updating and/or configuration may have been performed based on (for example) whether a prediction (e.g., that an abnormal bleeding event would likely not occur) was accurate.

Figure 7:
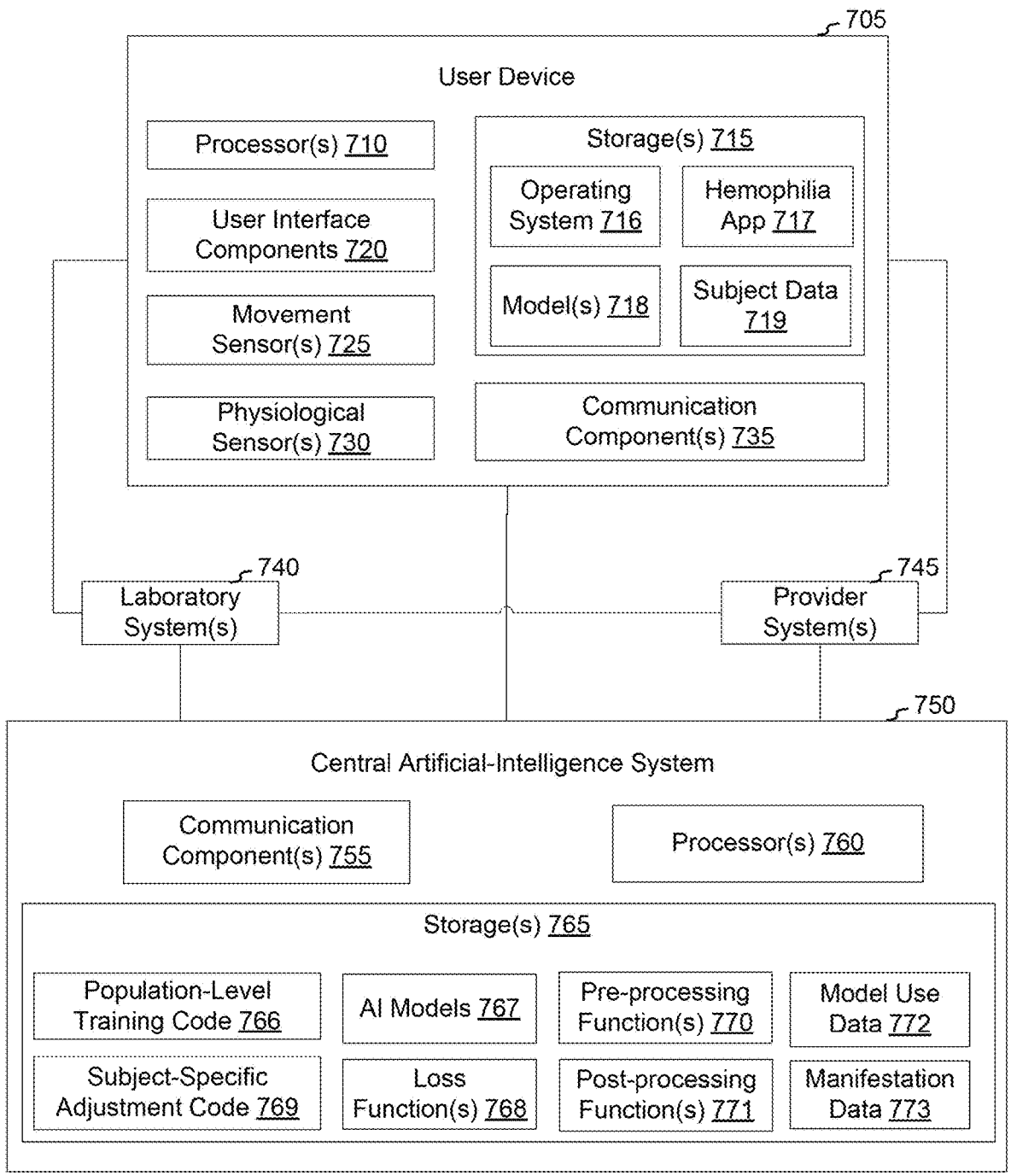
FIG. 7 shows a network for using artificial-intelligence models to generate outputs to facilitate diagnosis and/or treatment of a subject.

III.F. Module for Facilitating Selection of and Monitoring of Hemophilia Treatments FIG. 7 depicts an interaction system 700 for facilitating selection of and assessment of hemophilia treatments. Interaction system 700 includes a user device 705 that may be used by, operated by and/or owned by a subject who has been diagnosed with hemophilia. User device 705 can include (for example) a smart phone, smart wearable device, mobile electronic device, etc.

User device 705 can include one or more processors 710, which can include one or more single-core, multi-core, dual-core, quad-core, hexa-core or octa-core processors. Each of one or more processors may (for example) have a clock speed greater than 50 MHz, 100 MHz, 500 MHz, 1 GHz, 1.5 GHz or 2.5 GHz. One or more processors 710 may be included in a System-on-a-Chip (SoC) of user device 705. One or more processors may include one or more central processing units and/or one or more graphical processing units.

User devices 705 can include one or more storages 715, which can include one or more volatile memories (e.g., RAM), embedded storage chip, and/or one or more non-volatile memories (e.g., ROM, such as Flash memory). Data stored on one or more storages 715 may include code that, when executed by at least one of one or more processors 710, cause a set of operations to be performed. Data stored on one or more storages 715 may alternatively may include non-executable information (e.g., that may be retrieved and/or used by executable code).

One or more storages 715 can store an operating system 716, a hemophilia application 717, one or more models 718 and/or subject data 719. Operating system 716 can manage use of computational resources (e.g., processing cycles and memory usage) and/or schedule tasks (e.g., generated by execution of applications). Operating system 716 can be a single-tasking operating system or a multi-tasking operating system. Operating system 716 may include (for example) a version of Windows, Linux, iOS, Android, macOS, etc.

Hemophilia app 717 can include code to facilitate collecting data pertinent to selecting and/or assessing a hemophilia treatment for a subject using user device 705 and/or to facilitate presenting hemophilia-related information to the subject via user device 705. Data collected may identify (for example) bleeding event occurrence, one or more symptoms of a bleeding event, identification of a time and/or dosage of receipt of a treatment, an activity level, exercise engagement (or planned engagement), time period of sleep, weight, pulse, heart rate and/or altitude.

Hemophilia app 717 may identify one or more models 718 to be used to predict a current or future factor level, factor activity and/or bleeding-event risk for the subject. Each model 718 may include one or more machine-learning models trained using a training data corresponding to the subject associated with user device 705 and/or with other subjects. For example, training data used to train a given model may include—for each of a set of other subjects (having a particular type or hemophilia)—demographic information (e.g., weight and age), measured activity levels of a given factor (e.g., as measured by using an aPTT-based 1-stage clotting assay or 2-stage chromogenic activity assay) at each of a set of time delays relative to a time at which a particular treatment (e.g., factor concentrate or recombinant factor) was administered, and a dose of the particular treatment that was administered. In some instances, one or more models 718 include a machine-learning model and/or pharmacokinetic model that predicts (for example) a concentration of an active agent at one or more time points, factor activity levels at one or more times, a clotting time or clotting propensity at one or more times, a time at which a clotting propensity falls below or reaches a threshold, and/or a time at which an active-agent concentration falls below or reaches a threshold.

Another example of training data that may be used to train a given model associated with a particular treatment may include—for each of a set of other subjects (having a particular type or hemophilia)—demographic information (e.g., weight and age), specifics of treatments received (e.g., dosage), an indication of whether any bleeding event occurred between successive treatments, a time relative to a most-recent treatment that any bleeding event occurred, a treatment-relevant level (e.g., factor activity level, clotting time, aPTT time, etc.) measured when treating any bleeding event, any triggering circumstance of any bleeding event, etc.

Model(s) 718 may include (for example) an AI model and/or a machine-learning model. An AI and/or machine-learning model can include (for example) a pharmacokinetic model that uses rate constants (e.g., absorption, distribution, metabolism and/or excretion) to model dynamics of a therapeutic agent (e.g., a factor concentrate, recombinant factor or non-factor therapy) so as to generate a predicted level of the therapeutic agent across a period of time or at a particular time. A pharmacokinetic can include a compartmental model, a non-compartmental model, or a physiological model.

In a compartmental model, dynamic variables may be defined for each compartment. Each compartment corresponds to tissues and/or organs that are assumed to be kinetically homogenous. Compartmental models further generally assume that therapeutic agents move between compartments can be represented using first-order kinetics. Once the dynamic variables (e.g., rate constants) are identified, pharmacokinetic outputs can be generated using (for example) nonlinear regression analysis. In some instances, a compartmental model includes a central compartment representing plasma and one or more peripheral compartments. Rate constants can represent flow of a plasma between the central component and each peripheral component. Model results can be interpreted and/or the model can be configured so as to indicate an absorption of an active agent by the system, a volume of distribution (a plasma volume needed to hold an amount of active agent predicted to exist at a point in time), and/or a clearance of the active agent. A half-life of a therapeutic agent may further be calculated.

A non-compartmental model does not use variables that correspond to estimated physiological or anatomical characteristics. Rather, a non-compartmental model uses fixed equations (e.g., algebraic equations). Thus, non-compartmental models generally produce faster and more reliable results as compared to compartmental models. However, non-compartmental models are typically inferior to compartmental models in accurately predicting variability across subjects and circumstances. Non-compartmental model parameters are generally determined based on time-series drug-concentration data.

As mentioned, each compartment in a compartmental model need not correspond to a physiological object (e.g., organ or tissue). Meanwhile, a physiological model incorporates anatomical meaning and models blood flow (and flow of a therapeutic agent) through various parts of the body, absorption of a therapeutic agent within various body parts, etc. Some tissues may be grouped together if they are rapidly equilibrating (e.g., lungs, liver, brain and kidney), and the model may omit particular human features (e.g., bones) if absorbance of therapeutic agent is assumed or known to be low. A physiological model is parameterized using empirical data corresponding to observed physiology. A physiological model may estimate therapeutic agents' concentration in various organs or tissues using predicted sizes of individual organs or tissues, perfusion rate, and tissue-to-plasma partition coefficients.

With respect to any of these types of pharmacokinetic models, the parameters (e.g., that correspond to rate constants, dynamics, tissue volumes, etc.) may depend on characteristics of a subject (e.g., age, weight, sex, type of hemophilia, comorbidity, etc.). In some instances, pertinent subject characteristics can be rather practically and precisely determined. In some instances, at least some of the subject characteristics are unavailable. A model may infer missing subject information and/or may use a framework (e.g., a Bayesian framework) to estimate parameter dependency based on population-level data. In some instances, Markov Chain Monte Carlo simulations can be used to estimate posterior distributions of population parameters and subject-specific parameters, and a covariate model can identify systematic variability explainable by measurable subject characteristics (e.g., age, height, disease type).

In some instances, a modified Generative Adversarial Network (GAN) can be used to predict pertinent subject data. Specifically, a population distribution across one or more variables (e.g., rate constants, dynamics, etc.) can be identified. A Generator network can identify a transformation of the distribution along one or more dimensions. The transformation can be defined at least in part based on subject-specific characteristics (e.g., weight, age) and/or data (e.g., one or more subject-associated rate constants, dynamic variables, etc.). A sampling technique (e.g., Monte Carlo technique) can sample from the transformed distribution, and a Discriminator network can predict whether the sample(s) correspond to the population or the subject. Accuracy of the predictions can be fed back to the Generator network until a threshold accuracy is obtained or a threshold number of iterations have occurred. The transformation can then be used to estimate subject-specific metrics (and/or uni- or multi-dimensional distributions thereof) that represent pharmacokinetics corresponding to an individual subject. This approach can facilitate using a limited and/or small number of subject-specific variable values to generate a subject-specific distribution that may more fully represent biological activity. A sampling technique (e.g., Monte-Carlo technique) may sample from the distribution to generate data to use to train another model (e.g., a pharmacokinetic model or neural network).

In some instances, a model 718 that includes a neural network is used. The neural network may include a feedforward neural network. The feedforward neural network may receive an input data set including (for example) demographic information, laboratory data, diagnostic data, physiological data and/or other metrics. The feedforward neural network may have been trained using population data to learn one or more physiological metrics (e.g., half-lives, time constants, scaling factors).

In some instances, the feedforward network additionally receives input indicating when treatments were administered to the subject (e.g., and the dosage that was administered), and the feedforward neural network may output a prediction of a time at which a clotting propensity (e.g., corresponding to a clotting time in an assay) falls below or reaches a particular threshold, a predicted current clotting propensity, a predicted current level or activity of an active ingredient, and/or a predicted time at which a level or activity of an active ingredient falls below or reaches a particular threshold. In such instances, the feedforward neural network may have been trained to generate predictions for a particular type of treatment or an additional input may identify the treatment type.

The feedforward network may include at least 1, at least 2 or at least 3 hidden layers. Each hidden layer may include (for example) at least 10, at least 15, at least 25 or at least 30 nodes.

Within one or more storages 715, stored model data can include model architecture, pre-defined unlearned hyperparameters and/or learned parameters. Stored model data can include variables (e.g., one or more unlearned hyperparameters used by a machine-learning model or one or more unlearned parameters used by a pharmacokinetic model) that include or are determined based on some or all of subject data 719 (data corresponding to and/or characterizing a specific subject, who may be a user of user device 705). Hemophilia app 717 may configure architecture of a model and data-routing routines to define input fed to the model based on some or all of subject data 719. In some instances, hemophilia app 717 selects and/or trains a model using some or all of subject data 719.

Subject data 719 can include demographic data (e.g., identifying an age, sex, race and/or residence location), medical-history data (e.g., identifying a diagnosis of a type of hemophilia, a diagnosis of a severity of hemophilia, a diagnosis of one or more other diseases, and/or characterizations of one or more previous bleeding manifestations), treatment-history data (e.g., identifying a current type of hemophilia treatment, dates and/or times of treatment administrations, dosages of treatment administrations, previous types and dates of hemophilia treatments, and/or any types of adverse events experienced with the current or previous hemophilia treatments), symptom data (e.g., identifying joint damage and/or mobility impairment) and/or genetic data (e.g., identifying one or more mutations, such as one or more X-chromosome mutations and/or one or more chromosome-4 mutations). In some instances, genetic data includes a severity classification for each hemophilia-related mutation (e.g., as classified based on criteria from the International Society on Thrombosis and Haemostasis) and/or a number of mutations associated with the subject that are characterized as having a particular severity level (e.g., severe). Subject data 719 may further include laboratory results (e.g., results of a blood test, assay, mixing study or other test identified herein) or processed versions thereof.

Subject data 719 may further include a date and/or time of one or more scheduled future treatments. In some instances, hemophilia app 717 may be configured processing such that a model generates a prediction corresponding to a scheduled treatment time, such as a predicted factor level, concentration of an active ingredient, clotting propensity, or clotting time (e.g., given particular hypothetical circumstances, such as a bleed or circumstances associated with an assay). In some instances, hemophilia app 717 may be configured to predict a time at which a predicted factor activity level, concentration of an active ingredient, clotting propensity or clotting time (e.g., given particular hypothetical circumstances, such as a bleed or circumstances associated with an assay) falls below a threshold and determine whether the predicted threshold-crossing time is before or after the scheduled treatment time. In some instances, a predicted time corresponds to a time at which a probability of a threshold crossing (e.g., having a factor level that is below a lower factor-level threshold) exceeds a probability threshold (e.g., 35%, 50%, 75%, etc.), User device 705 can include one or more user interface components 720 configured to receive user input and/or present output. In some instances, at least part of subject data 719 includes data received as input via user interface components 720 and/or data generated based on input received via user interface components 720. For example, user input may identify time and type of injury (e.g., scrape, cut, etc.) and whether the subject perceived resulting normal to be normal or abnormal (e.g., in terms of a clotting time). As another example, user input may identify a hemophilia-related symptom (e.g., joint pain), a severity of the symptom, an approximate onset time of the symptom and/or whether the user recalls any potentially triggering event before symptom onset. In some instances, at least part of the operations of hemophilia app 717 (e.g., identifying interfaces and/or data to be presented, transmission of data to other devices, defining one or more thresholds for warning alerts, etc.) are performed upon receiving one or more particular types of input via user interface components.

In some instances, hemophilia app 717 triggers one or more outputs to be presented via an output component of user interface components 720. For example, a predicted factor level may be visually presented, a notification of satisfaction of a warning condition (e.g., indicating that a predicted value will fall below a threshold prior to a next scheduled treatment or that a rate of change of a predicted value exceeds a change threshold) may be presented via an audible or haptic stimuli.

One or more input components of user interface components 720 can include (for example) a touch screen, a keyboard, a track pad, a mouse and/or a microphone. One or more output components of user interface components 720 can include (for example) a display screen, a speaker and/or a haptic output.

User device 705 can include one or more sensors. The sensors may include one or more movement sensors 725 and/or one or more physiological sensors 730. Movement sensor(s) 725 may include (for example) an accelerometer and/or a gyroscope. User device 705 may include one or more apps (e.g., hemophilia app 717 and/or another app) configured to transform the accelerometer data and/or gyroscope data to predict a quantity of steps taken by a user over a recent time period and/or a movement activity engaged upon by the user (e.g., running, walking, standing/sitting). Physiological sensor(s) 730 may include a heart rate or pulse monitor, which may operate by outputting a light (e.g., via an LED and/or having a known frequency profile) and monitoring data collected via an optical sensor (e.g., to detect an intensity at one or more frequency bands). The absorption of particular frequencies (e.g., green light) can change based on slight blood-volume differences occurring throughout heartbeat cycles, such that a heartrate or pulse can be calculated (e.g., via an application on user device 705 and/or by hemophilia app 717) using optical-sensor data. In some instances, a heart rate or pulse can further inform a prediction of a recent user activity.

Other sensors may include (for example) a GPS receiver to receive GPS signals. An application on user device 705 (e.g., hemophilia app 717 or another app) may use the GPS signals to infer a location (e.g., GPS coordinates, address, city, state, country, etc.) of a user. Other sensors may further or alternatively include a barometer. Measurements collected via the barometer and/or signals received by a GPS receiver may be used to infer an altitude of a user.

In some instances, hemophilia app 717 may be configured to receive and process input data (e.g., via one or more use interface components 720) and/or from one or more sensors 730 to convey hemophilia-related information. The hemophilia-related information may include (for example) an identification of and/or characterization of a bleeding event and/or treatment reaction. The hemophilia-related information may include (for example) a picture (e.g., collected using a camera of user device 705) of a bruise, bleed, rash, or other reaction. The hemophilia-related information may further or alternatively include textual information (e.g., received via a touchscreen, cursor, keyboard or speaker receiving audio commands) that characterizes a bleeding event or injury. Hemophilia app 717 may transform the hemophilia-related information into one or more communications.

A communication may be transmitted to a care-provider system and/or a central server, For example, the communication may report and/or characterize an injury and/or abnormal bleeding event (e.g., which may include an identification of any trigger of the bleeding event, a picture of an area of the body that experienced the injury or bleeding event, an identification as to whether a bruise presented, and/or an identification as to a duration of bleeding). Hemophilia application 717 executing at subject device 705 may process the input (e.g., to adjust a resolution or size of an image to a predefined resolution or predefined size; and/or to generate key-value pairs based on various textual inputs) and send the processed data to the device of the care provider. A same or different application executing at a provider system (e.g., provider system 745) may process the communication to (for example) determine whether to present an alert, initiate updating of a subject record and/or facilitate generation and display of a presentation (e.g., that identifies at least some of the hemophilia-related information).

In some instances, hemophilia app 717 may access and/or process at least some sensor data. Hemophilia app 717 may store the raw and/or processed sensor data as part of subject data 719. For example, hemophilia app 717 may use accelerometer and/or heart-rate data to predict whether a user was engaged in minimal activity (e.g., predominately sitting), low-intensity activity or high-intensity activity for various portions of individual days and may store such inferences as subject data 719. As another example, hemophilia app 717 may use heart-rate data to predict, for each day, during which hours a user was asleep and store the sleep-hour predictions. As yet another example, hemophilia app 717 may infer locations and/or altitudes of the user using GPS and/or barometer data.

In some instances, hemophilia app 717 processes sensor data and other subject data to predict one or more relationships between sensor data (or a processed version thereof) and hemophilia-related incidences. The processing may include performing a multi-dimensional analysis or may use a machine-learning model to predict what, if any, types of exercise intensities or user exertion affect hemostasis (e.g., as indicated by whether bleeding events were normal or abnormal and/or whether spontaneous bleeding occurred). For example, it may be determined that movement and/or exertion characteristic of high-intensity exercise transiently increases a probability of a bleeding event (though the magnitude and/or duration of such increase may be subject-specific). The assessment may further account for a time since a last treatment and/or recent predicted active-ingredient level, clotting propensity, etc. For example, the assessment may predict how exercise intensity and/or user exertion transiently affects one or more time constants of a pharmacokinetic model. As another example, the assessment may predict how an output of a pharmacokinetic model is to be post-processed (e.g., transiently post-processed) to a transient change in hemostasis. The post-processing may include (for example) multiplying a result (e.g., risk of abnormal bleeding, predicted clotting time, recommended time interval at which next treatment is to be received, etc.) by a value, adding or subtracting an amount to/from a result and/or transforming a result using a non-linear function. In some instances, an effect of the post-processing is limited to predictions during which the post-processing is performed. In some instances, a model implements an iterative approach, whereby processing for successive time points depend on values from previous time points. Thus, post-processing may have a long-lasting effect.

In some instances, hemophilia app 717 processes sensor data to select a model that is to be used to generate hemophilia-related predictions for the subject. The different model selection may include selecting a model trained using different data, trained using a different loss function and/or objective function, having different fixed hyperparameters, and/or having a different architecture. For example, a default model selected by hemophilia app 717 for the subject may include a model that prioritizes accurately predicting levels of an active treatment agent. Meanwhile, upon inferring that a user has engaged in high-intensity activity, hemophilia app 717 may transition to a model that prioritizes accurately predicting occurrence of abnormal bleeding events. Transitioning between models may be facilitated by defining dynamic variable correspondences between the models. For example, each of multiple models may be configured to receive a predicted active-ingredient level (e.g., which may have been generated via processing of a previous time step). Other input may be objective and/or fixed (e.g., physical and/or demographic attributes of a subject and/or variables based on or including sensor variables). Thus, when switching from one model to another, input variables for the other model may be readily available. In some instances, post-processing is implemented to further smooth and/or filter predictions generated by the two models.

User device 705 further includes one or more communication components 735, which can facilitate receiving communications from one or more other devices and/or transmitting communications to one or more other devices. Communication components 735 may be configured to transmit signals via a wired or wireless connection. Communication components 735 can include (for example) a receiver, a transmitter and/or a transceiver. Communication components 735 can include one or more antennas (e.g., to transmit or receive radio-frequency signals.

It will be appreciated that, in some instances, user device 705 may be paired with another user device. User device 705 and the paired user device may then collectively include components depicted in FIG. 7 and may facilitate interactions with both devices to facilitate operation of hemophilia app 717. For example, a first user device may include a wearable device that includes all of the depicted components, and a second user device may include a smart phone that includes all of the depicted components except physiological sensor(s) 730. The two devices may communicate via a network (e.g., Bluetooth or WiFi), such that the second user device receives data corresponding to physiological measurements. Hemophilia app 717 operating on the first device can coordinate pertinent data collection, initial processing (e.g., to transform light signals into a heart rate) and transmission of the processed sensor data; hemophilia app 717 operating on the second device can coordinate selecting, configuring and executing one or more models to process the pre-processed sensor data and other pertinent subject data 719.

Interaction system 700 can further include one or more laboratory systems 740, one or more care-provider systems 745 and a central artificial-intelligence system 750. Two or more of user device 705, laboratory system(s) 740, care-provider system(s) 745 and/or central artificial-intelligence system 750 may be in communication via one or more networks (e.g., the Internet).

Laboratory system(s) 740 can be associated with one or more medical laboratories and/or testing facility. Laboratory system(s) 740 can include (for example) a system configured to generate, assess, access and/or communicate one or more laboratory test results. For example, laboratory system(s) 740 may be configured to receive a sample (e.g., a blood sample, urine sample or saliva sample) from a subject and to process the sample to generate a result. Processing the sample may include (for example) performing a technique disclosed herein (e.g., a processing disclosed in Section II), performing an assay and/or performing a test. A processing may be performed (for example) during a diagnostic stage, as part of disease management/monitoring, in response to a response to a bleeding event, prior to a treatment administration, and/or at one or more defined times relative to treatment administration. One or more results generated at and/or by laboratory system(s) can include a type of result, metric or variable disclosed herein (e.g., in Section II), such as a clotting time, factor activity level, treatment concentration, mixing-study result, platelet counts, etc. Laboratory system 740 may transmit one or more results, one or more identifications of assessments performed, and/or one or more subject identifications (e.g., name, social security number, etc.) to user device 705 and/or one or more care-provider systems 745.

Care-provider system(s) 745 can be associated with (for example) a physician, physician's office, nurse, urgent care, hospital, surgeon or other provider of medical care. Provider system(s) 745 may receive input (e.g., via a user interface) corresponding to an assessment made by a care provider that may correspond to an identification of a subject's symptoms, hemophilia risk factors, diagnosis (e.g., of a particular type and/or severity of hemophilia), prognosis, prescribed prophylactic treatment, prescribed manifestation treatment, etc. A treatment identification may identify a type of treatment, dose of treatment, schedule for the treatment (e.g., treatment intervals and/or schedule for loading and maintenance doses) and/or monitoring to be performed to accompany the treatment.

In various instances, a care-provider system 745 associated with a care provider of a subject and/or user device 705 used by the subject provides input that causes central artificial-intelligence system 750 to initiate a registration of the subject and generation of one or more data records for the subject. The data record(s) can include (for example):

information about the subject (e.g., demographic information, residential information, education level, marital status, occupation, etc.);

hemophilia diagnosis information (e.g., type and/or severity of hemophilia, whether a diagnosis is suspected or confirmed, diagnosis date);

one or more comorbidities (e.g., a diagnosis of asthma, an autoimmune disease, cardiomyopathy, cardiovascular disease, cerebrovascular disease, congestive heart failure, COPD, coronary artery disease, deep vein thrombosis, diabetes, HIV, history of thrombotic microangiopathy, history of thrombosis event, history of intracranial hemorrhage, hepatitis, hypertension, myocardial infarction, pulmonary embolism); one or more previous surgeries (e.g., identifying a type of surgery, a date of the surgery and whether abnormal bleeding occurred);

laboratory and/or medical test information (e.g., one or more factor levels, an inhibitor titer level, detected DNA variant, basophil count, eosinophil count, hemoglobin count, INR, lymphocyte count, monocyte count, neutrophil count, NK cell count, platelet count, prothrombin time, partial thromboplastin time, red blood cell count, T cell count, white blood cell count, total protein count, albumin count, SGOT/AST count, SGPT/ALT count, gamma-GT count, birumbin count, alkaline phosphatase count, calcium count, urea count, uric acid count, creatine count, amylase count, vitamin D level, anti-JC virus, anti-HCV, anti-HIV, anti-varicella, HIV antigen, urine JC virus DNA);

imaging data (e.g., including scans from or summaries of one or more: CTs, Mills, PET, or radiography)

treatment information (e.g., identifying each on-demand hemophilia treatment, each prophylactic hemophilia treatment, each surgery-associated hemophilia treatment, each selective bleed prevention treatment, each immune tolerance induction treatment, each non-hemophilia treatment, dates of each treatment, posology route of each treatment, reason for each treatment, any adverse event associated with each treatment);

adverse-condition information (e.g., identifying a date associated with occurrence of each adverse condition, a type of adverse condition, a treatment administered in response to an adverse condition, an outcome corresponding to treating the adverse condition);

joint-condition information (e.g., pain and mobility at each of one or more joints);

health-score information (e.g., a Hemophilia Joint Health Score, a Quality of Life score);

disability information (e.g., indicating whether an assisted mobility device is used, indicating which assisted mobility device is used, indicating when an assisted mobility device began being used), and/or bleeding-event information (e.g., identifying a date of each bleed, a number of bleeds experienced by the subject at a time or in total, a location of each bleed, a severity of each bleed, any cause of each bleed, whether each bleed was spontaneous or responsive to an injury, a result of an inhibitor test performed at a time associated with a bleed, whether and/or for how long a subject was hospitalized in response to a bleed, any treatment administered for each bleed, and any sustained disability or medical issues resulting from each bleed).

The data record(s) may further indicate to which of one or more actions (e.g., limited data sharing and/or limited data processing) the subject consented. For example, a provider may use a provider system 745 to upload a consent form (e.g., signed by the subject) that identifies particular types of data processing to which the subject consented. The data record(s) may further store predictions generated for the subject using one or more types of data processing (e.g., using a machine-learning model). Different entities may be authorized to access at least part of the subject record, though there may be differences with regard to which portions are made accessible. For example, a care provider of the subject and one or more operators of a remote computing system may have full access, while a laboratory and the subject may have access to information for select fields.

Each of one or more laboratory systems and/or each of one or more provider systems may include a computing system that includes (for example) one or more processors, one or more memories, one or more input/output components, and/or one or more communication components. A laboratory system 740 may further include laboratory equipment that automatically determines one or more sample-assessment-related metrics.

Central artificial-intelligence system 750 can include a remote system (e.g., cloud system) configured to perform processing that supports operation of hemophilia app 717. In some instances, an entity that controls and/or manages central artificial-intelligence system 750 also controls, manages and/or owns hemophilia app 717.

In some instances, central artificial-intelligence system 750 includes a cloud computing system. Central artificial-intelligence system 750 can include one or more servers and/or one or more virtual servers.

Central artificial-intelligence system 750 can include one or more communication components 755, which can include enable wireless communication (e.g., over the Internet) with one or more other devices (e.g., user device 705, laboratory system(s) 740 and/or provider system(s) 745). Communication component(s) 755 can include one or more transmitters, one or more receivers and/or one or more transceivers. Communication component(s) 755 may include one or more antennas.

Central artificial-intelligence system 750 can include one or more processors 760, which can include one or more single-core, multi-core, dual-core, quad-core, hexa-core or octa-core processors. Each of one or more processors 760 may (for example) have a clock speed greater than 50 MHz, 100 MHz, 500 MHz, 1 GHz, 1.5 GHz or 2.5 GHz. One or more processors 760 may include one or more central processing units and/or one or more graphical processing units.

Central artificial-intelligence system 750 can include one or more data storages 765, which can include one or more volatile memories (e.g., RAM), embedded storage chip, and/or one or more non-volatile memories (e.g., ROM, such as Flash memory). Data stored on one or more storages 765 may include code that, when executed by at least one of one or more processors 760, cause a set of operations to be performed. Data stored on one or more storages 765 may alternatively may include non-executable information (e.g., that may be retrieved and/or used by executable code).

Storage(s) 765 can store a population-level training code 766, one or more artificial-intelligence codes 767, one or more loss functions 768, a subject-specific adjustment code 769, one or more pre-processing functions 769, one or more post-processing functions 770, model-use data 772 and/or manifestation data 773. Central artificial-intelligence system 750 may have access to more extensive hemophilia-related data (corresponding to multiple subjects) and/or more powerful processors as compared to user device 705. Thus, it may be advantageous for central artificial-intelligence system 750 to predominately or entirely control training of population-level models and/or even partly or entirely control defining subject-specific model.

Population-level training code 766 can control training and/or defining one or more population-level artificial-intelligence (AI) models that generate hemophilia-related predictions. Each population-level artificial-intelligence model may be generated based on training data corresponding to multiple subjects and may be generated for potential use for multiple subjects. In some instances, a population-level artificial-intelligence model may be trained using a set of records in accordance with some or all of blocks 210-260 from process 200 depicted in FIG. 2 and/or some or all of process 500 depicted in FIG. 5.

A population-level AI model may include a pharmacokinetic model, machine-learning model, any type of model identified herein or other model. For example, a population-level artificial-intelligence model may include a compartmental-based model, a non-compartmental model, a physiological model, a modified Generative Adversarial Network, a neural network, a machine-learning model that uses a Bayesian framework, a model using a Markov Chain Monte Carlo simulation, etc.

A population-level AI model may be defined for particular types of uses that may correspond to attributes of data used to train the model. For example, a given population-level AI model may correspond to a particular type of hemophilia (e.g., hemophilia A, hemophilia B, or hemophilia C), a particular severity (e.g., mild, moderate or severe), a particular current treatment (e.g., particular factor concentrate, particular recombinant factor, emicizumab, no prophylactic treatment, etc.), a particular subject mobility (e.g., fully ambulatory without aid, ambulatory without aid for distances up to a defined threshold, ambulatory with unilateral aid, ambulatory with bilateral aid or walker, wheelchair assisted), particular types of genetic mutations, etc.

Population-level training code 766 may identify training data to use to train a particular AI model (of one or more AI models 767) by identifying data for which subjects authorized use of their data for training purposes and/or for which the constraint(s) of the AI model are satisfied. For example, for a population-level AI model that corresponds to hemophilia A subjects being treated with emicizumab, population-level training code 766 may identify subjects associated with hemophilia-A diagnosis data, emicizumab treatment data and indications of authorization to use data for model training.

In some instances, training data may be further selected to be representative of a predicted group of subjects for which it is predicted that the AI model would be used. For example, the vast majority (e.g., approximately 90%) of people diagnosed with hemophilia A or B are men. Thus, a training data set may be defined to correspond to a similar male:female ratio as occurs for a given set of AI model constraints. Meanwhile, hemophilia C affects men and women in rather even numbers. Thus, a training data set may be defined to evenly represent males and females. While this example pertains to a single attribute, prevalence of various combinations of attributes can further be considered. In some instances, a classifier can be used to determine whether attributes of subjects represented in the training set can be distinguished from attributes represented in a representative potential-user subject set.

In some instances, different AI models are defined for different subject groups. For example, multiple AI models may be generated that pertain to a particular type and severity of hemophilia and a particular treatment. Each of the multiple AI models may pertain to subjects corresponding to one or more hemophilia-independent attributes (e.g., a particular geographic region, particular age group, particular sex) and/or one or more hemophilia-related subject attributes (e.g., genetic mutation, having developed inhibitors, having hemophilia-related joint damage). Subject groups may be identified by (for example) performing a component analysis (e.g., principal component analysis or independent component analysis), mutual-information analysis, clustering analysis, etc. For example, a component analysis may indicate an extent to which each of a set of subject attributes accounts for variability in a hemophilia-related metric (e.g., whether a bleeding event occurs, a time constant pertaining to a factor level or active-ingredient concentration, etc.). With respect to each of two attributes accounting for the most variability, two attribute-specific sub-groups can be defined (e.g., based on a threshold or binary criteria), such that four groups in total are defined. As another example, a mutual-information analysis may be performed to identify subject attributes that most substantially reduce the entropy of a hemophilia-related metrics, and—for each attribute for which the mutual information exceeded a threshold—the attribute can be used to define a subject group. As yet another example, a clustering analysis may be used to cluster representations of subjects independently of a hemophilia-related metric that corresponds to an output of a target AI model that will be trained, and a different AI model can be generated for each cluster. As still another example, a clustering analysis may be used to cluster one or more hemophilia-related metrics, and subject attributes differentially associated with the clusters may be subsequently identified and used to define subject groups.

Training data can include static or deterministic data (e.g., a subject's age, race, age of hemophilia diagnosis, etc.) or data that corresponds to a particular point in time or a particular time period (e.g., type of initial hemophilia diagnosis, severity of hemophilia as of a given date, degree of joint damage as of a given date, administration of a given treatment beginning with a pre-identified time window, etc.). Such static, deterministic and/or snapshot data may correspond to input data variables. Training data may further include data that corresponds to one or more subsequent time points and/or time periods (e.g., indicating a number of bleeding events within a 2-year time period after initiating a given treatment, degree of joint damage as of 3 years after a treatment initiation, a number of adverse-event blood clots occurring within a given time period, an in vivo active-ingredient concentration at a set time relative to treatment administration, etc.). This additional data may be used as true labels and/or results during training.

In some instances, training data is used to define various variables and/or parameters using fitting techniques. For example, a time constant of decay of active-ingredient concentration may be calculated by fitting a given algorithm (e.g., exponential decay, regression, etc.). In some instances, training data is used to define various variables and/or parameters using a learning technique that operates in accordance with one or more loss functions 768. A loss function can identify which aspect of a prediction is to be optimized and how relative to corresponding true labels. For example, for a given input data set, an AI model may estimate that a concentration of a given active ingredient is at level ca, that an activity level of factor VIII is a, and that the probability of a bleeding event occur is at p. The loss function may indicate that, with respect to training, the variable that matters is p, and that a large penalty is to be imposed when a bleeding event occurs when a predicted probability of a bleeding event was low. The loss function may be linear, non-linear, dependent on one predicted value, dependent on multiple predicted values, etc. A loss function may indicate that an AI model is to be trained to optimize predictions corresponding to (for example) whether a bleeding event occurs within a given time period (e.g., occurring at a given time relative to treatment administration), a severity of a bleeding event (e.g., occurring at a given time relative to treatment administration), when a bleeding event occurs (e.g., relative to treatment administration), whether a subject remains on a treatment, occurrence of an adverse event, occurrence of a blood-clotting adverse event, a concentration of an active ingredient at a given time point (e.g., relative to treatment administration), an activity level of a factor at a given time point (e.g., relative to treatment administration), a clotting time at a given time point (e.g., relative to treatment administration), an assay result at a given time point (e.g., relative to treatment administration), mobility of a subject, change in mobility of a subject (e.g., over a given time period), and/or a combination thereof.

Subject-specific adjustment code 769 may be configured to perform a selection, training and/or configuration of an AI model based on data corresponding to a particular subject. In some instances, a set of AI models is selected for which each model-associated use condition is satisfied for the particular subject. For example, a use condition may identify a particular type of hemophilia, a particular treatment, a particular inhibitor status (e.g., with or without inhibitors), etc. The set of AI models may include (for example) different types of AI model architectures and/or different parameters. Subject-specific adjustment code 769 may select an AI model from among the set of AI models to be used for a particular subject.

The selection may be made by (for example) determining, for each AI model of the set of AI models, an extent to which attributes of the particular subject were represented in training data used to train the AI model and/or in data used to generate fits used by the AI model and selecting an AI model for which a metric of such representation is above a threshold or highest across the set of AI models. To determine the representation, an attribute similarity metric may be determined between the particular subject and each subject in the training data. For example, the attribute similarity metric may be calculated as a weighted sum of whether and/or an extent to which each of multiple particular attributes matched those of a training-data subject. For example, with respect to age, the similarity metric may depend on an inverse of an age difference between the particular subject and training-data subject (e.g., potentially capped to avoid a possibility of an infinite value). As another example, with respect to age, multiple age-difference ranges may be defined and associated with corresponding point values that contribute to the similarity metric. Weights used to calculate the similarity metric may be determined (for example) based on a degree to which the attribute was related to prediction accuracy in test data (e.g., such that higher weights are assigned when differences between attribute values of accurate predictions and attribute values of inaccurate predictions were larger and/or more significant), a degree to which the attribute is unique across a population of hemophilia subjects (e.g., such that higher weights are assigned when a subject attribute is more unique), and/or a variability of the attribute in training data (e.g., such that higher weights are assigned when there is lower variability of the attribute). In some instances, a similarity metric and/or weights are defined differently for each of the set of AI models (e.g., while a scale for the similarity metric may remain the same to facilitate cross-model comparisons). In some instances, a similarity metric and/or weights are defined the same way for each of the set of AI models.

A selected AI model may correspond to a AI model that is associated with (for example) a highest or above-threshold median, mean, mode, maximum or percentile similarity metric (across metrics calculated for all pairs between the particular subject and each subject in the training data). Thus, in some instances, an AI model selection may include selecting an AI model for which a "nearest neighbor" of the particular subject was represented in the training data.

In some instances, testing data can indicate whether and/or an extent to which an AI model prediction matched or corresponded to observed data. An AI model can be selected for a particular subject by determining, for each of the set of AI models, similarity metrics between attributes of the particular subject and attributes of subjects represented in the testing data for which predictions were accurate (or more accurate), potentially as compared to similarity metrics between attributes of the particular subject and attributes of other subjects represented in the testing data for which predictions were inaccurate (or less accurate). The selected AI model may be one associated with a highest or above-threshold correspondence to subjects associated with accurate predictions (e.g., potentially relative to correspondence to subjects associated with inaccurate predictions).

In some instances, subject-specific adjustment code 769 can perform subject-specific training. Such training may include (for example) using transfer learning, such that an AI model trained using data associated with a set of subjects (potentially selected from among a set of AI models using a technique disclosed herein) is accessed, and the parameters are used as part of a subsequent training. The subsequent training may be performed using data associated with the particular subject and/or with other similar subjects. For example, for each of a plurality of other subjects, a similarity metric may be determined based on attributes of the other subject and attributes of the particular subject (e.g., using a technique disclosed herein). Similar subjects may be identified as a subset of the plurality of other subjects associated with similarity metrics above a threshold and/or a particular number of other subjects associated with highest similarity metrics.

Transfer learning may include (for example) using one or more learned parameters (e.g., weights) as initial values or as frozen values to be incorporated in the subject-specific AI model. The parameters may include (for example) one or more time constants, one or more weights associated with connections between nodes in a neural network, one or more sub-networks and/or one or more layers. In some instances, a subject-specific AI model includes one or more additional filters, time constants, neural-network network layers, etc. that are not included in the population-level AI model and which are trained based on data associated with the particular subject and/or other similar subjects. In some instances, a subject-specific AI model includes one or more different parameters (e.g., weights, time constants, etc.), functions, and/or neural-network layers relative to those in the population-level AI model. Subject-specific adjustment code 769 can implement constraints and/or limits on one or more parameters, where the constraints are determined based on corresponding parameter values in the population-level AI model.

In some instances, subject-specific adjustment code 769 can generate a subject-specific workflow using one or more AI models. A workflow may include one or more pre-processing functions 770, one or more AI models 767, and/or one or more post-processing functions 771. A pre-processing function may (for example) normalize, standardize, encode, categorize, filter and/or otherwise process data before feeding the data to the AI model(s). For example, raw data may include a level of a clotting factor or a concentration of an active ingredient collected just prior to a previous treatment. The pre-processing can include implementing additive and/or multiplicative gain control and/or transforming the raw data to a ratio of the raw level or concentration relative to a level or concentration having been predicted by an AI model. The pre-processing can include transforming a raw data point using a linear or non-linear relationship, which may correspond to a transformation between subject-specific data and population data used to train and/or test a model. In some instances, a transformation can include additive and/or multiplicative gain control. As another example, a subject-specific code may compare a result from an assay conducted for the particular subject while experiencing an abnormal bleeding event to a predicted result generated by an AI model corresponding to a same or similar instance in time, and a corresponding additive or multiplicative transformation may be used for pre-processing the subject's data or for post-processing an output generated by a population-level AI model.

A pre-processing transformation may be determined by (for example) determining a relationship between one or more attributes of the particular subject relative to subjects used to train and/or test the AI model and/or a relationship between labels and/or results associated with the particular subject and corresponding data used to train and/or test the AI model. For example, a transformation may be determined based on a frequency of abnormal bleeds during a particular circumstance for the particular subject and corresponding to subjects represented in the training data. As another example, a multi-dimensional surface may be generated that relates attributes of subjects in training data to a statistic of observed results. A subject-associated position within the multi-dimensional plane that corresponds to the particular subject may be identified (e.g., based on attribute data, including demographic data, diagnosis data, laboratory data, etc.). A surface-representative position with the multi-dimensional surface (e.g., a mean or median centroid) may be identified, and a transformation may be identified based on the subject-associated position and the surface-representative position.

A post-processing transformation may be determined by (for example) relating one or more output predictions generated for the particular subject to one or more observed or predicted results (e.g., observed results corresponding to the particular subject, observed results corresponding to other subjects used to train the model, observed results corresponding to other subjects deemed to be similar to the particular subject and used to train or test the model, predicted results generated for other subjects used to train or test the model, predicted results for other subjects deemed to be similar to the particular and used to train or test the model, etc.). Post-processing may include implementing (for example) additive or multiplicative gain control and/or another transformation (e.g., activation function).

In some instances, post-processing function(s) 771 may be defined based on (for example) distribution, trend and/or point analyses. For example, it may be determined that point samples associated with the particular subject are below a predefined probability threshold of corresponding to a training-data distribution, which may trigger implementing a transformation of the point samples (e.g., based on a centroid and/or distribution statistic). As another example, a time constant may be calculated for a decay of a concentration/level of an active ingredient/factor level and may be compared to a time constant corresponding to training and/or testing data, and a post-processing may be defined based on the time constants.

In some instances, post-processing function(s) 771 may be determined based on an assay metric (e.g., aPTT metric) determined for the particular subject for a particular treatment circumstance (e.g., 2 days after receiving a particular dosage of a given treatment) relative to a statistical assay metric (e.g., mean or median aPTT metric or distribution of aPTT metrics) corresponding to the particular treatment circumstance as represented in the training data. For example, a clotting-time assay may be conducted for the particular subject using blood collected subsequent to administering a particular treatment dose after washout, and a result may be compared to comparable clotting times associated with subjects represented in the training data as determined based on similar circumstances. A post-processing technique may be implemented to (for example) exponentially scale an output from an AI model based on the comparison.

In some instances, a post-processing function associates a numeric model prediction with an action or recommended action (e.g., a transmission of a communication to a care provider or subject, a recommendation that a subject seek medical care, a recommendation that a subject reschedule a treatment administration, etc.). One or more rules and/or functions that relate the predictions to recommendations may be defined and/or adjusted based on subject-specific data (e.g., past bleeding-event frequency, mutation-based severity, state of mobility, etc.). For example, consultation recommendations may be more liberally recommended (e.g., associated with a larger range of prediction outputs) when a subject is associated with increased bleeding prevalence, increased bleeding susceptibility and/or decreased mobility.

In some instances, central artificial-intelligence system 750 transmits a population-level AI model, subject-specific AI model, subject-specific workflow, pre-processing function, post-processing function and/or workflow to user device 705. In some instances, user device 705 transmits data to central artificial-intelligence system 750, which executes one or more models, functions and/or workflows to generate a result, which is then returned to user device 705.

In some instances, a result of a population-level AI model, subject-specific AI code, pre-processing function, post-processing function and/or workflow depends on sensor data collected at user device 705. Sensor-data dependencies may be learned based on user data and/or population data. For example, a population-level AI model may learn a relationship between the probability and/or type of bleeding events and preceding movement data (e.g., collected using an accelerometer and/or gyroscope), and a subject-level AI model may learn one or more post-processing modifications to transform a population-based prediction to a subject-based prediction. As another example, a population-level AI model may predict the probability that a bleeding event (or a given type of bleeding event, such as a spontaneous bleeding event) will occur based on how recent sensor data associated with a subject compared to previous sensor data associated with the subject.

A pre-processing function 770 may be configured to estimate an activity type based on sensor data. For example, acceleration and/or gyroscope data may be used to infer whether a user is stationary, walking or running. Notably, such inference may account for a possibility that a user is stationary but inside a moving vehicle. An AI model (e.g., a population-level and/or subject-specific AI model) may then generate a prediction pertaining to a bleeding event (e.g., a probability of occurrence of a bleeding event potentially of a given type) based on whether a given type of activity (e.g., running) occurred within a recent time interval, a cumulative duration of a given type of activity (e.g., running or walking) over a recent time interval, estimated physiological data (e.g., maximum, median or mean heartrate) associated with a recent time interval based on the inferred recent activity, etc.

It will be appreciated that population-level AI models may further or additionally be implemented in workflows that include one or more-pre-processing functions 770 and/or one or more post-processing functions 771. Pre-processing function(s) 770 and/or post-processing function(s) 771 may be defined based on variability of one or more of: input data, subject attributes, subject demographic data, subject assay data, subject genetic data, bleeding-event timing, bleeding-event frequency, bleeding-event severity, model predictions, and so on. In some instances, a subject-specific AI model is defined to be and/or to include a population-level AI model (e.g., selected from among multiple population-level AI models).

Model use data 772 may indicate which models are being availed to and/or used by devices associated with various subjects. For example, with respect to a given subject, model use data 772 may indicate that 10 population-level models potentially apply to current circumstances of the subject, that 1 subject-specific model was generated for the subject, that results of the subject-specific model are being presented via a hemophilia app operating at a user device associated with the subject, and that the subject-specific model recently generated a particular set of predictions that were presented via the user device. Model use data 772 may further indicate an interaction with model-result data, which may include requesting (for example) that the model result data be transmitted to a provider system 745, that a treatment be rescheduled and/or that a recalculation be performed. In some instances, model use data 772 indicates accuracy of model predictions, For example, model use data 772 may include a user-input indication that a model prediction of a bleeding event having occurred by a particular date was inaccurate. Model use data 772 may be used to further train a population-level AI model and/or subject-specific AI model. In some instances, model use data 772 indicates which subjects (and/or attributes thereof) are using a model, and population-level training code 766 and/or subject-specific adjustment code 769 may further train a population-level AI model and/or subject-level AI model to improve accuracy for similar subjects and/or for other subjects that are not currently using the model.

Manifestation data 773 is an example of empirical result data that may be received by, availed to and/or stored at central artificial-intelligence system 750. Manifestation data 773 (or other empirical result data) may be used to assess accuracy of one or more population-level models, subject-specific models, population-level workflows and/or subject-specific workflows. Manifestation data 773 (or other empirical result data) may be monitored to determine whether to initiate re-training of an AI model, selecting a different AI model, adjusting pre- and/or post-processing functions used for a given subject, etc. Manifestations data 773 (or other empirical result data) may further indicate an accuracy of various model predictions, which may influence whether such models are subsequently used and/or retrained.

The depiction and description of FIG. 7 corresponds to an exemplary implementation as to what types of actions may be performed at user device and at central artificial-intelligence system 750. It will be appreciated that alternative action performances are contemplated. For example, one or more actions described as occurring at user device 705 may instead be performed at central artificial-intelligence system 750 and/or the converse. Further, one or more types of data (e.g., code, functions, models, etc.) described and/or depicted as being stored at user device 705 may alternatively or additionally be stored at central artificial-intelligence system 750, and/or one or more types of data described and/or depicted as being stored at central artificial-intelligence system 750 may additionally or alternatively be stored at user device 705.

It will be appreciated that a computing network may include one or more components, one or more characteristics and/or one or more functionalities identified in relation to FIG. 1 in addition to one or more components, one or more characteristics and/or more functionalities in relation to FIG. 7. For example, provider system(s) 745 can include (and/or can have one or more characteristics of) one or more of computer 105, laptop 110. and/or mobile device 115 and/or any of computer 105, laptop 110 and/or mobile device 115 can include (and/or can have one or more characteristics of) a provider system 745. As another example, central artificial-intelligence system 750 can include (and/or can have one or more characteristics of) cloud server 135, and/or cloud server 135 can include (and/or can have one or more characteristics of) artificial-intelligence system 750.

Figure 8:
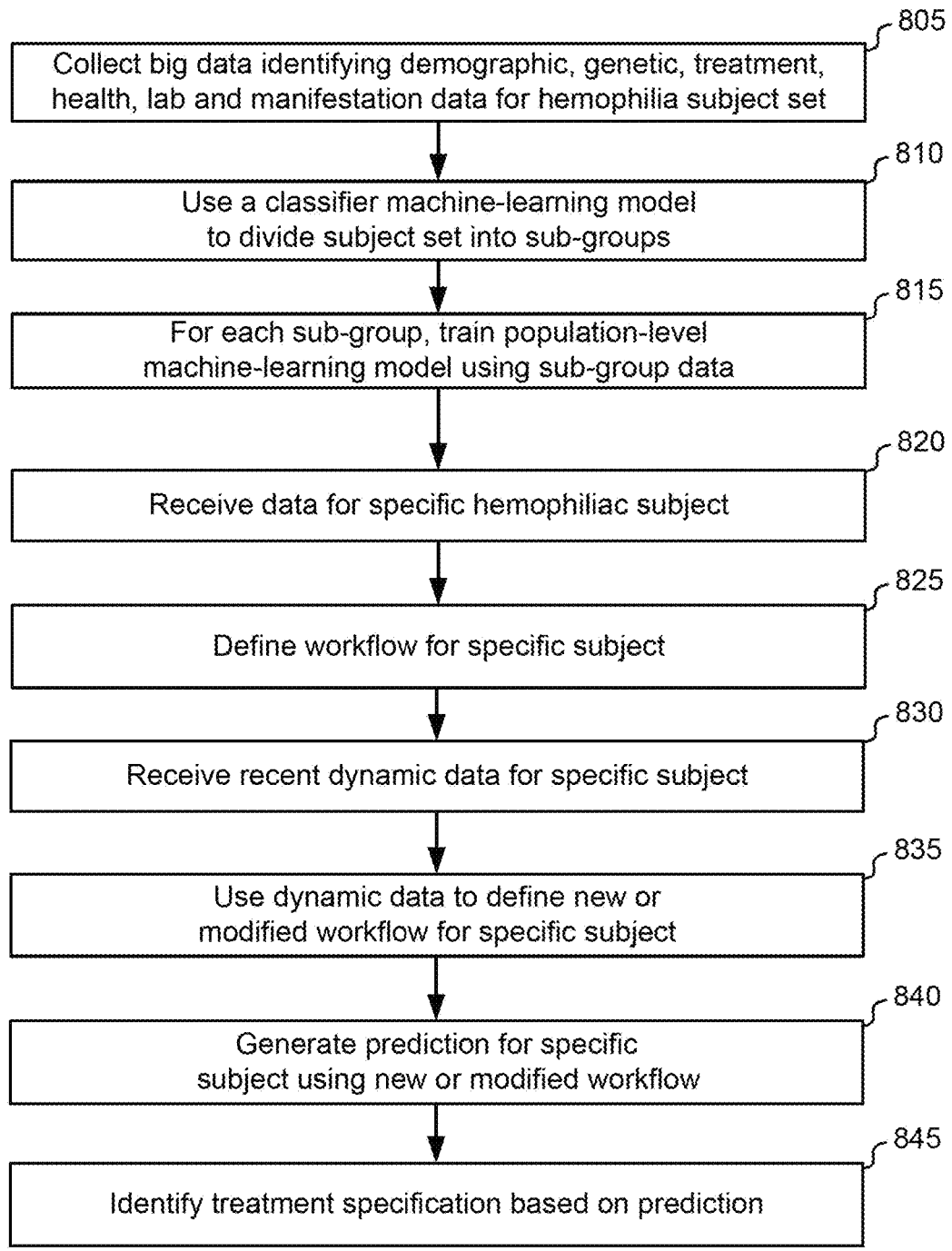
FIG. 8 illustrates a process for using a machine-learning model for facilitating identification of a hemophilia treatment strategy.

IV. Processes for Using Machine-Learning Model(s) to Inform Hemophilia Treatment FIG. 8 illustrates a process 800 for using a machine-learning model for facilitating identification of a hemophilia treatment strategy. Process 800 begins at block 805 where big data was collected. The big data can include data corresponding to a subject set including multiple subjects. Each of the multiple subjects may include a person diagnosed with hemophilia. The data can include, for each of some or all of the multiple subjects: demographic data (e.g., age, race, sex), physical data (e.g., weight, height), genetic data (e.g., identifying single nucleotide polymorphism mutations and/or copy-number variants), treatment data (e.g., identifying a current treatment, one or more previous treatments and/or one or more time periods throughout which the current and/or previous treatment(s) were used), health data (e.g., type of hemophilia with which a subject was diagnosed, a comorbidity, any other disease with which the subject is afflicted, a physiological metric), laboratory data (e.g., identifying a factor level with or without recent treatment having been administered, a factor level with or without recent treatment having been administered, a therapeutic concentration level with or without recent treatment having been administered) and/or manifestation data (e.g., frequency of bleeding events, time since last bleeding event). It will be appreciated that treatment data may indicate whether and/or when a subject received a given treatment (e.g., a treatment identified in Section II.D). It will also be appreciated that laboratory data may include a result of an assay or test (e.g., an assay or test identified in Section II.B).

In some instances, each of the multiple subjects has been receiving a same hemophilia treatment. In some instances, each of the multiple subjects has not been and/or has not received any hemophilia treatment. In some instances, each of the multiple subjects has a same type of hemophilia (e.g., Hemophilia A, B or C). In some instances, each of the multiple subjects has a same or similar severity of hemophilia. In some instances, at least some of the multiple subjects differ with regard to current hemophilia treatment, past hemophilia treatment, hemophilia type and/or hemophilia severity and/or demographics.

At block 810, a classifier machine-learning model can be used to divide the subject set into sub-groups. In some instances, the subject set is divided based on static subject information (e.g., demographic information, a type of hemophilia with which a subject was initially diagnosed, a severity of hemophilia with which a subject was initially diagnosed, etc.) and/or recent subject information (e.g., a current treatment, a recent frequency of bleeding events, a recent mobility status, etc.). Additionally or alternatively, the subject set may be divided based on results from one or more assays (e.g., disclosed in Section II.B) and/or one or more hemophilia treatments (e.g., disclosed in Section II.D) that the subjects are presently receiving or received within a recent time window. It will be appreciated that the extent to which any variable influences class assignments may depend on learned parameters of the classifier and/or distribution of values in a multi-dimensional space across the subject set.

The classifier machine-learning model may include (for example) a perceptron, decision tree, regression, nearest neighbor, support vector machine or a component (e.g., principal component) model. The classifier machine-learning model may be trained using at least some of the fields collected at block 805 as input variables. In some instances, the sub-groups are identified based on data corresponding to one or more initial time points (e.g., corresponding to a date of diagnosis and/or to a date of a treatment selection), based on static information (e.g., a type and/or severity of hemophilia with which a subject was initially diagnosed) and/or are not identified based on labels identifying subsequent disease characteristics. For example, the sub-groups may be identified based on data reflect initial demographic, diagnosis and/or laboratory data of subjects. The classifier may be trained using unsupervised learning, such that the sub-groups are defined based on input data and not corresponding labels. In some instances, the sub-groups are identified based on data corresponding to one or more initial time points and also based on one or more subsequent time points. For example, input data may reflect demographic, diagnosis and/or laboratory data associated with one or more initial time periods, and label data may reflect bleeding-event occurrence, a factor concentration, a clotting time, a subject mobility and/or survival at one or more subsequent time periods. The classified may be trained using supervised learning, such that sub-groups are defined based on input data (e.g., associated with one or more initial times) and label data (e.g., associated with one or more subsequent times).

At block 815, for each subgroup, a population-level machine-learning model is trained using data for the sub-group. In some instances, some or all of the population-level machine-learning models trained for different subgroups are of a same type of machine-learning model (e.g., a same type of pharmacokinetic model, a pharmacokinetic model, a machine-learning model or a same type of machine-learning model, etc.).

The training may involve supervised learning using training data associated with a set of subjects. Each of the population-level machine-learning models can be trained to predict (for example) a probability of occurrence of a bleeding event (e.g., any type of bleeding event or a spontaneous bleeding event) within a predefined time period, a number of bleeding events (e.g., within a given time period), a rate of decay of a factor level, a rate of decay of a level of a therapeutic, a rate of change of a factor level at a given time relative to a treatment administration time, etc. In some instances, labels used to train the population-level machine-learning model(s) are binary. In some instances, labels used are non-binary (e.g., numeric on a continuous scale, categorical, etc.).

At block 820, data is received for the specific subject. The specific subject may have been diagnosed with hemophilia. The specific subject may include one not included in the hemophilia subject set.

The data may include (for example) demographic, genetic, treatment health, lab and/or manifestation data for the specific subject. For example, the data received at block 820 may identify (for example) a type of hemophilia with which the specific subject was diagnosed, a severity of hemophilia with which the specific subject was diagnosed, a type of mutation detected via processing a sample of the specific subject, one or more assay results (e.g., identifying one or more clotting times), a current hemophilia treatment being received by the specific subject, one or more hemophilia treatments previously received by the specific subject, past bleeding event information (e.g., identifying a frequency of spontaneous bleeding events and/or of non-spontaneous bleeding events) and/or a level of mobility.

At block 825, a subject-specific machine-learning workflow is defined for the specific subject using at least part of or all the data received at block 820. Defining the workflow can include (for example) selecting and/or training a specific population-level machine-learning model for the specific subject. Defining the workflow can alternatively or additionally include selecting and/or configure one or more pre- and/or post-processing techniques to use for the specific subject.

In some instances, yet another model is used to select a population-level machine-learning model to use for the specific subject. The other model may include (for example) a decision tree, classifier, rules-based model, etc. The selection may be made by using data associated with the subject to (for example) assign the data to a cluster used to divide the subject set into sub-groups (and to then select a population-level machine-learning model associated with the cluster), identify a nearest neighbor from a training data set associated with the hemophilia subject set (and to then select a population-level machine-learning model trained using data from the nearest neighbor), etc. In some instances, a selected population-level machine-learning model can be further trained using subject-specific data.

As another example, block 825 may include identifying a post- and/or pre-processing to be applied for a specific subject. For example, one or more linear or non-linear transformations (or one or more models) may be applied to transform data pertaining to the specific subject prior to feeding the data to a machine-learning model. As another example, one or more transformations (or one or more models) may be applied to transform a result generated by a machine-learning model to a subject-specific result. A pre-processing and/or post-processing technique may be determined based on (for example) identifying a distance and/or vector between a multi-dimensional representation (e.g., based on all or part of an input data set associated with a machine-learning model) of the specific subject as compared to representations of other subjects used to train a machine-learning model, determining a transformation based on portions of the subject data set associated with similar distances and/or vectors (e.g., and a same subject-level machine-learning model) and/or identifying a scaling factor (e.g., using a look-up data and/or defined relationship).

As one example, a level of a therapeutic may be measured in a sample of the specific subject at a particular time after administration of a particular dosage of the therapeutic. The level (and potentially the particular time and/or particular dosage) may be used to calculate a clearance metric for the specific subject, which may then be used to configure a post-processing algorithm (e.g., a non-linear post-processing algorithm) to modify an output of a population-level machine-learning model (e.g., based on a comparison between the specific subject's clearance metric and clearance metrics associated with subjects used to train the model).

At block 830, recent dynamic data associated with the specific subject is received. The recent dynamic data may characterize one or more occurrences (e.g., treatment prescription, treatment administration, bleeding-event occurrence, laboratory result identification, etc.) occurring after one or more times at which the data received at block 820 were identified and/or were received (at block 820). In some instances, the recent data may characterize one or more occurrences occurring after the workflow was defined at block 825.

Dynamic data may indicate (for example) when a treatment schedule, when a particular administration of a therapeutic occurred (e.g., and/or which therapeutic was received and/or a dosage thereof), that a recent abnormal bleeding event occurred (and potentially indicating whether the bleeding event was triggered, whether the bleeding event was internal, any therapeutic response received for the bleeding event and/or whether the bleeding event resulted in any sustained injury), and/or a new laboratory result (e.g., identifying a clotting time, a therapeutic concentration and/or a factor level absent any treatment and/or at a particular time relative to administration of a particular treatment).

At block 835, the dynamic data can be used to define a new or modified workflow for the subject. For example, a new population-level machine-learning model may be selected for the specific subject. The new selection may be made in response to determining that (for example) the recent dynamic data is distinguishably different from corresponding data in a training data set associated with a sub-group used to train the population-level machine-learning model, a pre-processing technique or a post-processing technique used in the workflow for the specific subject. The new selection may alternatively or additionally be made in response to determining that (for example) the recent dynamic data differs from corresponding predictions that were or would have been generated by the workflow for the specific subject by at least a threshold amount (e.g., 10%, 20%, 30%). The new selection may alternatively or additionally be made in response to determining that (for example) a probability of the recent dynamic data occurring as predicted via the workflow defined at block 825 was below a predefined threshold (e.g., 80%, 60%, 50%, 33%,).

At block 840, a hemophilia-pertinent prediction is generated for the subject using the new or modified workflow. The prediction may include (for example) a predicted rate constant (e.g., of absorption, distribution, metabolism and/or excretion of a therapeutic), a predicted level (e.g., concentration) of a therapeutic or a factor (e.g., at a particular time point, at a particular time relative to a treatment administration, etc.), a predicted dosage and/or administration interval of a therapeutic sufficient to maintain predicted clotting times within a predefined range, a predicted probability of a bleeding event occurring within a time interval, etc.

At block 845, a treatment specification is identified based on the prediction. Block 845 may include (for example) selecting a therapeutic agent, selecting a dosage of a treatment (or active ingredient) to be administered, selecting a frequency of administration of a treatment, identifying a treatment administration schedule, etc. Block 845 may alternatively or further include determining whether to recommend a short-term preventative treatment. For example, treatment specification may include and/or accord with a current treatment specification when the prediction is satisfactory (e.g., when a predicted concentration of a therapeutic is above a predefined threshold, a predicted probability of a bleeding event is below a predefined threshold, a predicted clotting time is within a predefined range). As another alternative or additional example, the new or modified workflow may be used to identify an adjusted treatment dosage and/or treatment schedule.

The treatment specification may be output. For example, the treatment specification may be output (e.g., as a recommendation) via a display of information on a device of the specific subject and/or a device of a care provider of the specific subject. As another example, the treatment specification may be transmitted to a device of a care provider of the specific subject.

It will be appreciated that part or all of process 800 may be performed at a device of the specific subject; part or all of process 800 may be performed at a computing system associated with a medical provider associated with the specific subject; and/or part or all of process 800 may be performed at a remote computing system.

Figure 9:
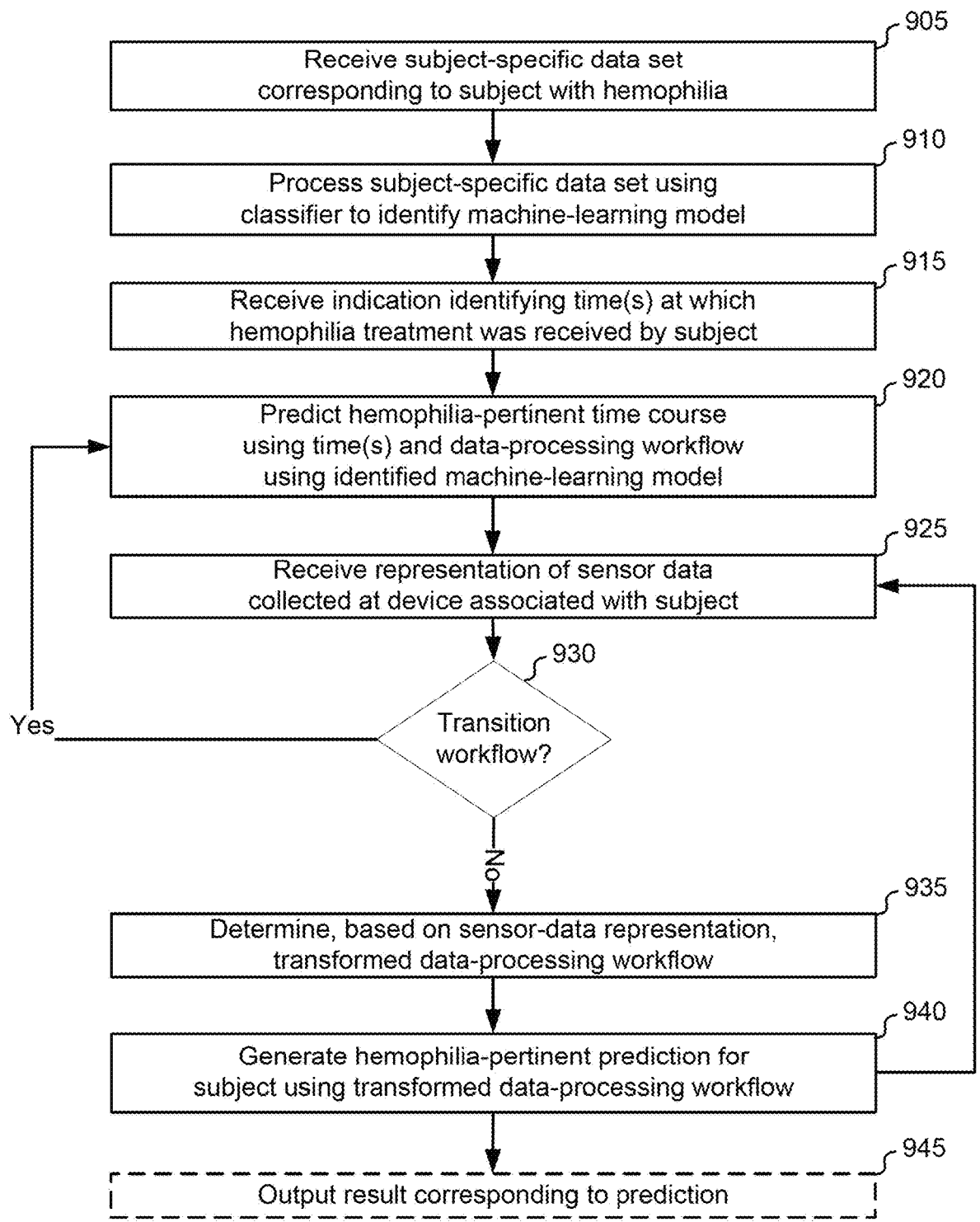
FIG. 9 illustrates a process for using sensor data to generate a hemophilia-related result.

FIG. 9 illustrates a process 900 for using sensor data to generate a hemophilia-related results. Process 900 begins at block 905 where a subject-specific data set corresponding to a specific subject having been diagnosed with hemophilia is received. The subject-specific data set may include (for example) demographic data (e.g., age, race, sex), physical data (e.g., weight, height), genetic data (e.g., identifying single nucleotide polymorphism mutations and/or copy-number variants), treatment data (e.g., identifying a current treatment, one or more previous treatments and/or one or more time periods throughout which the current and/or previous treatment(s) were used), health data (e.g., type of hemophilia with which a subject was diagnosed, a comorbidity, any other disease with which the subject is afflicted, a physiological metric), laboratory data (e.g., identifying a factor level with or without recent treatment having been administered, a factor level with or without recent treatment having been administered, a therapeutic concentration level with or without recent treatment having been administered) and/or manifestation data (e.g., frequency of bleeding events, time since last bleeding event). In some instances, at least some of the subject-specific data set was initially identified via a communication (e.g., received at a care-provider device and/or remote server) from a device of the subject. In some instances, at least some of the subject-specific data set includes or was based on one or more photographs (e.g., collected at a device of the subject). The photograph(s) may depict (for example) a bleed, injury, bruise, or site of a previous bleed. In some instances, at least some of the subject-specific data was initially identified via and/or was received from an electronic medical record corresponding to the subject. The subject-specific data set may include and/or may consist of recent, current and/or static information. It will be appreciated that treatment data may identify a treatment that the subject is receiving or recently received (e.g., a treatment identified in Section II.D). It will also be appreciated that laboratory data may include a result of an assay or test (e.g., an assay or test identified in Section II.B).

At block 910, at least part of the subject-specific data set is processed using a classifier to identify a machine-learning model to be used to generate predictions for the specific subject. The at least part of the subject-specific data set may include the type of hemophilia, demographic data, and/or treatment data. The at least part of the subject-specific data set may alternatively or additionally include the photograph (s). The classifier may include (for example) a perceptron, decision tree, regression, nearest neighbor, support vector machine or a component (e.g., principal component) model. The classifier may be trained using training data that includes values for at least some of the fields included in the subject-specific data set received at block 905. The values, or representations thereof, may be provided as inputs to the model, and outputs generated by the model during training may be compared to labels (e.g., numeric or categorical labels) in the training data set via a loss function. The classifier may include (for example) a neural network (e.g., a convolutional neural network) configured to process the photograph(s). The neural network may (for example) generate an output that predicts whether the photograph(s) depict a bleeding event and/or a type of bleed that is depicted (e.g., whether a bleed or bruise is depicted, a location of the bleed/bruise, a size of the bleed/bruise, etc.).

In some instances, initial subject data (e.g., corresponding to the specific subject or to subjects in a training set) can be encoded, and the encoded representations can be provided as input to the model. The encoding may include a categorical encoding technique, such as one-hot encoding, ordinal encoding, contrast encoding, binary encoding, etc. For example, one-hot encoding may represent categorical values as a set of binary numbers representing each potential category. In some instances, a numeric value (e.g., age) is converted into a categorical value (e.g., an age bin), which may then be encoded via one-hot encoding. In some instances, numeric data is converted into categorical data using a set of ranges, and the categorical data can then be encoded using a categorical encoding technique.

The encoded representations of the values may then be aggregated and fed into a model. In some instances, each value of the encoded representation is fed into a separate node in an input layer of a neural network. In some instances, the encoded representations are concatenated and transformed into a feature vector (e.g., using a classifier machine-learning model). The feature vector may be used to identify the machine-learning model. For example each of a set of models may correspond to a position within a multi-dimensional space, such that a distance between the position of each model's representation and a position associated with the feature vector associated with the subject can be calculated. A model associated with a minimum distance may be selected.

In some instances, the machine-learning model is identified using subject-specific data corresponding to one or more initial time points (e.g., corresponding to a date of diagnosis and/or to a date of a treatment selection), based on static information (e.g., a type and/or severity of hemophilia with which a subject was initially diagnosed) and/or are not identified based on labels identifying subsequent disease characteristics. For example, the machine-level model(s) may be identified based on data reflect initial demographic, diagnosis and/or laboratory data of specific subject. An identified machine-learning model may include (for example) a model having one or more characteristics disclosed herein (e.g., in Section III.F), a pharmacokinetic model and/or a neural network.

The machine-learning model may include a population-level machine-learning model trained using training data corresponding to a population of subjects or may be a subject-specific machine-learning model trained at least in part using training data associated with the specific subject. For example, the subject-specific machine-learning model may have been initialized with parameters from the population-level machine-learning model and may have been further trained using data from the specific subject. The subject-specific machine-learning model and/or subject-specific model may have been generated using a technique disclosed herein (e.g., as disclosed in relation to network 700 and/or process 800) and/or may have a characteristic as disclosed herein (e.g., as disclosed in relation to network 700 and/or process 800).

It will be appreciated that a rules-based approach may be used instead of a classifier. For example, each of a set of machine-learning models may be trained using training data corresponding to a set of subjects having one or more same characteristics (e.g., having hemophilia A, hemophilia B, hemophilia C, a particular severity level, a particular current treatment, inhibitor presence, etc.). A model selected at block 910 to be used for a specific subject may include one trained using training data associated with other subjects sharing one or more characteristics (e.g., hemophilia type, hemophilia severity, treatment, demographic attribute, etc.) with the specific subject. For example, a set of population-level machine-learning models may include a 4 models: a first trained using training data associated with subjects having mild or moderate Hemophilia A; a second trained using training data associated with subjects having severe Hemophilia A; a third trained using training data associated with subjects having mild or moderate Hemophilia B; and a fourth trained using training data associated with subjects having severe Hemophilia B. If a given subject has moderate Hemophilia B, the third model may then be selected.

In some instances, only a single machine-learning model is stored and/or trained, and the single machine-learning model can then be identified for use in block 910. In some instances, block 910 alternatively or further includes identifying (e.g., using a classifier)) one or more pre-processing and/or post-processing functions. In some instances, block 910 alternatively or further includes identifying (e.g., using a classifier) a workflow.

At block 915, an indication is received that identifies one or more times at which a hemophilia treatment was received by the specific subject. The indication may identify (or information may otherwise be available that indicates) which type of treatment was received and/or a dosage of treatment that was received). Block 915 may include receiving information about times at which one or more prophylactic treatments were received and/or at which one or more manifestation treatments were received. In some instances, block 915 indicates that the specific subject has not received any hemophilia treatment within a given time period.

At block 920, a hemophilia-pertinent time course is predicted using the treatment information (e.g., treatment administration time(s), treatment time and/or treatment dosage) and the selected machine-learning model. The time course may predict how a hemophilia-pertinent variable varies over time. A hemophilia-pertinent variable can include (for example) a clotting time (e.g., any clotting time disclosed herein), a factor level, a concentration of a therapeutic (e.g., of or associated with the treatment), and/or a probability of a bleeding-event occurrence varies. Block 920 may include (for example) predicting one or more rate constants, predicting a value for the hemophilia-pertinent variable for each of one or more times and/or predicting a function that identifies how the hemophilia-pertinent variable changes in time.

It will be appreciated that a workflow used to generate predictions for the specific subject may be configured to receive input indicating when treatments were received and may further receive other types of information. Other types of information may include (for example) some or all of the subject-specific data set received at block 905. For example, a workflow may receive—in addition to treatment administration times—a weight, height and age of the specific subject and/or past laboratory data associated with the specific subject. The workflow may include the population-level machine-learning model identified at block 910 (or a subject-specific machine-learning model built based on population-level machine-learning model identified at block 910). In some instances, the workflow further includes one or more pre-processing functions and/or one or more post-processing functions.

It will be appreciated that the treatment information may be encoded (e.g., using a technique disclosed in relation to block 910) and/or represented as a feature vector. The encoded and/or feature-vector representation may then be fed to the workflow and/or machine-learning model. In some instances, input that is fed to the workflow and/or machine-learning model further represents at least part of the subject-specific data set received at block 905. For example, the input may represent a height, weight, age and/or sex of the subject and/or a hemophilia severity level of the subject.

The predictions generated at block 920 may be used to (for example) determine whether and/or when a predicted value crosses a threshold (e.g., that represents an increased risk of abnormal bleeding events), such that an alert may be presented. The predictions may alternatively or additionally be used to generate a recommended treatment schedule (e.g., to maintain a predicted probability of an abnormal bleeding event, a predicted clotting time, a predicted factor level and/or a predicted therapeutic level within an acceptable predefined closed or open range).

At block 925, a representation of sensor data that was collected at a device associated with the subject may be received. The device may include (for example) a smart phone, wearable smart device, smart watch, smart headset, smart headphones, etc. The sensor data may include (for example) accelerometer data, gyroscope data and/or GPS data. The sensor data may include physiological data and may include (for example) a heart rate. The representation of the data may include the sensor data itself or a processed version thereof. For example, a processed version may include a normalized or regularized metric (e.g., relative to other data collected by a same sensor, other data collected at a same device and/or other data collected at other devices) and/or one or more statistic (e.g., sum, average, maximum or median value of raw or processed data over a time period). As another example, a processed version may include an estimated number of steps taken by, an estimated distance traveled by a subject during a given time period, an estimated speed statistic (e.g., average, median or maximum speed) over a time period, or an estimated portion of a time period during which the subject was stationary. Sensor data may be received (for example) relatively continuously, periodically, in response to a pull request, or in response to receiving a request for an updated prediction.

At block 930, a determination is made as to whether to transition to a new or modified workflow (e.g., from a workflow that includes the machine-learning model identified at block 910). In some instances, block 930 includes determining whether a workflow-transition condition is satisfied, such that the workflow used to predict the hemophilia-pertinent time course at block 910 is to continue to be used unless the workflow-transition condition is satisfied.

The determination of block 930 can be based on the representation of the sensor data, a processed version of the sensor data, the photograph(s), and/or a processed version of the photograph(s). For example, it may be determined that the workflow transition is to occur if a statistical analysis (e.g., a Monte Carlo analysis) indicates that a probability of having detected the sensor data (or a representation and/or processed version thereof) is below a predefined threshold or that a probability of the subject having experienced a bleeding event or bleeding event of a given type (e.g., as depicted in the photograph(s) is below a predefined threshold. The predefined threshold may be determined based on past sensor data collected from the device, past sensor data collected in association with the specific subject, past sensor data collected in association with a set of other subjects, a frequency of bleeding events previously detected in association with the specific subject, and/or a frequency of bleeding events previously detected in association with a set of other subjects. To illustrate, an analytical and/or probability-based approach may identify a threshold associated with sensor data that represents that there is a 5% chance (or any other percentage chance) of such sensor data (or a bleeding event) being observed in a given data set. If a threshold crossing or other condition satisfaction indicates that it was sufficiently unlikely that particular sensor data (or a processed version thereof and/or representation thereof) would be observed within a given underlying data distribution, it may be determined at block 930 to discontinue (e.g., permanently discontinue or temporarily discontinue) use of the workflow and/or to transition to a new or modified workflow for hemophilia-pertinent predictions.

If it is determined to continue to use the workflow, process 900 can return to block 920 and new predictions can be generated using the workflow. If it is determined not to transition the workflow, process 900 can proceed to block 935, at which a transformed data-processing workflow can be determined based on the sensor-data representation.

Abnormal, different or outlier sensor data may indicate (for example) that a subject is becoming increasingly limited by and/or disabled by his/her hemophilia and/or that pharmacokinetic rate constants have changed, are changing or will change. For example, increased disability may indicate that previously treatment was not sufficiently aggressive. As another example, increased movement may correspond to more rapid distribution, absorption, metabolism and/or excretion as compared to more modest or no movement. Abnormal, different or outlier sensor data may alternatively or additionally indicate that the subject is at higher risk for an abnormal bleeding event (e.g., at a higher risk for a spontaneous abnormal bleeding event or a triggered abnormal bleeding event). Further, an unpredicted bleeding event (e.g., depicted in a photograph) may suggest that pharmacokinetic rate constants previously used for the subject are not properly representing the subject's physiology.

Transforming the data-processing workflow may include selecting a new machine-learning model, which may have a same or different architecture as the model used at block 920. For example, both models may include a same type of pharmacokinetic models with different learned parameters (e.g., and trained using different training data). As another example, the machine-learning model used at block 920 may include a first type of pharmacokinetic model, and the machine-learning model used in the transformed data-processing workflow may include a different second type of pharmacokinetic model. In one instance, one or more activation functions, weights and/or thresholds used in the machine-learning model at block 920 differs from one or more activation functions, weights and/or thresholds used in the transformed data-processing workflow.

A change in an activation function or threshold may represent that (for example) even a same level of a therapeutic, factor level or probability of an injury-triggered bleeding event being abnormal may correspond to different risks in different activity scenarios. A risk of injury may be higher during a high-intensity activity, thus the machine-learning model may learn to shift an activation function and/or lower a threshold. Alternatively or additionally, depiction of an unpredicted bleeding event may trigger a shift in an activation function and/or lowering of a threshold. This adjustment may facilitate more accurately and/or cautiously predicting whether an abnormal bleeding event will occur (e.g., by accounting for differences in injury risk) and/or more appropriately facilitating advising a subject whether to change an activity (to reduce risk of abnormal bleeding) and/or to receive treatment.

It will be appreciated that if an activation function or threshold is different, one or more other parameters may (but need not) differ between the models as well. For example, differences in coefficients and/or weights may represent differences in pharmacokinetic values, whereas a difference in an activation function or threshold may represent a difference in a predicted injury probability.

Transforming the data-processing workflow can include (for example) introducing or changing a pre- or post-processing. For example, a threshold that is used in post-processing to determine whether to issue an alert may be adjusted such that it is more likely that an alert identifying a risk of an abnormal bleeding event in response to detecting sensor data indicative of high movement or in response to a photograph having depicted a bleeding event. As another example, parameters used in a machine-learning model may be adjusted to reflect different rate constants (corresponding to faster rates) for absorption, excretion, metabolism and/or distribution. As yet another example, a different machine-learning model (e.g., a pharmacokinetic model or neural network) may be selected to use in lieu of the machine-learning model identified at block 910. The different machine-learning model may have a same or different architecture relative to the machine-learning model selected at block 910. The different machine-learning model may have been trained using training data corresponding to hemophilia subjects who were more (or less) active relative to hemophilia subjects associated with a training data set used to train the machine-learning model identified at block 910.

In some instances, a first training data set is used to train the machine-learning model (e.g., and/or one or more pre-processing functions and/or one or more post-processing functions) used at block 925, and a second training data set is used to train the machine-learning model (e.g., and/or one or more pre-processing functions and/or one or more post-processing functions) in the transformed data-processing workflow. Subjects corresponding to the first training data set may be the same as, entirely different than or partly different than subjects corresponding to the second training data set. In some instances, the first training data set or another training data set used to further train the machine-learning model (e.g., and/or one or more pre-processing functions and/or one or more post-processing functions) used at block 925 may (but need not) include data corresponding to the subject for whom predictions are generated in process 900. The second training data set or another training data set used to further train the machine-learning model (e.g., and/or one or more pre-processing functions and/or one or more post-processing functions) used at block 935 may (but need not) include data corresponding to the subject for whom predictions are generated in process 900.

In some instances, a first training data set is used to train the machine-learning model (e.g., and/or one or more pre-processing functions and/or one or more post-processing functions) used at block 925, and a third training data set is used to learn how to modify the machine-learning model (e.g., and/or one or more pre-processing functions and/or one or more post-processing functions) in response to detecting various types of sensor data, inferring different types of activities, inferring different subject exertion or intensity levels, etc. The third training data set may (but need not) include data corresponding to the subject for whom predictions are generated in process 900.

The first, second and/or third training data sets may include (for example) labels that correspond to assay results and/or whether abnormal bleeding was observed.

At block 940, a new hemophilia-pertinent prediction is generated for the specific subject using the transformed data-processing workflow. In some instances, treatment information (e.g., identifying a time, dosage and/or type of one or more treatment administrations), part or all of the subject-specific data set received at block 905 and/or activity data based on and/or including the sensor data are input into the transformed workflow. In some instances, one or more state variables and/or interim variables are identified from the initially identified machine-learning model and/or a workflow that uses the initially identified machine-learning model. The transformed data-processing workflow may be configured and/or may be fed the state variable(s) and/or interim variable(s). For example, block 920 may include repeatedly predicting a current level of a therapeutic, factor and/or inhibitor, and the transformed data-processing workflow may be initialized to include the predicted current level(s).

A hemophilia-pertinent prediction may predict (for example) a level (e.g., concentration) of a factor and/or therapeutic, a clotting time, a risk of an abnormal bleeding event occurring (e.g., spontaneously or following an injury). A hemophilia-pertinent prediction may correspond to a same type of prediction as generated at block 920. A post-processing function in the transformed data-processing workflow may determine whether a given condition is satisfied based on an output from a machine-learning model used in the transformed data-processing workflow. For example, a post-processing function may determine whether a predicted value exceeds a threshold (e.g., is below a factor-level threshold, below a therapeutic-level threshold, above a clotting-time threshold or above an abnormal-bleeding-risk threshold). A threshold used in the transformed data-processing workflow may be different than a threshold used in an initial workflow.

In some instances, a result generated based on the transformed data-processing workflow is output at block 945. Outputting the result may include displaying or transmitting the result (e.g., to a device associated with the specific subject or to a medical provider). The result may include an output from the transformed data-processing workflow or a processed version thereof. In some instances, a result corresponds to an alert (e.g., identifying a low predicted factor level) or an instruction (e.g., for a subject to contact a medical provider or the reverse or to facilitate treating the subject). For example, a recommendation may be for the subject to receive a dosage of factor concentrate, recombinant factor concentrate and/or other fast-acting treatment. The treatment that is recommended and/or provided may differ or be the same from any, one or all treatments that the subject receives prophylactically.

Whether the result is output may depend on whether a predefined condition is satisfied. For example, the result may be selectively output when a prediction from the transformed data-processing workflow is within a predefined open or closed range. As another example, the result may be selectively output when a prediction from the transformed data-processing workflow is equal to 1, indicating satisfaction of an alert condition.

Process 900 may further return from block 940 to block 925, such that workflows are dynamically selected and used to process new sensor data.

It will be appreciated that part or all of process 900 may be performed at a device of the specific subject; part or all of process 900 may be performed at a computing system associated with a medical provider associated with the specific subject; and/or part or all of process 900 may be performed at a remote computing system.

Figure 10:
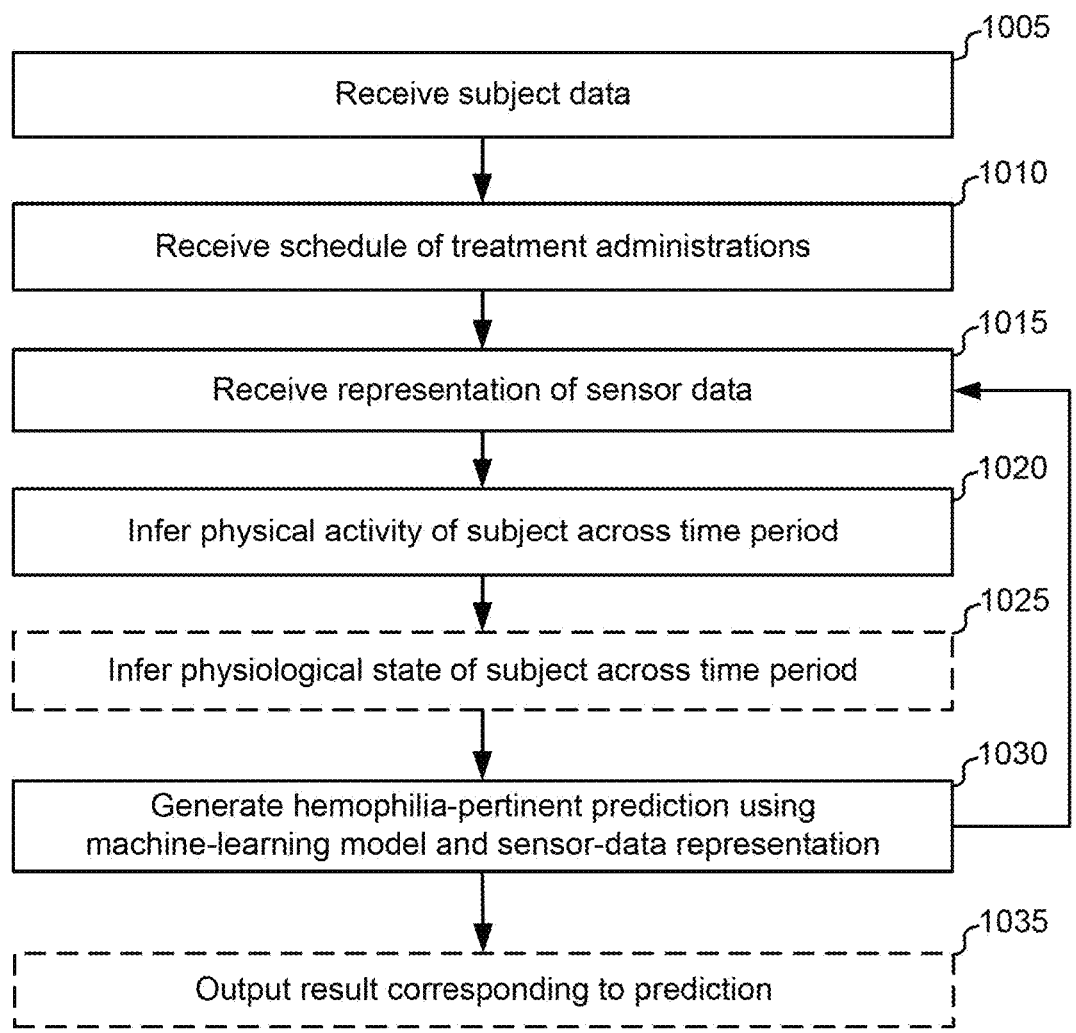
FIG. 10 illustrates a process for generating a model prediction using a machine-learning model and sensor-based post-processing.

FIG. 10 illustrates a process 1000 for generating a model prediction using a machine-learning model and sensor-based post-processing. Process 1005 begins at block 1005, where subject data is received. The subject data set may include (for example) demographic data (e.g., age, race, sex), physical data (e.g., weight, height), genetic data (e.g., identifying single nucleotide polymorphism mutations and/or copy-number variants), treatment data (e.g., identifying a current treatment, one or more previous treatments and/or one or more time periods throughout which the current and/or previous treatment(s) were used), health data (e.g., type of hemophilia with which a subject was diagnosed, a comorbidity, any other disease with which the subject is afflicted, a physiological metric), laboratory data (e.g., identifying a factor level with or without recent treatment having been administered, a factor level with or without recent treatment having been administered, a therapeutic concentration level with or without recent treatment having been administered) and/or manifestation data (e.g., frequency of bleeding events, time since last bleeding event). The subject data set may include and/or may consist of recent, current and/or static information. It will be appreciated that treatment data may identify a treatment (e.g., a treatment identified in Section II.D) that the subject is receiving or recently received. It will also be appreciated that laboratory data may include a result of an assay or test (e.g., an assay or test identified in Section II.B).

At block 1010, a schedule of treatment administrations is received. The schedule may include one or more times at which one or more treatments were administered. The times may, but need not, be evenly spaced. Block 1010 may include receiving information about times at which one or more prophylactic treatments were received and/or at which one or more manifestation treatments were received. In some instances, block 1010 indicates that the specific subject has not received any hemophilia treatment within a given time period.

At block 1015, a representation of sensor data is received. The sensor data may have been collected at a user device associated with the subject. The device may include (for example) a smart phone, wearable smart device, smart watch, smart headset, smart headphones, etc. The sensor data may include (for example) accelerometer data, gyroscope data and/or GPS data. The sensor data may include physiological data (e.g., an instantaneous or time-averaged heart rate). It will be appreciated that multiple types of sensor data may be collected (e.g., accelerometer and heart-rate data), in which case the multiple types of sensor data may be collected and/or received at a same or different frequency.

The representation of the data may include the sensor data itself or a processed version thereof. For example, a processed version may include a normalized or regularized metric (e.g., relative to other data collected by a same sensor, other data collected at a same device and/or other data collected at other devices) and/or one or more statistic (e.g., sum, average, maximum or median value of raw or processed data over a time period). As another example, a processed version may include an estimated number of steps taken by, an estimated distance traveled by a subject during a given time period, an estimated speed statistic (e.g., average, median or maximum speed) over a time period, or an estimated portion of a time period during which the subject was stationary.

Sensor data may be received (for example) relatively continuously, periodically, in response to a pull request, or in response to receiving a request for an updated prediction. For example, receiving the representation of the sensor data may include an application running on a subject device locally accessing sensor data collected at the subject device. As another example, receiving the representation of the sensor data may include a remote computing system receiving a communication from the subject device that includes a processed version of sensor data that was collected at the subject device.

At block 1020, physical activity of the subject across a time period is inferred. The time period may correspond to (for example) a time period during which the sensor data was received or a time period ending at a time at which the sensor data was received. For example, sensor data may be collected at a subject device and/or received every minute, and process 1000 may include inferring—for each 5-minute period—a physical activity based on representations of the 5 sensor data points collected and/or received during the time period. As another example, sensor data may be collected at a subject device and/or received every 15 minutes, and process 1000 may include generating—for each 15-minute period—a physical activity with which the subject was engaged during a preceding time period based on recent sensor data associated with a time point ending the time period.

Inferring a physical activity may include using the representation of the sensor data to infer which specific type of physical activity with which the subject was engaged. For example, a set of activity classes may be predefined, and the sensor data representation can be fed to a classifier to predict the activity. The predefined classes may include specific activities (e.g., sleeping, sitting, walking, running, biking) and/or activity-characteristic categories (e.g., inactivity, low-intensity activity, and high-intensity activity).

The classifier may include a machine-learning model or rules-based model. For example, a machine-learning model may use a clustering based approach (e.g., K-means clustering, density-based spatial clustering of applications with noise, mean-shift clustering, expectation-maximization clustering, decision-tree clustering, or component-based clustering) to identify distinct clusters of sensor data and to infer a physical activity for each cluster based on initial rules or signatures (e.g., that indicate that running is likely to corresponding to larger accelerometer data than walking, etc.). As another example, a rules-based approach may identify which of a set of predefined ranges (e.g., unidimensional or multi-dimensional ranges) includes a sensor data representation and may then infer an activity corresponding to the range.

In some instances, block 1020 includes inferring a number of steps taken by the subject across a time interval. Data from a pedometer sensor may directly identify the number of steps. A step count may be inferred using data from one or more accelerometers, one or more gyroscopes and/or one or more GPS sensors.

At block 1025, a physiological state of the subject across a time period is inferred. The time period may, but need not, correspond to a same time period for which physical activity was inferred at block 1020. In some instances, a physiological state is inferred based on an inferred physical activity. For example, it may be inferred that a high-intensity activity (e.g., running, speed walking, high-intensity biking) increases muscular blood flow (which may speed distribution of a therapeutic, speed absorption at sites being exercised and slow absorption at sites not being exercised), decreases plasma volume (which may slow distribution of a therapeutic), reduces renal blood flow (which may slow excretion of a therapeutic), and/or increases sweating (which may speed excretion of a therapeutic).

In some instances, a physiological state is inferred based on one or more representations of sensor data. For example, if a representation of sensor data from an accelerometer or heart-rate monitor (e.g., that may use optical signals to detect oxygenated blood flow under the skin and thus detect a heart rate) is high (within a predefined range or above a predefined threshold), it may be inferred that a high-intensity activity (e.g., running, speed walking, high-intensity biking) increases muscular blood flow (which may speed distribution of a therapeutic, speed absorption at sites being exercised and slow absorption at sites not being exercised), decreases plasma volume (which may slow distribution of a therapeutic), reduces renal blood flow (which may slow excretion of a therapeutic), and/or increases sweating (which may speed excretion of a therapeutic).

In some instances, process 1000 includes blocks 1020 and 1025. In some instances, process 1000 includes block 1020 and not 1025. In some instances, process 1000 includes block 1025 and not 1020. In some instances block 1000 does not include block 1020 or block 1025.

At block 1030, a hemophilia-pertinent prediction is generated using a machine-learning model and the sensor-data representation (e.g., and/or a physical activity and/or physiological state inferred based on the sensor-data representation). A hemophilia-pertinent prediction may predict (for example) a level (e.g., concentration) of a factor and/or therapeutic, a clotting time, a risk of an abnormal bleeding event occurring (e.g., spontaneously and/or following an injury).

The machine-learning model can include one or more models disclosed herein (e.g., in Section III.F). The machine-learning model can include (for example) a pharmacokinetic model and/or neural network. The hemophilia-pertinent prediction may be generated using a workflow that includes the machine-learning model, optionally includes one or more pre-processing functions and optionally includes one or more post-processing functions. The machine-learning model and/or the workflow may be configured to receive and/or otherwise configured based on treatment information that indicates when the subject received hemophilia treatments, dosage of hemophilia treatments and/or which hemophilia treatments were received. The machine-learning model and/or workflow may be configured to predict how an availability, concentration and/or efficacy of the treatment changes in time (e.g., as a result of distribution, metabolism, absorption and/or excretion) and/or to predict a risk of an abnormal bleeding event. It will be appreciated that physical activity may influence hemophilia-pertinent predictions because of (for example) changed pharmacokinetics and/or changed risks of injury (which may change the risk of non-spontaneous abnormal bleeding), and a machine-learning model may capture any such relationship.

In some instances, the machine-learning model and/or workflow was trained to learn how sensor data influences variables of interest. For example, assay results (e.g., indicating clotting times and/or drug concentrations) and/or manifestation data (e.g., whether and/or when an abnormal bleeding event occurred) may have been collected from hemophilia subjects receiving a given treatment over a time period relative to administration of the treatment. Sensor data may further be collected during this time period, and the model and/or workflow may learn one or more parameters (e.g., one or more weights, rate constants, scaling factors) that result in the sensor data influencing an output (e.g., corresponding to an assay result or manifestation prediction). Some or all of the hemophilia subjects may have been and/or may have been asked to engage in one or more activities (e.g., walking, running, etc.) during part of the monitored time. In some instances, the trained machine-learning model and/or trained workflow may then receive, as input, a representation of sensor data. In some instances, separate models are trained—where each model is associated with a different type of activity, activity intensity and/or physiological state. A workflow may then dynamically select the model to use based on sensor data, and state variables and/or interim values may be passed from a previous model to a current model to facilitate smooth transitions and accurate results.

In some instances, one or more rules or techniques are used to determine how rate constants (e.g., used in a pharmacokinetic model) and/or weights (e.g., used in a neural network, classifier, pre-processing function or post-processing function) are to change in response to various sensor-data representations, inferred types of activity, inferred activity intensity levels and/or inferred physiological states. For example, a rule may indicate that an excretion rate constant is to increase by 5% (or increase the rate constant by another relative or absolute amount or decrease the rate constant by an absolute or relative amount) during high-intensity activity. The increase may be transient and/or may influence subsequent predictions (e.g., in response to a model using previous predictions to generate new predictions). As another example, a rule may indicate that post-processing is to be applied that increases a probability of an abnormal bleeding event by 5% (or increase the output by another relative or absolute amount or decrease the output by an absolute or relative amount) during high-intensity activity.

In some instances, a condition evaluated in a post-processing function are changed in response to various sensor-data representations, inferred types of activity, inferred activity intensity levels and/or inferred physiological states. For example, a threshold or range used to determine whether to issue an alert may be defined based on a sensor-data representation, inferred type of activity, inferred activity intensity level and/or inferred physiological state. A threshold (or range boundary) may be defined based on (for example) a linear relationship, a non-linear relationship, a step function and/or a logic-based analysis. To illustrate, the post-processing function (and/or a collection of post-processing functions which may be selectively used based on various sensor-data representations, inferred types of activity, inferred activity intensity levels and/or inferred physiological states) may indicate that an alert is to be issued when a predicted probability of an abnormal bleed occurring is 10% or higher when it is inferred that a subject is stationary, 8% or higher when it is inferred that a subject is engaging in low-intensity activity and 5% or higher when it is inferred that a subject is engaging in high-intensity activity. As another example, a condition may indicate that a factor threshold is to be determined using a sigmoid function that relates threshold values and movement data (e.g., inferred intensity data, inferred steps per time interval) or that relates threshold values and heart-rate data; the condition may indicate that if a predicted factor level (e.g., as predicted using a machine-learning model) is below the threshold, an alert is to be issued.

In some instances, at block 1035, a result may be generated and output that includes or is based on the hemophilia-pertinent prediction. Outputting the result may include displaying or transmitting the result (e.g., to a device associated with the specific subject or to a medical provider). The result may include (for example) the hemophilia-pertinent prediction and/or content selected based on the hemophilia-pertinent prediction. For example, a result may include an alert identifying a low predicted therapeutic level and/or high predicted risk of an abnormal bleeding event. As another example, a result that is output may include a recommendation or instruction to facilitate communication between the subject and a medical provider (e.g., for a subject to contact a medical provider or the reverse), to change the current activity level or activity selection generally (e.g., for a subject to stop partaking in a particular physical activity or in high-intensity activities) or to administer a treatment. For example, a recommendation may be for the subject to receive a dosage of factor concentrate, recombinant factor concentrate and/or other fast-acting treatment. The treatment that is recommended and/or provided may differ or be the same from any, one or all treatments that the subject receives prophylactically.

Whether the result is output may depend on whether a predefined condition (e.g., which may be evaluated as part of a workflow that generates the hemophilia-pertinent prediction or may be separately evaluated). For example, the result may be selectively output when a prediction from the transformed data-processing workflow is within a predefined open or closed range. As another example, the result may be selectively output when a prediction from the transformed data-processing workflow is equal to 1, indicating satisfaction of an alert condition.

Process 1000 may further return from block 1030 to block 1015, such that hemophilia-pertinent predictions are repeatedly determined using a one or workflows that are dynamically selected, dynamically configured and/or processing sensor-data representations.

It will be appreciated that part or all of process 1000 may be performed at a device of the specific subject; part or all of process 1000 may be performed at a computing system associated with a medical provider associated with the specific subject; and/or part or all of process 1000 may be performed at a remote computing system.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

VI. Additional Examples

A first example includes a method including: receiving a subject-specific data set corresponding to a subject, the subject-specific data set indicating a type of hemophilia, treatment type and demographic data corresponding to the particular subject; processing the subject-specific data set using a classifier model to identify one or more population-level machine-learning models from among a set of population-level machine-learning models, each of the set of population-level machine-learning models including a machine-learning model trained using a training set corresponding to a set of other subjects with hemophilia; receiving one or more indications identifying one or more times at which a treatment of the treatment type was administered to the subject; predicting a hemophilia-pertinent time course for the subject using the one or more times and a data-processing workflow using a population-level machine-learning model of the one or more population-level machine-learning models; receiving a representation of sensor data collected at a device associated with the subject; determining, based on the representation of sensor data, a transformed data processing workflow to generate hemophilia-pertinent predictions for the subject; generating a hemophilia-pertinent prediction for the subject using the transformed data-processing workflow; and outputting a result corresponding to the hemophilia-pertinent prediction.

A second example includes the example, where generating the hemophilia-pertinent prediction includes: identifying a post-processing algorithm based on the sensor data, where determining the transformed data-processing workflow includes: identifying an initial result using the data-processing workflow; determining a post-processing function based on the sensor data; and transforming the initial result using the initial result and post-processing function.

A third example includes the first or second example, where determining the transformed data-processing workflow includes selecting an activation function.

A fourth example includes any of the first through third examples, where the population-level machine-learning model includes a pharmacokinetic model.

A fifth example includes any of the first through fourth examples, where processing the subject-specific data set using the classifier model to identify the one or more population-level machine-learning models includes: encoding the subject-specific data set; and using a distance-based algorithm to identify distances between the encoding of the subject-specific data set and encodings of other subject-specific data sets included in the training set.

A sixth example includes any of the first through fifth examples, further including: appending at least the hemophilia-pertinent prediction to the predicted hemophilia pertinent time course, the one or more predicted factor levels including the predicted factor level; receiving another representation of new sensor data collected at the device associated with the subject; determining, based on the other representation, to resume use of the data-processing workflow; generating another hemophilia-pertinent prediction for the subject using the data-processing workflow and the appended time course; and outputting another result corresponding to the other hemophilia-pertinent prediction.

A seventh example includes any of the first through sixth examples, further including: determining, based on the sensor data, that a workflow-transition condition has been satisfied, where the transformed data processing workflow is determined in response to determining that the workflow-transition condition has been satisfied.

An eighth example includes any of the first through seventh examples, where generating the hemophilia-pertinent prediction includes: determining one or more states or interim variables calculated for a recent time step by the population-level machine-learning model; and configuring the transformed data-processing workflow to use the one or more states or interim variables.

A ninth example includes any of the first through eighth examples, where the sensor data represents movement of the subject.

A tenth example includes any of the first through eighth examples, where the sensor data represents a physiological attribute of the subject.

An eleventh example includes any of the first through tenth examples, where the predicted hemophilia-pertinent time course includes, for each of a set of time points, a predicted level of a factor, therapeutic or active ingredient, and where the hemophilia-pertinent prediction includes another predicted level of the factor, therapeutic or active ingredient associated with another time point.

A twelfth example includes any of the first through tenth examples, where the predicted hemophilia-pertinent time course includes, for each of a set of time points, a predicted clotting time or probability of an abnormal bleeding event occurring, and where the hemophilia-pertinent prediction includes another predicted clotting time or another probability of an abnormal bleeding event occurring associated with another time point.

A thirteenth example includes any of the first through twelfth examples, where the result is indicative of a recommendation to reduce an activity level of the subject.

A fourteenth example includes any of the first through twelfth examples, where the result is indicative of a recommendation to treat the subject in view of an increased abnormal bleeding probability.

A fifteenth example includes any of the first through fourteenth examples, further including: treating the subject with a hemophilia treatment based on the result.

A sixteenth example includes any of the fifteenth example, where hemophilia treatment differs from the treatment of the treatment type administered at the one or more times.

A seventeenth example includes a system including: one or more data processors; and a non-transitory computer readable storage medium containing instructions which, when executed on the one or more data processors, cause the one or more data processors to perform part or all of one more methods disclosed herein (e.g., any of the first through sixteenth examples).

An eighteenth example includes a computer-program product tangibly embodied in a non-transitory machine-readable storage medium, including instructions configured to cause one or more data processors to perform part or all of one or more methods disclosed herein (e.g., any of the first through sixteenth examples).

What is claimed is:

1. A method comprising:
  receiving, by a first user device associated with a subject, a subject-specific data set corresponding to the subject, the subject-specific data set including or identifying:
    a type of hemophilia;
    treatment type;
    demographic data; and
    a photograph of a part of the subject or information derived based on the photograph of the part of the subject;
  transmitting, by the first user device via a network, at least part of the subject-specific data set to a central artificial-intelligence system;
  processing, by the central artificial-intelligence system, the at least part of the subject-specific data set using a classifier model to identify one or more population-level machine-learning models from among a set of population-level machine-learning models, each of the set of population-level machine-learning models including a machine-learning model trained using a training set corresponding to a set of other subjects with hemophilia;
  receiving, by the first user device, one or more indications identifying one or more times at which a treatment of the treatment type was administered to the subject;
  transmitting, by the first user device via the network, the one or more indications to the central artificial-intelligence system;
  predicting, by the central artificial-intelligence system, a hemophilia-pertinent time course for the subject using the one or more indications and a data-processing workflow, wherein the data-processing workflow uses a population-level machine-learning model of the one or more population-level machine-learning models to predict the hemophilia-pertinent time course;
  collecting sensor data using a second user device associated with the subject, wherein the second user device comprises one or more sensors selected from the group consisting of an accelerometer, a gyroscope, a GPS sensor, and a physiological sensor to collect the sensor data;
  transmitting, by the second user device via the network, the sensor data to the first user device;
  generating, by the first user device, a representation of the sensor data collected at the second user device associated with the subject;
  transmitting, by the first user device via the network, the representation of the sensor data to the central artificial-intelligence system;
  determining, by the central artificial-intelligence system based on the representation of the sensor data and the predicted hemophilia-pertinent time course, a transformed data-processing workflow, wherein the representation of the sensor data is used to infer a physical activity of the subject across a time period during which the sensor data was received or a time period ending at a time at which the sensor data was received, the transformed data-processing workflow uses another population-level machine-learning model associated with the physical activity of the one or more population-level machine-learning models to generate hemophilia-pertinent predictions for the subject;

generating, by the central artificial-intelligence system, a hemophilia-pertinent prediction for the subject using the transformed data-processing workflow;

transmitting, by the central artificial-intelligence system via the network, the hemophilia-pertinent prediction to the first user device; and outputting, by the first user device, a result corresponding to the hemophilia-pertinent prediction.

2. The method of claim 1, wherein generating the hemophilia-pertinent prediction includes:
identifying a post-processing algorithm based on the sensor data, wherein determining the transformed data-processing workflow includes:
identifying an initial result using the data-processing workflow;
determining a post-processing function based on the sensor data; and
transforming the initial result using the initial result and post-processing function.

3. The method of claim 1, wherein determining the transformed data-processing workflow includes selecting an activation function.

4. The method of claim 1, wherein the population-level machine-learning model includes a pharmacokinetic model.

5. The method of claim 1, wherein processing the subject-specific data set using the classifier model to identify the one or more population-level machine-learning models includes:
encoding the subject-specific data set; and
using a distance-based algorithm to identify distances between the encoding of the subject-specific data set and encodings of other subject-specific data sets included in the training set.

6. The method of claim 1, further comprising:
appending at least the hemophilia-pertinent prediction to the predicted hemophilia-pertinent time course;
obtaining another representation of new sensor data collected at the second user device associated with the subject;
determining, based on the other representation, to resume use of the data-processing workflow;
generating another hemophilia-pertinent prediction for the subject using the data-processing workflow and the appended hemophilia-pertinent time course; and
outputting another result corresponding to the other hemophilia-pertinent prediction.

7. The method of claim 1, further comprising:
determining, based on the sensor data, that a workflow-transition condition has been satisfied, wherein the transformed data-processing workflow is determined in response to determining that the workflow-transition condition has been satisfied.

8. The method of claim 1, wherein generating the hemophilia-pertinent prediction includes:
determining one or more states or interim variables calculated for a recent time step by the population-level machine-learning model; and
configuring the transformed data-processing workflow to use the one or more states or interim variables.

9. The method of claim 1, wherein the second user device is a smart phone, a wearable smart device, a smart watch, a smart headset, or a smart headphone, and the sensor data includes (i) accelerometer data, gyroscope data, and/or GPS data representing movement of the subject and/or (ii) a physiological attribute of the subject.

10. The method of claim 1, further comprising collecting the photograph of the part of the subject using a device of the subject.

11. The method of claim 1, wherein the predicted hemophilia-pertinent time course includes, for each of a set of time points, a predicted level of a factor, therapeutic or active ingredient, and wherein the hemophilia-pertinent prediction includes another predicted level of the factor, therapeutic or active ingredient associated with another time point.

12. The method of claim 1, wherein the predicted hemophilia-pertinent time course includes, for each of a set of time points, a predicted clotting time or probability of an abnormal bleeding event occurring, and wherein the hemophilia-pertinent prediction includes another predicted clotting time or another probability of an abnormal bleeding event occurring associated with another time point.

13. The method of claim 1, wherein the result is indicative of a recommendation to (i) reduce an activity level of the subject or (ii) seek medical attention for a bleed depicted in the photograph.

14. The method of claim 1, wherein the result is indicative of a recommendation to treat the subject in view of an increased abnormal bleeding probability.

15. The method of claim 1, further comprising:
treating the subject with a hemophilia treatment based on the result.

16. The method of claim 15, wherein the hemophilia treatment differs from the treatment of the treatment type administered at the one or more times.

17. The method of claim 1, further comprising treating the subject with a prophylactic treatment or a manifestation treatment based on the result.

18. The method of claim 1, wherein the subject-specific data set includes data identified in an electronic medical record corresponding to the subject.

19. The method of claim 1, wherein the result is output at the first user device associated with the subject via a chatbot.

20. A system comprising:
a first user device associated with a subject;
a second user device associated with the subject, wherein the second user device comprises one or more sensors selected from the group consisting of an accelerometer, a gyroscope, a GPS sensor, and a physiological sensor to collect sensor data comprising (i) accelerometer data, gyroscope data, and/or GPS data representing movement of the subject and/or (ii) a physiological attribute of the subject;
a network connecting to a central artificial-intelligence system;
one or more data processors; and
a non-transitory computer readable storage medium containing instructions which, when executed on the one or more data processors, cause the one or more data processors to perform a set of operations including:
receiving, by the first user device, a subject-specific data set corresponding to the subject, the subject-specific data set including or identifying:
a type of hemophilia;
treatment type;
demographic data; and a photograph of a part of the subject or information derived based on the photograph of the part of the subject;

transmitting, by the first user device via the network, at least part of the subject-specific data set to the central artificial-intelligence system;

processing, by the central artificial-intelligence system, the at least part of the subject-specific data set using a classifier model to identify one or more population-level machine-learning models from among a set of population-level machine-learning models, each of the set of population-level machine-learning models including a machine-learning model trained using a training set corresponding to a set of other subjects with hemophilia;

receiving, by the first user device, one or more indications identifying one or more times at which a treatment of the treatment type was administered to the subject;

transmitting, by the first user device via the network, the one or more indications to the central artificial-intelligence system;

predicting, by the central artificial-intelligence system, a hemophilia-pertinent time course for the subject using the one or more indications and a data-processing workflow, wherein the data-processing workflow uses a population-level machine-learning model of the one or more population-level machine-learning models to predict the hemophilia-pertinent time course;

collecting the sensor data using the second user device associated with the subject;

transmitting, by the second user device via the network, the sensor data to the first user device;

generating, by the first user device, a representation of the sensor data collected at the second user device associated with the subject;

transmitting, by the first user device via the network, the representation of the sensor data to the central artificial-intelligence system;

determining, by the central artificial-intelligence system based on the representation of the sensor data and the predicted hemophilia-pertinent time course, a transformed data-processing workflow, wherein the representation of the sensor data is used to infer a physical activity of the subject across a time period during which the sensor data was received or a time period ending at a time at which the sensor data was received, and the transformed data-processing workflow uses another population-level machine-learning model associated with the physical activity of the one or more population-level machine-learning models to generate hemophilia-pertinent predictions for the subject;

generating, by the central artificial-intelligence system, a hemophilia-pertinent prediction for the subject using the transformed data-processing workflow;

transmitting, by the central artificial-intelligence system via the network, the hemophilia-pertinent prediction to the first user device; and outputting, by the first user device, a result corresponding to the hemophilia-pertinent prediction.

21. A computer-program product tangibly embodied in a non-transitory machine-readable storage medium, including instructions configured to cause one or more data processors to perform a set of operations including:

receiving, by a first user device associated with a subject, a subject-specific data set corresponding to the subject, the subject-specific data set including or identifying:
a type of hemophilia;
treatment type;
demographic data; and
a photograph of a part of the subject or information derived based on the photograph of the part of the subject;

transmitting, by the first user device via a network, at least part of the subject-specific data set to a central artificial-intelligence system;

processing, by the central artificial-intelligence system, the at least part of the subject-specific data set using a classifier model to identify one or more population-level machine-learning models from among a set of population-level machine-learning models, each of the set of population-level machine-learning models including a machine-learning model trained using a training set corresponding to a set of other subjects with hemophilia;

receiving, by the first user device, one or more indications identifying one or more times at which a treatment of the treatment type was administered to the subject;

transmitting, by the first user device via the network, the one or more indications to the central artificial-intelligence system;

predicting, by the central artificial-intelligence system, a hemophilia-pertinent time course for the subject using the one or more indications and a data-processing workflow, wherein the data-processing workflow uses a population-level machine-learning model of the one or more population-level machine-learning models to predict the hemophilia-pertinent time course;

collecting sensor data using a second user device associated with the subject, wherein the second user device comprises one or more sensors selected from the group consisting of an accelerometer, a gyroscope, a GPS sensor, and a physiological sensor to collect the sensor data;

transmitting, by the second user device via the network, the sensor data to the first user device;

generating, by the first user device, a representation of the sensor data collected at the second user device associated with the subject;

determining, by the central artificial-intelligence system based on the representation of the sensor data and the predicted hemophilia-pertinent time course, a transformed data-processing workflow, wherein the representation of the sensor data is used to infer a physical activity of the subject across a time period during which the sensor data was received or a time period ending at a time at which the sensor data was received, the transformed data-processing workflow uses another population-level machine-learning model associated with the physical activity of the one or more population-level machine-learning models to generate hemophilia-pertinent predictions for the subject;

generating, by the central artificial-intelligence system, a hemophilia-pertinent prediction for the subject using the transformed data-processing workflow;

transmitting, by the central artificial-intelligence system via the network, the hemophilia-pertinent prediction to the first user device; and outputting, by the first user device, a result corresponding to the hemophilia-pertinent prediction.

\* \* \* \* \*